(12) United States Patent
Tateno et al.

(10) Patent No.: US 8,117,212 B2
(45) Date of Patent: Feb. 14, 2012

(54) INFORMATION PROCESSING APPARATUS AND METHOD, PROGRAM AND RECORDING MEDIUM

(75) Inventors: Kei Tateno, Kanagawa (JP); Noriyuki Yamamoto, Kanagawa (JP); Mari Saito, Kanagawa (JP); Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 640 days.

(21) Appl. No.: 11/856,439

(22) Filed: Sep. 17, 2007

(65) Prior Publication Data

US 2008/0077575 A1 Mar. 27, 2008

(30) Foreign Application Priority Data

Sep. 21, 2006 (JP) ................. P2006-255729

(51) Int. Cl.
*G06F 7/00* (2006.01)
*G06F 17/30* (2006.01)
(52) U.S. Cl. ........................................ 707/749
(58) Field of Classification Search ............ 709/203; 707/726, 749, 758
See application file for complete search history.

(56) References Cited

U.S. PATENT DOCUMENTS

| 6,049,777 | A * | 4/2000 | Sheena et al. ............ 705/10 |
| 6,285,999 | B1  | 9/2001 | Page |
| 6,327,586 | B1* | 12/2001 | Kisiel ........................ 1/1 |
| 6,651,059 | B1  | 11/2003 | Sundaresan et al. |
| 6,697,800 | B1* | 2/2004 | Jannink et al. ............ 1/1 |
| 6,763,354 | B2* | 7/2004 | Hosken ..................... 1/1 |
| 2001/0049822 | A1 | 12/2001 | Yoshida et al. |
| 2002/0032019 | A1* | 3/2002 | Marks et al. ............ 455/414 |
| 2002/0062268 | A1* | 5/2002 | Sato et al. ............... 705/27 |
| 2002/0099629 | A1* | 7/2002 | Sato et al. ............... 705/27 |
| 2002/0152262 | A1* | 10/2002 | Arkin et al. ............ 709/202 |
| 2002/0178057 | A1* | 11/2002 | Bertram et al. ......... 705/14 |
| 2003/0140038 | A1 | 7/2003 | Baker et al. |
| 2003/0149612 | A1* | 8/2003 | Berghofer et al. ...... 705/10 |
| 2005/0171932 | A1* | 8/2005 | Nandhra .................. 707/3 |
| 2006/0136451 | A1* | 6/2006 | Denissov ............... 707/101 |
| 2006/0173872 | A1* | 8/2006 | Koike et al. ........... 707/100 |

FOREIGN PATENT DOCUMENTS

GB 2 383 153 6/2003

(Continued)

OTHER PUBLICATIONS

Daichi Mochihashi et al., "Stoichiometric Representation of Meaning", Natural Language Process of Report of Study of the Information Processing Society of Japan, vol. 2002, No. 4, 2002.

(Continued)

*Primary Examiner* — Greta Robinson
*Assistant Examiner* — Jeffrey Chang
(74) *Attorney, Agent, or Firm* — Finnegan, Henderson, Farabow, Garrett & Dunner, L.L.P.

(57) ABSTRACT

Herein disclosed an information processing apparatus for providing a service of introducing, from a predetermined item which is to make a reference, associated items associated with the reference item to one or more different information processing apparatus, including: an association degree collection section configured to collect association degrees applied between items by users of the different information processing apparatus and indicative of weights of a relationship between the items; and an introduction section configured to determine the associated items from the reference item based on a result of the collection by the association degree collection section and introduce the determined associated items to any of the different information processing apparatus.

8 Claims, 48 Drawing Sheets

FOREIGN PATENT DOCUMENTS

| | | |
|---|---|---|
| JP | 2000-090110 | 3/2000 |
| JP | 2001-160955 | 6/2001 |
| JP | 2001-282838 | 10/2001 |
| JP | 2004-157835 | 6/2004 |
| JP | 2004-348607 | 12/2004 |
| JP | 2005-196469 | 7/2005 |
| JP | 2005-196540 | 7/2005 |

OTHER PUBLICATIONS

Gower J. C., "Multivariate Analysis and Multidimensional Geometry", Statistician, vol. 17, No. 1, pp. 13 to 28, 1967.

Kleinberg J., "Authoritative Sources in a Hyperlinked Environment", Journal of the ACM, 46, 1999.

P. Resnick, et al., "GroupLens: Open Architecture for Collaborative Filtering of Netnews." Conference on Computer Supported Cooperative Work, pp. 175-186 (1994).

D. Maltz, et al., "Pointing the way: Active collaborative filtering", Proceedings of the Annual ACM SIGCHI Conference on Human Factors in Computing Systems (CHI'95), pp. 202-209 (1995).

M. Claypool, et al., "Implicit Interest Indicators", Proceedings of the $6^{th}$ International Conference on Intelligent User Interfaces, pp. 33-40 (2001).

* cited by examiner

FIG.10

|  | META 1 | META 2 | META 3 | META 4 | META 5 |
|---|---|---|---|---|---|
| LIKING VECTOR | 0.300 | 0.161 | 0.569 | -0.021 | 0.592 |

FIG.11

|  | META 1 | META 2 | META 3 | META 4 | META 5 |
|---|---|---|---|---|---|
| ITEM 10 | 1.472 | -1.128 | 0.129 | -0.262 | 0.011 |
| ITEM 11 | 0.056 | -1.349 | 0.656 | -1.213 | -0.645 |
| ITEM 12 | -1.217 | -0.261 | -1.168 | -1.319 | 0.806 |
| ITEM 13 | -0.041 | 0.953 | -0.461 | 0.931 | 0.232 |

FIG.12

|  | EUCLID DISTANCE |
|---|---|
| ITEM 10 | 1.912 |
| ITEM 11 | 1.942 |
| ITEM 12 | 3.023 |
| ITEM 13 | 1.841 |

FIG.13

|        | META 1 | META 2 | META 3 | META 4 | META 5 |
|--------|--------|--------|--------|--------|--------|
| ITEM 1 | 1.044  | -1.488 | -0.651 | 0.382  | 0.905  |
| ITEM 2 | 0.723  | 0.078  | 1.432  | -0.229 | 0.905  |
| ITEM 3 | -0.241 | 0.078  | -1.172 | 1.300  | -0.302 |
| ITEM 4 | -1.526 | 1.332  | 0.391  | -1.453 | -1.508 |
| ...    |        |        |        |        |        |

FIG.14

|               | META 1 | META 2 | META 3 | META 4 | META 5 |
|---------------|--------|--------|--------|--------|--------|
| LIKING VECTOR | 0.164  | 0.258  | 0.599  | -0.155 | -0.594 |

FIG.15

|         | EUCLID DISTANCE |
|---------|-----------------|
| ITEM 10 | 2.057           |
| ITEM 11 | 1.929           |
| ITEM 12 | 2.935           |
| ITEM 13 | 1.873           |

FIG. 18

| TO<br>FROM | ITEM 1 | ITEM 2 | ITEM 3 | ITEM 4 | | ... |
|---|---|---|---|---|---|---|
| ITEM 1 | — | Null | 5 | 3 | | |
| ITEM 2 | Null | — | 2 | Null | | |
| ITEM 3 | 4 | 1 | — | 1 | | |
| ITEM 4 | 2 | Null | Null | — | | |
| ... | | | | | | |

FIG. 19

| TO<br>FROM | ITEM 1 | ITEM 2 | ITEM 3 | ITEM 4 | ... |
|---|---|---|---|---|---|
| ITEM 1 | — | 2 | 5 | 4 | |
| ITEM 2 | Null | — | 2 | Null | |
| ITEM 3 | 5 | 2 | — | 3 | |
| ITEM 4 | 3 | 1 | Null | — | |
| ... | | | | | |

FIG. 20

| FROM \ TO | ITEM 1 | ITEM 2 | ITEM 3 | ITEM 4 | ... |
|---|---|---|---|---|---|
| ITEM 1 | — | 4 | 2 | 5 | |
| ITEM 2 | Null | — | 1 | 3 | |
| ITEM 3 | 1 | 4 | — | 4 | |
| ITEM 4 | 3 | 2 | Null | — | |
| ... | | | | | |

FIG.21

|     | u1 | u2 | u3 |
|-----|----|----|----|
| w31 | 4  | 5  | 1  |
| w41 | 2  | 3  | 3  |
| w32 | 1  | 2  | 4  |
| w13 | 5  | 5  | 2  |
| w23 | 2  | 2  | 1  |
| w14 | 3  | 4  | 5  |
| w34 | 1  | 3  | 4  |

FIG.22

|                               | u2    | u3     |
|-------------------------------|-------|--------|
| CORRELATION COEFFICIENT WITH u1 | 0.891 | -0.450 |

FIG. 25

| FROM \ TO | ITEM 1 | ITEM 2 | ITEM 3 | ITEM 4 | ... |
|---|---|---|---|---|---|
| ITEM 1 | — | 2,2(4) | 5,4,4,5,5(23) | 3,2,4,3(12) | |
| ITEM 2 | 1(1) | — | 2,3,3(8) | 1,5(6) | |
| ITEM 3 | 4,4,5,3,5,5,4(30) | 1,1,1(3) | — | 1,2(3) | |
| ITEM 4 | 2,5,5(12) | 3,2(5) | Null | — | |
| ... | | | | | |

FIG.26

|        | ITEM 1 | ITEM 2 | ITEM 3 | ITEM 4 |
|--------|--------|--------|--------|--------|
| ITEM 1 | —      | 1.000  | 0.787  | 0.607  |
| ITEM 2 | 1.000  | —      | 0.801  | 0.018  |
| ITEM 3 | 0.613  | 1.000  | —      | 0.779  |
| ITEM 4 | 0.135  | 0.779  | —      | —      |

FIG. 29

|        | ITEM 1 | ITEM 2 | ITEM 3 | ITEM 4 |
|--------|--------|--------|--------|--------|
| ITEM 1 | —      | 2.000  | 4.600  | 3.000  |
| ITEM 2 | 1.000  | —      | 2.667  | 3.000  |
| ITEM 3 | 4.286  | 1.000  | —      | 1.500  |
| ITEM 4 | 4.000  | 2.500  | Null   | —      |

FIG. 30

| | ITEM 1 | ITEM 2 | ITEM 3 | ITEM 4 |
|---|---|---|---|---|
| ITEM 1 | — | 0.000 | 0.490 | 0.707 |
| ITEM 2 | 0.000 | — | 0.471 | 2.000 |
| ITEM 3 | 0.700 | 0.000 | — | 0.500 |
| ITEM 4 | 1.414 | 0.500 | — | — |

FIG.31

|        | ITEM 1 | ITEM 2 | ITEM 3 | ITEM 4 |
|--------|--------|--------|--------|--------|
| ITEM 1 | —      | —      | —      | —      |
| ITEM 2 | —      | —      | —      | —      |
| ITEM 3 | 0.408  | —      | 0.816  | 0.000  |
| ITEM 4 | 1.414  | —      | 1.414  | 1.000  |

FIG.40

| FROM \ TO | ... | ITEM 20 | ITEM 21 | ITEM 22 | ITEM 23 | ... |
|---|---|---|---|---|---|---|
| ... | | | | | | |
| ITEM 20 | | — | 10 | 2 | 1 | |
| ITEM 21 | | 10 | — | 2 | 2 | |
| ITEM 22 | | 2 | 2 | — | 13 | |
| ITEM 23 | | 1 | 2 | 13 | — | |
| ... | | | | | | |

|  | p(z1\|O) | p(z2\|O) | p(z3\|O) | p(z4\|O) |
|---|---|---|---|---|
| ... |  |  |  |  |
| ITEM 20 | 0.46 | 0.34 | 0.11 | 0.09 |
| ITEM 21 | 0.51 | 0.32 | 0.08 | 0.09 |
| ITEM 22 | 0.21 | 0.03 | 0.61 | 0.15 |
| ITEM 23 | 0.15 | 0.13 | 0.58 | 0.14 |
| ... |  |  |  |  |

FIG.44

|         | META 1 | META 2 | META 3 | META 4 | META 5 |
|---------|--------|--------|--------|--------|--------|
| ITEM 20 | 11     | 6      | 7      | 10     | 12     |
| ITEM 21 | 7      | 11     | 6      | 13     | 11     |
| ITEM 22 | 3      | 15     | 9      | 4      | 10     |
| ITEM 23 | 10     | 11     | 11     | 8      | 12     |
| ...     |        |        |        |        |        |

FIG.45

|         | EUCLID DISTANCE |
|---------|-----------------|
| ITEM 21 | 7.21            |
| ITEM 22 | 13.75           |
| ITEM 23 | 6.78            |

FIG.46

|         | EUCLID DISTANCE |
|---------|-----------------|
| ITEM 21 | 7.32            |
| ITEM 22 | 18.81           |
| ITEM 23 | 13.84           |

FIG. 49

| | META 1 | META 2 | META 3 | META 4 | META 5 | p(z1|O) | p(z2|O) | p(z3|O) | p(z4|O) |
|---|---|---|---|---|---|---|---|---|---|
| ITEM 21 | 1.044 | -1.488 | -0.651 | 0.382 | 0.905 | 0.823 | 1.038 | -0.938 | -0.992 |
| ITEM 22 | -0.241 | 0.078 | -1.172 | 1.300 | -0.302 | 1.145 | 0.884 | -1.058 | -0.992 |
| ITEM 23 | -1.526 | 1.332 | 0.391 | -1.453 | -1.508 | -0.790 | -1.345 | 1.058 | 1.172 |
| ITEM 24 | 0.723 | 0.078 | 1.432 | -0.229 | 0.905 | -1.178 | -0.576 | 0.938 | 0.812 |

FIG. 50

| | META 1 | META 2 | META 3 | META 4 | META 5 | $p(z1|O)$ | $p(z2|O)$ | $p(z3|O)$ | $p(z4|O)$ |
|---|---|---|---|---|---|---|---|---|---|
| LIKING VECTOR | 0.175 | -0.187 | 0.726 | -0.588 | 2.183 | 0.673 | 0.9463 | -0.5634 | 0.05928 |

FIG.51

| | DISTANCE |
|---|---|
| ITEM 20 | 2.631 |
| ITEM 21 | 3.686 |
| ITEM 22 | 4.437 |
| ITEM 23 | 1.622 |

FIG.52

| | DISTANCE |
|---|---|
| ITEM 20 | 2.863 |
| ITEM 21 | 3.894 |
| ITEM 22 | 5.562 |
| ITEM 23 | 3.346 |

FIG.55

$$\begin{pmatrix} 0.000 & 0.067 & 0.833 & 0.706 \\ 0.103 & 0.000 & 0.083 & 0.294 \\ 0.590 & 0.533 & 0.000 & 0.000 \\ 0.308 & 0.400 & 0.083 & 0.000 \end{pmatrix}$$

FIG.56

$$\begin{pmatrix} 0.723 & 0.777 & -0.556 & -0.661 \\ 0.225 & 0.050 & 0.572 & 0.585 \\ 0.546 & -0.576 & -0.434 & 0.368 \\ 0.358 & -0.251 & 0.418 & -0.293 \end{pmatrix}$$

FIG.57

$$\begin{pmatrix} 1.000 & 0.000 & 0.000 & 0.000 \\ 0.000 & -0.842 & 0.000 & 0.000 \\ 0.000 & 0.000 & 0.052 & 0.000 \\ 0.000 & 0.000 & 0.000 & -0.210 \end{pmatrix}$$

| ITEM | IMPORTANCE DEGREE |
|---|---|
| ITEM 1 | 0.723 |
| ITEM 2 | 0.225 |
| ITEM 3 | 0.546 |
| ITEM 4 | 0.358 |

1. ITEM 3. (0.546)
2. ITEM 4. (0.358)
3. ITEM 2. (0.225)
4. ...

FIG. 66

| IMPORTANCE DEGREE IN USER LIKING \ ITEM IMPORTANCE DEGREE | LOW | HIGH |
|---|---|---|
| ONE-SIDED TO LOW | "TO YOU WHO ARE MANIAC, HOW ABOUT THIS!" | "HOW ABOUT THIS OCCASIONALLY?" |
| ONE-SIDED TO HIGH | "HOW ABOUT MANIAC ONE OCCASIONALLY?" | "AFTER ALL THIS!" |
| NOT ONE-SIDED | "MANIAC COMMODITY!" | "THIS CANNOT BE EXCEPTED!" |

INFORMATION PROCESSING APPARATUS AND METHOD, PROGRAM AND RECORDING MEDIUM

CROSS REFERENCES TO RELATED APPLICATIONS

The present invention contains subject matter related to Japanese Patent Application JP 2006-255729 filed in the Japan Patent Office on Sep. 21, 2006, the entire contents of which being incorporated herein by reference.

BACKGROUND OF THE INVENTION

1. Field of the Invention

This invention relates to an information processing apparatus and method, a program and a recording medium, and more particularly to an information processing apparatus and method, a program and a recording medium wherein items are recommended to a user.

2. Description of the Related Art

In recent years, the communication techniques have developed and various communication services provided through a network represented by the Internet have been popularized. One of such communication services is a recommendation system which introduces recommendable contents or commodities to users in order to allow a user to appropriately select and, for example, purchase, from among a large number of contents or commodities, those contents or commodities which conform to a liking of the user.

One of such recommendation systems for contents or commodities by a computer system as described above introduces a content or a commodity selected at random. However, also a recommendation system is available which introduces contents or commodities, for example, suitable for the liking of users and estimated to be selected by the users in order to achieve more useful recommendation. In this instance, a server which performs such recommendation usually estimates the liking of users and motivates users to feed back some information thereto in order to select contents or commodities to be introduced.

The feedback information from users includes express information like, for example, five-stage evaluation from "favorable" to "unfavorable" and non-express information such as information that, in the case of music, a reproduced musical piece is favorable whereas a skipped musical piece is unfavorable. The server of the system estimates the liking of a user based on such feedback information and determines items to be presented to the user.

For the determination just described, for example, content based filtering (CBF) is available and disclosed, for example, in Japanese Patent Laid-Open No. 2001-160955 (hereinafter referred to as Patent Document 1). According to the content based filtering, where meta data are applied to each content, the liking of a user is determined as a sum total or an average of the meta data of those contents which have been enjoyed by the user. Then, the inner product or the cosine similarity degree between the liking of the user and an unknown content is used to determine whether or not the content should be recommended to the user.

Also collaborative filtering (CF) is available for the determination described above and is disclosed, for example, in P. Resnick, N. Iacovou, M. Suchak, P. Bergstrom and J. Riedl, "GroupLens: Open Architecture for Collaborative Filtering of Netnews", Conference on Computer Supported Cooperative Work, pp. 175-186, 1994 (hereinafter referred to as Non-Patent Document 1). According to the collaborative filtering, for example, predictive evaluation values based on similarity in content evaluation between users are used to recommend an unknown content to a user without utilizing meta data of the content.

In both methods, in order for the server to perform appropriate recommendation to a user, feedback information from more than a fixed number of users may be required. However, in an ordinary case, feedback of a great amount of information from users in a short period of time cannot be anticipated. Particularly, there is the possibility that a cold start problem that inappropriate recommendation is performed in an initial stage after operation of the system is started may occur. This is described, for example, in Maltz, D. and Ehrlich, K., "Pointing the way: Active collaborative filtering", Proceedings of the Annual ACM SIGCHI Conference on Human Factors in Computing Systems (CHI95), pp. 202-209, 1995 (hereinafter referred to as Non-Patent Document 2).

In the method disclosed in Non-Patent Document 2, it is attempted to solve the problem by causing an existing user to transmit a pointer of information to another user. Also another method has been proposed wherein non-express feedback information of a user is obtained from residing time on a Web page or a movement of a mouse to cover express evaluation or feedback. The method is disclosed, for example, in Claypool, M., Le, P., Waseda, M. and Brown, D., "Implicit Interest Indicators", Proceedings of the 6th International Conference on Intelligent User Interfaces, pp. 33-40, 2001 (hereinafter referred to as Non-Patent Document 3).

SUMMARY OF THE INVENTION

However, the method disclosed in Non-Patent Document 2 has the possibility that the liking of an individual may not necessarily be reflected. Meanwhile, where the server estimates the liking of a user based on non-express feedback as in the method disclosed in Non-Patent Document 3, the correctness of the estimation relies much upon the type of the content. Therefore, it is difficult to apply the method of Non-Patent Document 3 generally.

Thus, it is difficult for the server to carry out useful recommendation as described above.

Therefore, it is demanded to provide an information processing apparatus and method, a program and a recording medium wherein an appropriate item to a user can be recommended in a recommendation system which introduces contents or commodities.

According to the present invention, such recommendation of an appropriate item is achieved by feeding back not only an express evaluation behavior of users but also a relationship between recommendation object information.

More particularly, according to an embodiment of the present invention, there is provided an information processing apparatus for providing a service of introducing, from a predetermined item which is to make a reference, associated items associated with the reference item to one or more different information processing apparatus, including an association degree collection section configured to collect association degrees applied between items by users of the different information processing apparatus and indicative of weights of a relationship between the items, and an introduction section configured to determine the associated items from the reference item based on a result of the collection by the association degree collection section and introduce the determined associated items to any of the different information processing apparatus.

The information processing apparatus may further include a user liking calculation section configured to calculate a liking of any of the users of the different information processing apparatus based on the result of the collection by the association degree collection section, and a comparison section configured to compare the liking of the user calculated by the user liking calculation section and the individual items to determine similarity degrees therebetween, the introduction section introducing those of the items which are determined to have a high similarity degree to the liking of the user by the comparison by the comparison section as the associated items.

The information processing apparatus may further include a similar user search section configured to compare the applied association degrees for each of the users and search for similar users who have a high similarity degree of the liking to one of the users based on a result of the comparison, and an item evaluation prediction section configured to predict an evaluation value for each of the items by the user based on evaluation items for the items by the similar users searched out by the similar user search section, the introduction section introducing those of the items to which it is predicted for the user of the information processing apparatus to provide high evaluation by the item evaluation prediction section as the associated items.

The information processing apparatus may further include a reliability degree calculation section configured to calculate a reliability degree of each of the association degrees as information. In this instance, the introduction section may introduce, together with the associated items, the association degrees applied from the reference item to the associated items and the reliability degrees of the association degrees.

The information processing apparatus may further include a user reliability degree calculation section configured to calculate a reliability degree of users by whom the association degrees are applied, a similar user search section configured to compare the applied association degrees for each of the users and search for similar users who have a high similarity degree of the liking to one of the users based on a result of the comparison, and an item evaluation prediction section configured to perform weighting for the similar users searched out by the similar user search section based on the reliability degrees of the users calculated by the user reliability calculation section and predict evaluation values for the items by the user based on the weights of the similar users and evaluation values for the items by the similar users, the introduction section introducing those of the items to which it is predicted for the user of the information processing apparatus to provide high evaluation by the item evaluation prediction section as the associated items.

The information processing apparatus may further include an additional meta data application section configured to apply new meta data to the items based on the association degrees. In this instance, the information processing apparatus may further include a reliability degree calculation section configured to calculate a reliability degree of the association degrees as information, the additional meta data application section applying new meta data to the items based on both of the association degrees and the reliability degrees of the association degrees. Or, the information processing apparatus may further include an item similarity degree calculation section configured to calculate a similarity degree between the items using new meta data applied by the additional meta data application section, the introduction section introducing those of the items which have a high similarity degree to the reference item calculated by the item similarity degree calculation section as the associated items. Or else, the information processing apparatus may further include a user liking calculation section configured to calculate a liking of users of the different information processing apparatus based on a result of the collection by the association degree collection section, and a comparison section configured to compare the new meta data for the items applied by the additional meta data application section with the likings of the users calculated by the user liking calculation section to determine a similarity degree therebetween, the introduction section introducing those of the items which are decided to have a high similarly degree to the likings of the users by the comparison by the comparison section as the associated items.

The information processing may further include an importance degree calculation section configured to calculate an importance degree of the items among all items based on the association degrees applied between the items. In this instance, the information processing apparatus may further include a correction section configured to correct a display form of information of the associated items to be introduced to the other information processing apparatus based on the importance degrees calculated by the importance degree calculation section, the introduction section causing any of the other different information processing apparatus which is a destination of the instruction to display the information of the associated items in the display form corrected by the correction section. Or, the information processing apparatus may further include an explanation application section configured to apply an explanation of the associated items which is to be introduced to the other information processing apparatus to the information of the associated items based on the importance degrees calculated by the importance degree calculation section. Or else, the information processing apparatus may further include a user liking calculation section configured to calculate a liking of users of the different information processing apparatus based on a result of the collection by the association value correction section, and an explanation application section configured to apply an explanation of the associated items which is to be introduced to the other information processing apparatus to the information of the associated items based on the importance degrees calculated by the importance degree calculation section and the likings of the users calculated by the user liking calculation section.

According to another embodiment of the present invention, there is provided an information processing method for an information processing apparatus for providing a service of introducing, from a predetermined item which is to make a reference, associated items associated with the reference item to one or more different information processing apparatus, including the steps of collecting association degrees applied between items by users of the different information processing apparatus and indicative of weights of a relationship between the items, and determining the associated items from the reference item based on a result of the collection by the process at the association degree collection step and introduce the determined associated items to any of the different information processing apparatus.

According to another embodiment of the present invention, there is provided a program which can be executed by a computer which controls a process of providing a service of introducing, from a predetermined item which is to make a reference, associated items associated with the reference item to one or more different information processing apparatus, including the steps of collecting association degrees applied between items by users of the different information processing apparatus and indicative of weights of a relationship between the items, and determining the associated items from the reference item based on a result of the collection by the process at the association degree collection step and introduce the determined associated items to any of the different information processing apparatus.

According to a further embodiment of the present invention, there is provided a recording medium on or in which the program is recorded.

In the information processing apparatus and method and the program, association degrees applied between items by users of the different information processing apparatus and indicative of weights of a relationship between the items are collected. Then, associated items are determined from the reference item based on a result of the collection and introduced to any of the different information processing apparatus.

With the information processing apparatus and method and the program, items can be recommended to a user. Particularly, upon such recommendation of items, those items which are very appropriate to the user can be recommended.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 10 is a table illustrating an example of a liking vector;

FIG. 11 is a table illustrating an example of a new item;

FIG. 12 is a table illustrating an example of the distance from the liking vector;

FIG. 13 is a table illustrating an example of normalized meta data;

FIG. 14 is a table illustrating an example of a modified liking vector;

FIG. 15 is a table illustrating an example of the distance from the modified liking vector;

FIGS. 18 to 20 are tables illustrating an example of association degrees applied by different users;

FIG. 21 is a correspondence table illustrating comparison of the association degrees applied by the users;

FIG. 22 is a table illustrating correlation coefficients of one to the others of the users;

FIG. 25 is a table illustrating an example of association degrees applied by all users;

FIG. 26 is a table illustrating an example of the reliability degree of association degrees;

FIG. 29 is a table illustrating an example of average values of the association degree among all users;

FIG. 30 is a table illustrating an example of standard deviations of association degrees;

FIG. 31 is a table illustrating an example of absolute values of deviations of association degrees by a user;

FIG. 40 is a table illustrating an example of association degrees;

FIG. 44 is a table illustrating an example of meta data of items;

FIG. 45 is a table illustrating an example of distances from one of the items illustrated in FIG. 44;

FIG. 46 is a table illustrating an example of distances where additional meta data are involved;

FIG. 49 is a table illustrating an example of normalized meta data;

FIG. 50 is a table illustrating an example of a user liking vector;

FIG. 51 is a table illustrating an example of the Euclid distances where no additional meta data are involved;

FIG. 52 is a table illustrating an example of the Euclid distances where additional meta data are involved;

FIG. 55 is a view illustrating an example of a transition stochastic matrix;

FIGS. 56 and 57 are views illustrating an example of matrices obtained by characteristic value decomposition of the transition stochastic matrix;

FIG. 66 is a table illustrating an example of explanations of items.

DETAILED DESCRIPTION OF THE PREFERRED EMBODIMENTS

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 4:
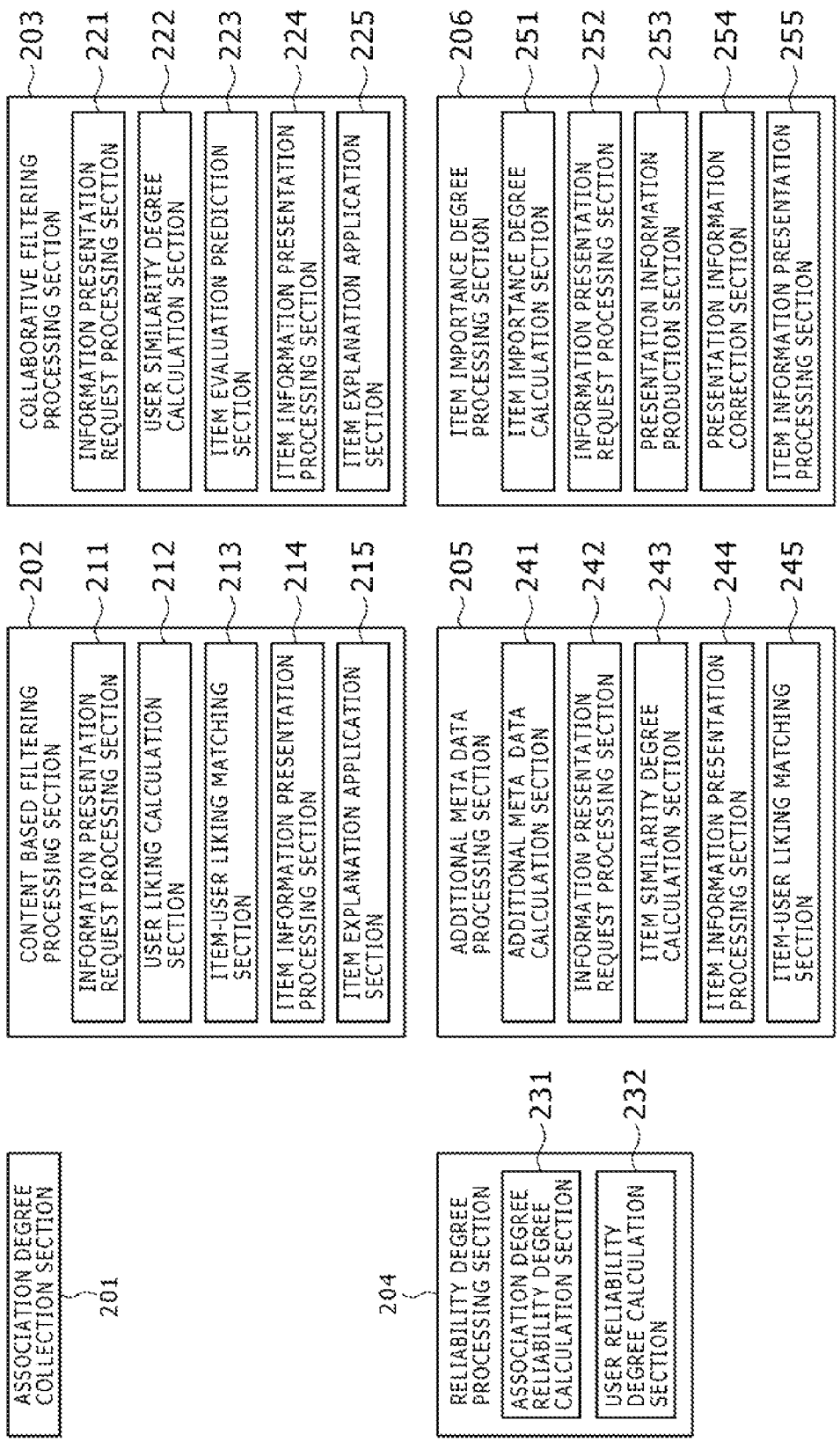
FIG. 4 is a block diagram illustrating functions of a CPU of the server.

According to the present invention, there is provided an information processing apparatus (for example, a server 11 shown in FIG. 1) for providing a service of introducing, from a predetermined item which is to make a reference, associated items associated with the reference item to one or more different information processing apparatus (for example, a client 12 and another client 13 shown in FIG. 1), including an association degree collection section (for example, an association degree collection section 201 shown in FIG. 4) configured to collect association degrees applied between items by users of the different information processing apparatus and indicative of weights of a relationship between the items, and an introduction section (for example, an item information presentation processing section 214, an item information presentation processing section 224, an item information presentation processing section 244 or an item information presentation processing section 255 shown in FIG. 4) configured to determine the associated items from the reference item based on a result of the collection by the association degree collection section and introduce the determined associated items to any of the different information processing apparatus.

The information processing apparatus may further include a user liking calculation section (for example, a user liking calculation section 212 shown in FIG. 4) configured to calculate a liking of any of the users of the different information processing apparatus based on the result of the collection by the association degree collection section, and a comparison section (for example, an item-user liking matching section 213 shown in FIG. 4) configured to compare the liking of the user calculated by the user liking calculation section and the individual items to determine similarity degrees therebetween, the introduction section introducing those of the items which are determined to have a high similarity degree to the liking of the user by the comparison by the comparison section as the associated items.

The information processing apparatus may further include a similar user search section (for example, a user similarity degree calculation section 222 shown in FIG. 4) configured to compare the applied association degrees for each of the users and search for similar users who have a high similarity degree of the liking to one of the users based on a result of the comparison, and an item evaluation prediction section (for example, an item evaluation prediction section 223 shown in FIG. 4) configured to predict an evaluation value for each of the items by the user based on evaluation items for the items by the similar users searched out by the similar user search section, the introduction section introducing those of the items to which it is predicted for the user of the information processing apparatus to provide high evaluation by the item evaluation prediction section as the associated items.

The information processing apparatus may further include a reliability degree calculation section (for example, an association degree reliability degree calculation section 231 shown in FIG. 4) configured to calculate a reliability degree of each of the association degrees as information.

Figure 33:
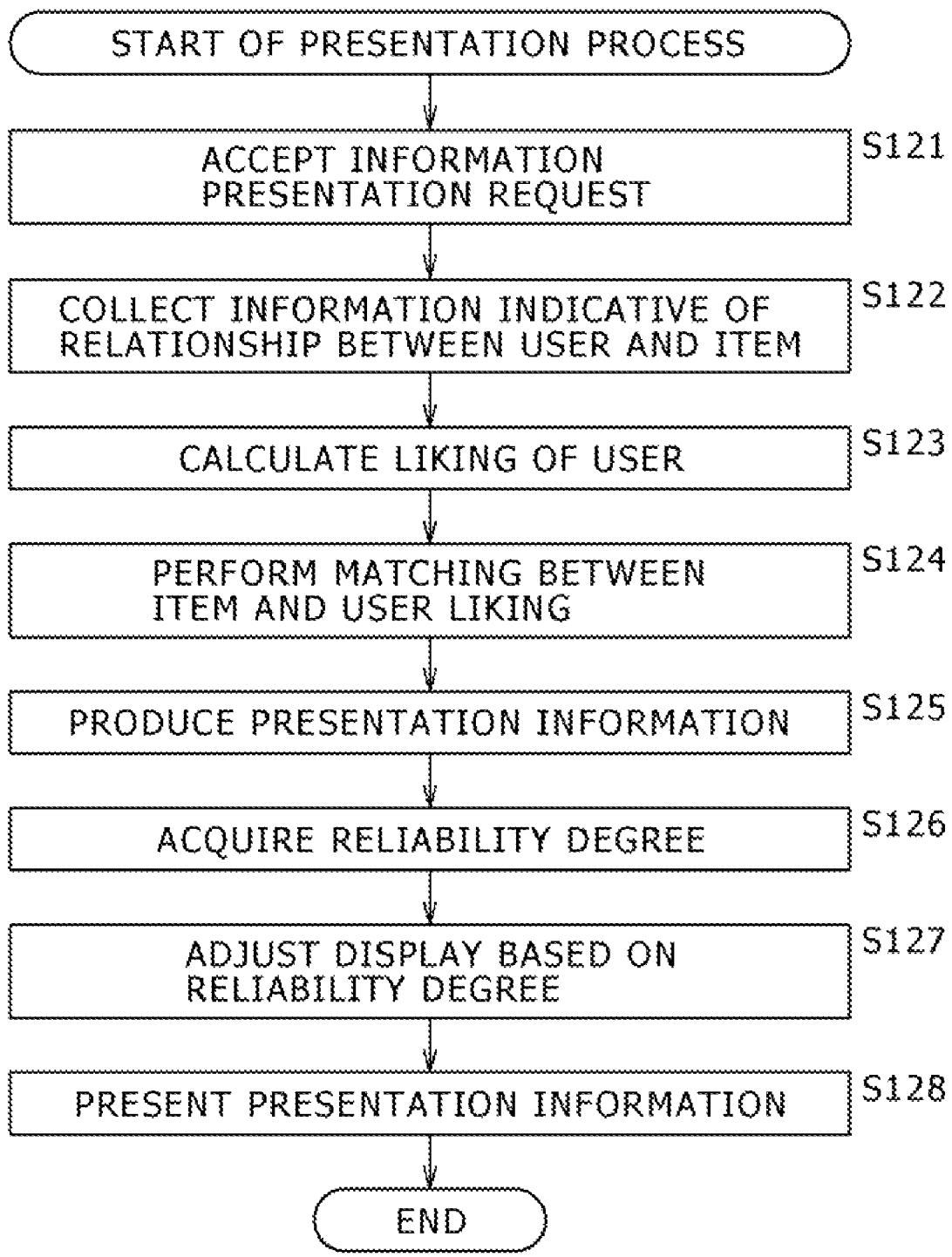
Figure 34:
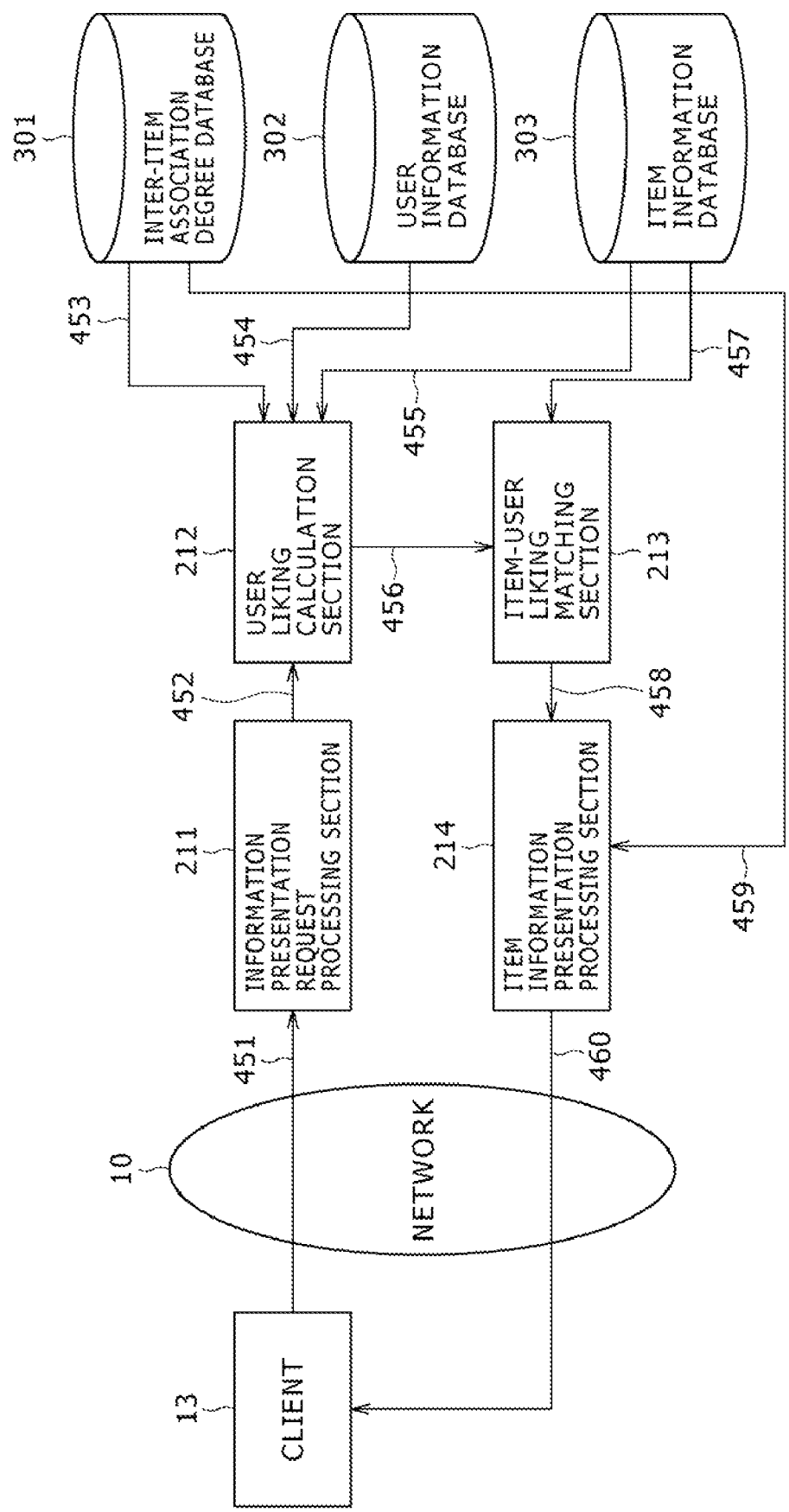
FIG. 34 is a block diagram illustrating an example of a manner of operation of functional blocks which participate in the presentation process of FIG. 33.

The introduction section may introduce, together with the associated items, the association degrees applied from the reference item to the associated items and the reliability degrees of the association degrees (for example, at step S127 of FIG. 33 or step S146 of FIG. 34).

The information processing apparatus may further include a user reliability degree calculation section (for example, a user reliability degree calculation section 232 shown in FIG. 4) configured to calculate a reliability degree of users by whom the association degrees are applied, a similar user search section configured to compare the applied association degrees for each of the users and search for similar users who have a high similarity degree of the liking to one of the users based on a result of the comparison, and an item evaluation prediction section (for example, the item evaluation prediction section 223 shown in FIG. 4) configured to perform weighting for the similar users searched out by the similar user search section based on the reliability degrees of the users calculated by the user reliability calculation section and predict evaluation values for the items by the user based on the weights of the similar users and evaluation values for the items by the similar users, the introduction section introducing those of the items to which it is predicted for the user of the information processing apparatus to provide high evaluation by the item evaluation prediction section as the associated items.

The information processing apparatus may further include an additional meta data application section (for example, an additional metal data calculation section 241 shown in FIG. 4) configured to apply new meta data to the items based on the association degrees.

The information processing apparatus may further include a reliability degree calculation section (for example, the association degree reliability degree calculation section 231 shown in FIG. 4) configured to calculate a reliability degree of the association degrees as information, the additional meta data application section applying new meta data to the items based on both of the association degrees and the reliability degrees of the association degrees.

The information processing apparatus may further include an item similarity degree calculation section (for example, an item similarity degree calculation section 243 shown in FIG. 4) configured to calculate a similarity degree between the items using new meta data applied by the additional meta data application section, the introduction section introducing those of the items which have a high similarity degree to the reference item calculated by the item similarity degree calculation section as the associated items.

The information processing apparatus may further include a user liking calculation section (for example, the user liking calculation section 212 shown in FIG. 4) configured to calculate a liking of users of the different information processing apparatus based on a result of the collection by the association degree collection section, and a comparison section (for example, an item-user liking matching section 245) configured to compare the new meta data for the items applied by the additional meta data application section with the likings of the users calculated by the user liking calculation section to determine a similarity degree therebetween, the introduction section introducing those of the items which are decided to have a high similarly degree to the likings of the users by the comparison by the comparison section as the associated items.

The information processing may further include an importance degree calculation section (for example, an item importance degree calculation section 251 shown in FIG. 4) configured to calculate an importance degree of the items among all items based on the association degrees applied between the items.

The information processing apparatus may further include a correction section (for example, a presentation information correction section 254 shown in FIG. 4) configured to correct a display form of information of the associated items to be introduced to the other information processing apparatus based on the importance degrees calculated by the importance degree calculation section, the introduction section causing any of the other different information processing apparatus which is a destination of the instruction to display the information of the associated items in the display form corrected by the correction section.

The information processing apparatus may further include an explanation application section (for example, a step S269 of FIG. 62) configured to apply an explanation of the associated items which is to be introduced to the other information processing apparatus to the information of the associated items based on the importance degrees calculated by the importance degree calculation section.

The information processing apparatus may further include a user liking calculation section configured to calculate a liking of users of the different information processing apparatus based on a result of the collection by the association value correction section, and an explanation application section (for example, a step S288 of FIG. 64) configured to apply an explanation of the associated items which is to be introduced to the other information processing apparatus to the information of the associated items based on the importance degrees calculated by the importance degree calculation section and the likings of the users calculated by the user liking calculation section.

Figure 1:
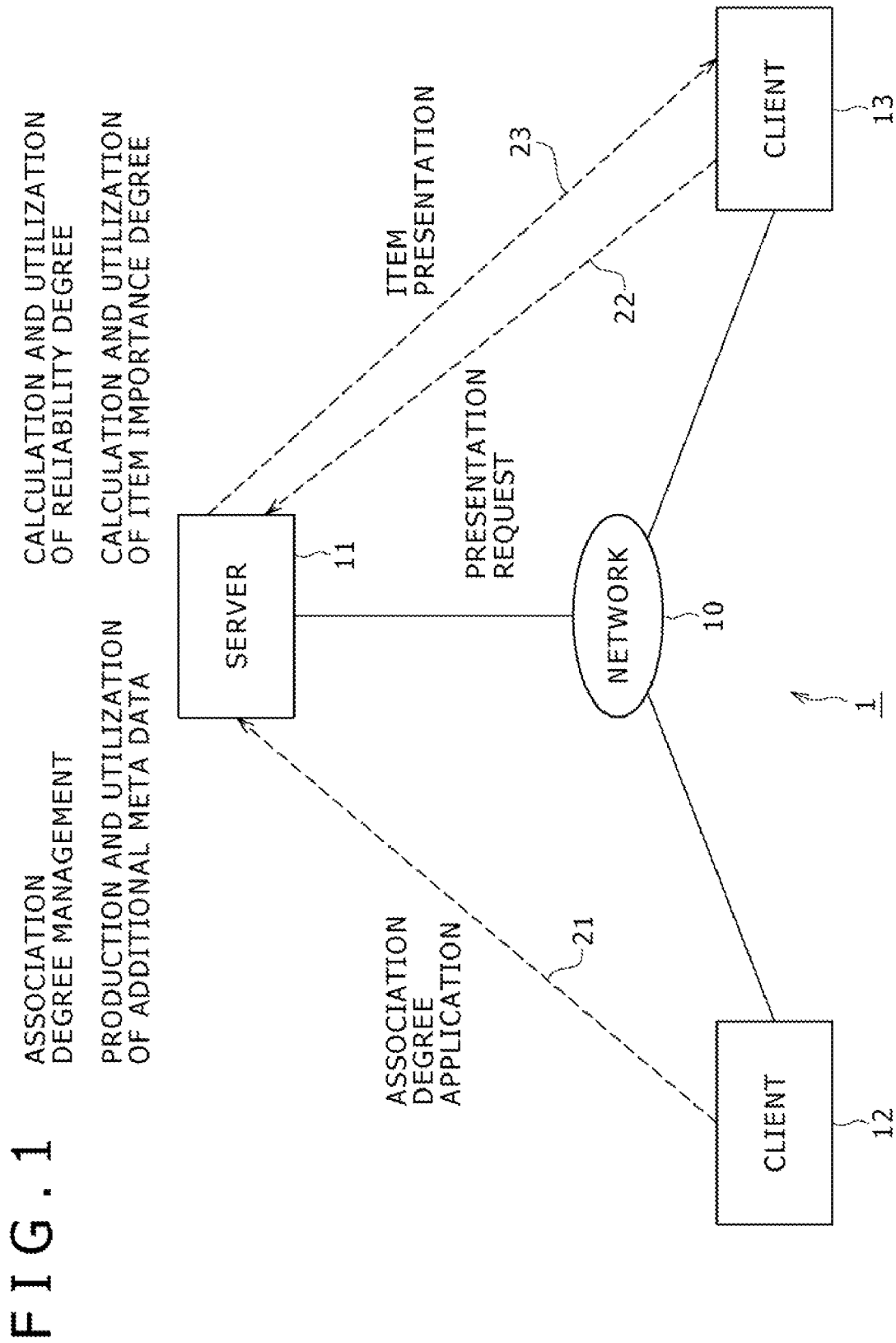
FIG. 1 is a block diagram showing an example of a configuration of an item introduction system to which the present invention is applied.

FIG. 1 shows an example of a configuration of an item introduction system to which the present invention is applied.

Referring to FIG. 1, the item introduction system 1 shown includes a server 11 and a plurality of clients 12 and 13 connected to each other by a network 10. In the item introduction system 1, the server 11 introduces or recommends an item to the clients 12 and 13. The item introduction system 1 is utilized, for example, a sales service of a content and so forth.

For example, a user of a client who wants to purchase some content would issue a request for information of contents to the server 11, which is the sales side of contents, in order to select some content to be purchased. In accordance with the request, the server 11 introduces information of contents as items to the client of the requesting source. The user of the client would refer to the information of the introduced contents to decide whether or not the contents should be purchased.

In this manner, the item introduction system 1 is not only a recommendation system for introducing items but also a system which implements recommendation of a comparatively desirable item based not only on an express evaluation behavior of a user but also on an input of a relationship between items. Further, the item introduction system 1 can be applied widely because it uses an approach which is not restricted by a domain of a content (movie, music, web page or the like) which represents a relationship between items.

It is to be noted that a content here includes a medium content such as, for example, music, a movie, a TV program or a systematic writing as well as a commodity to be sold.

Meanwhile, an item is a unit of information presentation or recommendation in the item introduction system 1, and the substance of an item depends upon a situation. For example, where the content is music, the item may be an artist, an album, a musical piece or the like, but where the content is a movie, the item may be a staff member such as a movie director, an actor or actress, a distributing agency or the like. In other words, an item includes not only an individual work or commodity but also a group which has a common attribute (meta data).

It is to be noted that meta data include all data which are added to or included in a content which does not rely upon a user who experiences the content such as, for example, where the content is music, a genre, a hometown or a year of debut of an artist, a word appearing in review writings, or a characteristic amount extracted from the content.

In FIG. 1, the item introduction system 1 is shown including a single server (server 11), one network (network 10), and two clients (clients 12 and 13). However, the number of networks, servers and clients is optional, and the item introduction system 1 may include a plurality of networks, a plurality of servers or three or more clients. Further, for example, part of processing of the server side may be assigned as processing between clients using the P2P technique or the like.

The network 10 may include one or a plurality of networks represented, for example, by the Internet or a LAN (Local Area Network). The network 10 may be a wire network or a wireless network or else a network which involves both of wire and wireless communication.

The server 11 provides a service of introducing an item to a client. Thereupon, the server 11 presents items associated with an item presented already or associated items which are associated with a reference item which may be an item designated by a client or the like. The server 11 manages not only information of items of an object of introduction but also information which represents associations of the items. Thus, the server 11 selects associated items from a reference item based on the information for associating the items with each other and presents the associated items to the client. It is to be noted that the association between items is performed based on a request (feedback) from the client.

Further, the server 11 calculates and utilizes the degree of reliability of the information for associating the items and the users or produces and utilizes a new parameter through application of the relationship between the items. Further, the server 11 calculates and utilizes the degree of importance of the individual items based on the association of the items.

The individual clients operate independently of each other and designate items to be associated with each other or a weight of the association (hereinafter referred to as association degree) to the server 11. Further, each client issues, independently of such processing as just described, a request for presentation of items so that items relating to the items presented already or items relating to a designated item may be presented to the client.

In the following description, it is assumed that the client 12 performs association of items and the client 13 receives presentation of items. Actually, since a process of performing association of items and a process of receiving presentation of items are independent of each other, one client may perform both of the processes or may perform only one of the processes. Further, each process may be executed at an arbitrary timing.

In the following, roles of each apparatus in the item introduction system 1 are described in more detail.

The client 12 which performs association of items issues, designating a relationship between items and a degree of association, a request to the server 11 to apply a desired association degree to the relationship between the desired items as indicated by a broken line arrow mark 21. The server 11 includes a database for managing information relating to association between items and updates the database based on the request from the client 12 and applies an association degree to the relationship of the designated items to establish association between the items.

Figure 2:
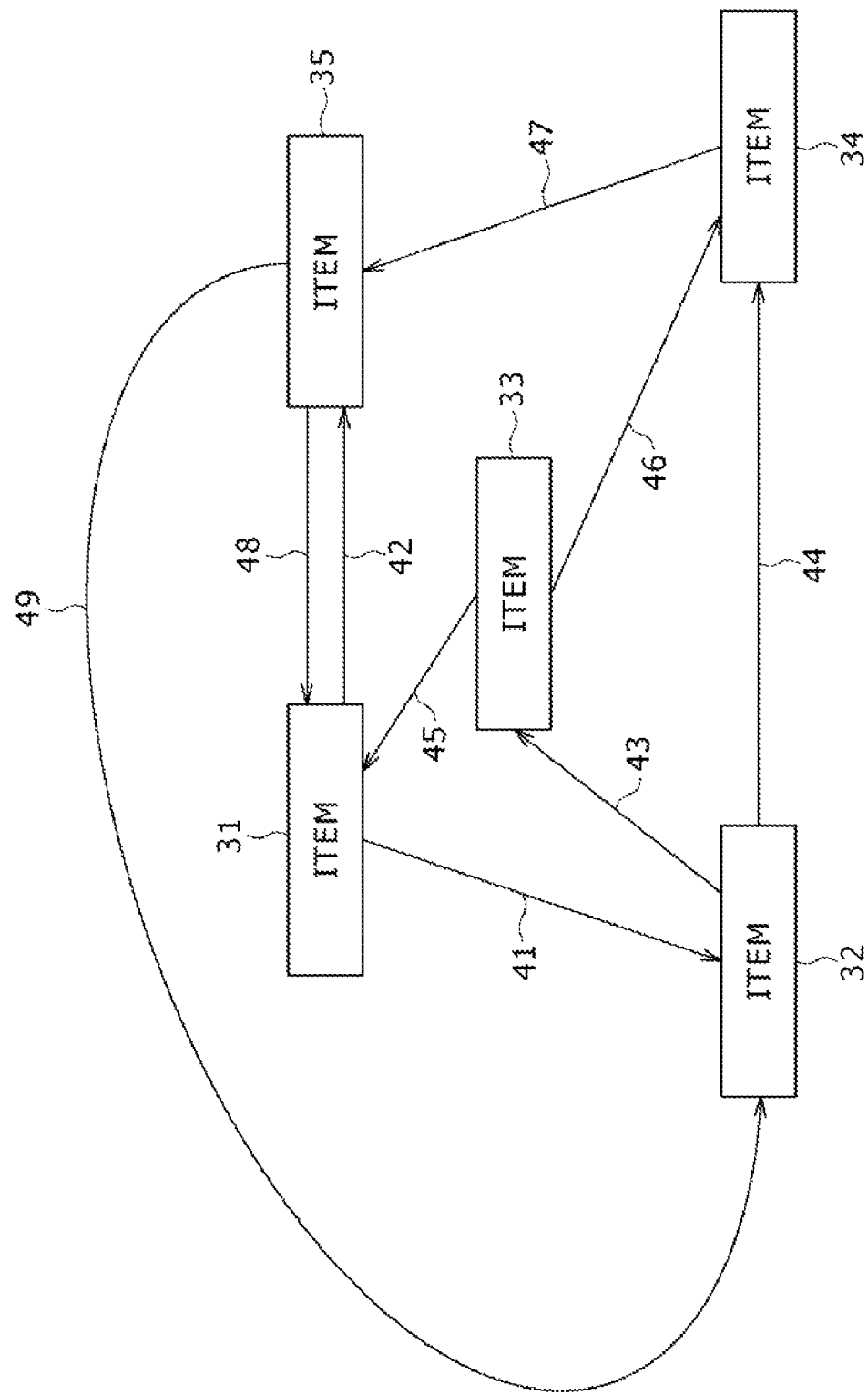
FIG. 2 is a diagrammatic view illustrating association between items.

FIG. 2 schematically illustrates relationships relating to association between items. Referring to FIG. 2, a plurality of items 31 to 35 are each used as an object of introduction prepared in advance, and each of arrow marks 41 to 48 indicates a relationship between items whose association degree is registered by the client 12.

As indicated by the arrow marks 41 to 48, each two ones of the items 31 to 35 may bidirectionally have a relationship which is directed from one to the other of the two. For example, the item 31 and the item 35 have a relationship indicated by the arrow mark 42 which is directed from the item 31 to the item 35 and another relationship indicated by the arrow mark 48 which is directed from the item 35 to the item 31.

An association degree is applied to a relationship between items in which a direction indicated by an arrow mark in this manner is taken into consideration. Each of the arrow marks 41 to 48 shown in FIG. 2 indicates a relationship between items to which an association degree is applied in this manner.

For example, if a relationship which is directed from the item 31 to the item 32 and an association degree "3" are designated by the client 12, then the server 11 applies the association degree "3" to the relationship indicated by the arrow mark 41 which is directed from the item 31 to the item 32. At this time, the server 11 registers the association degree "3" as an association degree applied by the client 12. In other words, an association degree is applied to one relationship (arrow mark) for each client. It is to be noted that, as occasion demands, the server 11 calculates the sum total, an average value or the like of applied association degrees for each relationship (arrow mark) between items.

Referring back to FIG. 1, the client 13 to which an item is to be presented issues a presentation request for the item or for relating items to the server 11 as indicated by the arrow mark 22. The server 11 searches such information relating to the association between items as illustrated in FIG. 2 for the designated item or items relating to items presented already in accordance the request received from the client 13. Then, the server 11 presents the information relating to the items to the client 13 as indicated by the arrow mark 23.

For example, a method of searching, when a user of a client tries to purchase some content in a content sales service, a large number of contents prepared in advance for the content to be purchased at random not only requires complicated operations for the user but also does not always assure success in finding of a satisfactory content which the user may want to purchase. Therefore, the method described may possibly reduce the motivation for purchase of the user.

Or, even if a dealer of contents introduces recommendable contents to a user, the contents selected by the dealer may not necessarily be favorable to the user. Therefore, the item introduction system 1 urges a user to apply an association degree between items which are information relating to contents. The server 11 grasps liking of the user (or all users) through this act and, for example, when a certain item is presented to a certain user, searches for associated items based on association between items. Then, the server 11 presents information of the item designated by the user and simultaneously presents information of associated items associated with the item designated by other users or the user itself.

Consequently, each user can refer to presented associated items without conducting a search by itself and can easily expand the width of contents whose purchase may be investigated. As a result, the user can easily purchase a greater amount of contents satisfactory to the user itself.

Since application of an association degree is independent of actual purchase, each user can apply an association degree freely without actually purchasing a content or freely within a predetermined restricted range after effective management of the service is started. Accordingly, application of a large amount of application of association degrees can be expected from an initial stage after the service is started. For example, where a reward is paid, upon purchase of a content arising from such item introduction, to users who have applied an association degree to a relationship to items which contributes to the purchase, if the amount of the reward to be paid to each user is determined so as to increase in inverse proportion to the number of those users who applied the association degree, then it can be expended that the application of an association degree upon starting of the service is activated as much.

In this manner, the server 11 of the item introduction system 1 introduces items to users of clients.

The item introduction system 1 may be utilized for any service such as, for example, a sales service of a content, a download service of a content, a rental service or an access service. Further, the item introduction system 1 itself may establish an introduction service.

The following description proceeds under the assumption that the item introduction system 1 is utilized for a sales service of contents and introduces information relating to the contents as items for the simplified description.

Figure 3:
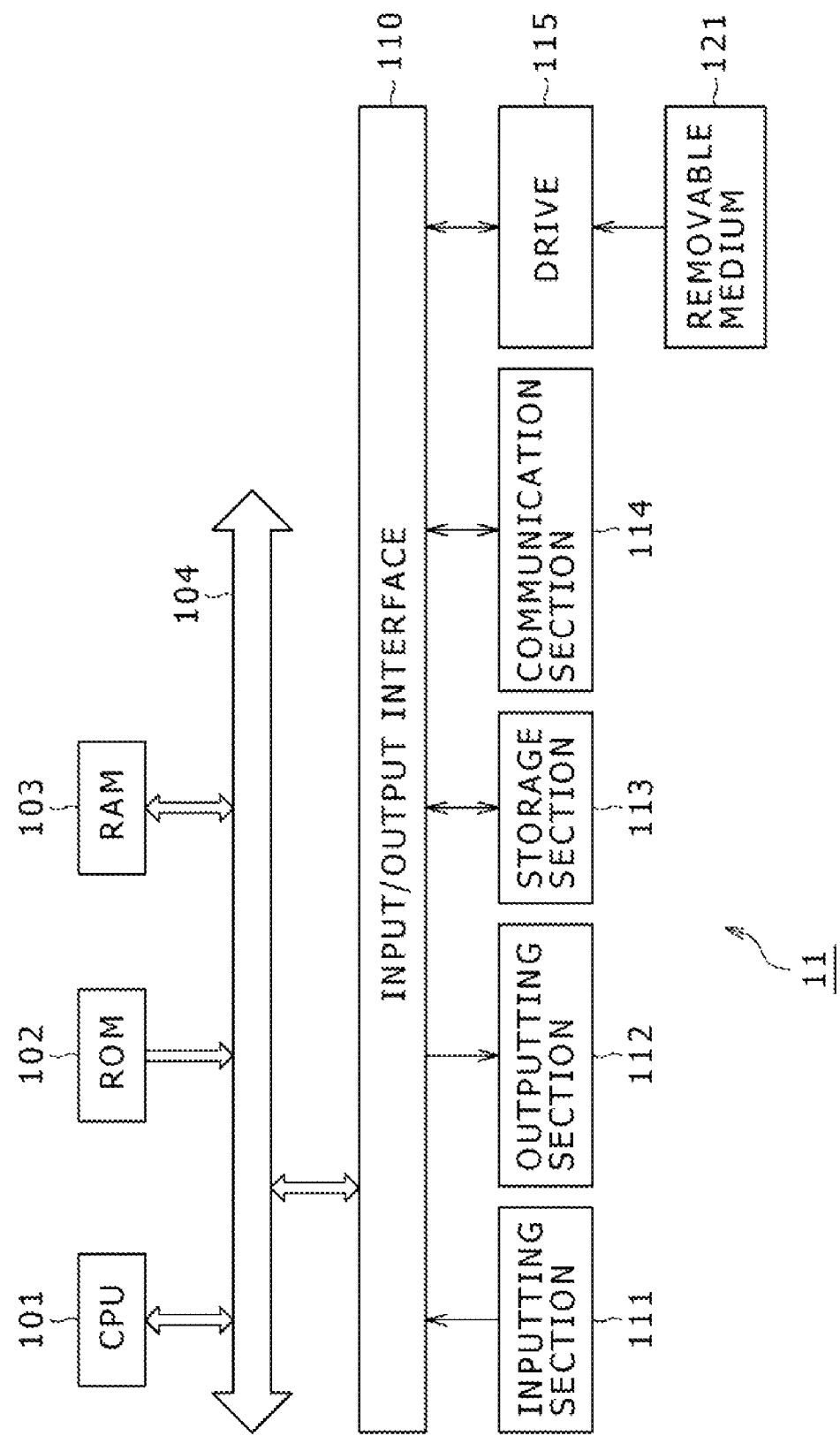
FIG. 3 is a block diagram illustrating functions of a server shown in FIG. 1.

FIG. 3 shows an example of an internal configuration of the server 11.

Referring to FIG. 3, the server 11 shown includes a central processing unit (CPU) 101 which executes various processes based on a program stored in a read only memory (ROM) 102 or a program loaded from a storage section 113 into a random access memory (RAM) 103. Also data and so forth necessary for the CPU 101 to execute various processes are stored suitably into the RAM 103.

The CPU 101, ROM 102 and RAM 103 are connected to each other by a bus 104. Also an input/output interface 110 is connected to the bus 104.

An inputting section 111 which may include a keyboard and a mouse, an outputting section 112 including a display unit which may be a cathode ray tube (CRT) or a liquid crystal display (LCD) unit, a speaker and so forth, a storage section 113 which includes a hard disk and so forth, and a communication section 114 formed from a modem or the like are connected to the input/output interface 110. The communication section 114 performs a communication process through a network including the Internet.

A drive 115 is connected to the input/output interface 110 as occasion demands, and a removable medium 121 such as a magnetic disk, an optical disk, a magnetic optical disk, a semiconductor memory or the like is loaded suitably into the input/output interface 110. Thus, a computer program read out from the removable medium 121 loaded in the drive 115 is installed into the storage section 113 as occasion demands.

FIG. 4 illustrates functions of the CPU 101 which executes a program.

Referring to FIG. 4, the CPU 101 includes an association degree collection section 201, a content based filtering processing section 202, a collaborative filtering processing section 203, a reliability degree processing section 204, an additional meta data processing section 205 and an item importance degree processing section 206. The association degree collection section 201 accepts an association degree supplied from the client 12 and allocates the association degree to a relationship between items. The content based filtering processing section 202 specifies similar items which match with the liking of a user based on meta data of a content and presents the similar items as associated items. The collaborative filtering processing section 203 predicts evaluation of an item from a behavior of similar users without using meta data and presents associated items based on a result of the prediction. The reliability degree processing section 204 performs processes relating to an association degree or a reliability degree of a user. The additional meta data processing section 205 produces new meta data based on an applied association degree and performs presentation of associated items based on the meta data. The item importance degree processing section 206 calculates an importance degree of items and performs presentation of the items based on the importance degrees.

The content based filtering processing section 202 includes an information presentation request processing section 211 for accepting a request from the client 13, a user liking calculation section 212 for calculating a liking of a user, and an item-user liking matching section 213 for performing matching of a liking of a user and items. The content based filtering processing section 202 further includes an item information presentation processing section 214 for performing introduction of associated items to the user of the client 13, and an item explanation application section 215 for applying, to the information of an item to be presented, an explanation relating to the item.

The collaborative filtering processing section 203 includes an information presentation request processing section 221 for accepting a request from the client 13, a user similarity degree calculation section 222 for calculating a similarity degree between users, and an item evaluation prediction section 223 for preventing evaluation of a new item of a user. The collaborative filtering processing section 203 further includes an item information presentation processing section 224 for performing introduction of associated items to the user of the client 13, and an item explanation application section 225 for applying, to the information of items to be presented, explanations relating to the items.

The reliability degree processing section 204 includes an association degree reliability degree calculation section 231 for calculating a reliability degree of an association degree, and a user reliability degree calculation section 232 for calculating a reliability degree of a user.

The additional meta data processing section 205 includes an additional meta data calculation section 241 for performing an analysis based on association degrees between items to produce new meta data, and an information presentation request processing section 242 for accepting a request from the client 13. The additional meta data processing section 205 further includes an item similarity degree calculation section 243 for calculating a similarity degree of items based on newly added meta data. The additional meta data processing section 205 further includes an item information presentation processing section 244 for introducing associated items to the user of the client 13 and an item-user liking matching section 245 for performing matching of a liking of a user and items.

The item importance degree processing section 206 includes an item importance degree calculation section 251 for calculating an importance degree of an item, and an information presentation request processing section 252 for accepting a request from the client 13. The item importance degree processing section 206 further includes a presentation information production section 253 for producing presentation information to be presented to the user of the client 13. The item importance degree processing section 206 further includes a presentation information correction section 254 for correcting presentation information, and an item information presentation processing section 255 for performing introduction of items to the user of the client 13.

Figure 5:
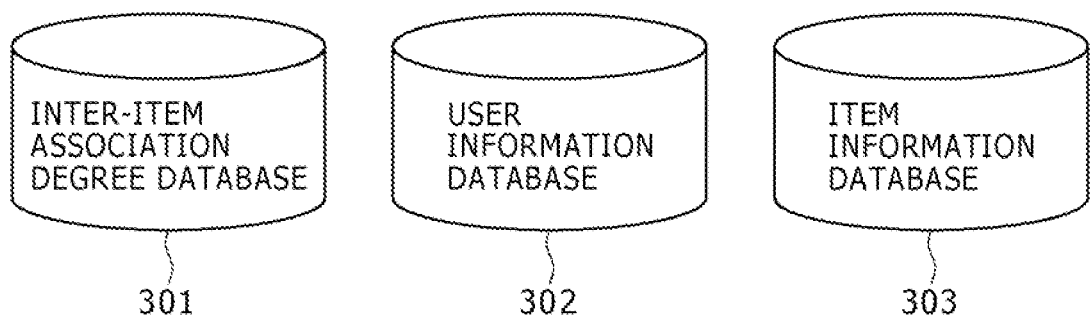
FIG. 5 is a schematic view showing an example of a configuration of a storage section shown in FIG. 3.

FIG. 5 illustrates an example of an internal configuration of the storage section 113 shown in FIG. 3.

Referring to FIG. 5, the storage section 113 includes an inter-item association degree database 301 for associating items registered in the client 12 with each other and storing and managing such association degrees of the items. The storage section 113 further includes a user information database 302 for storing and managing information relating to the user of the client 12 which registers an association degree, and an item information database 303 for storing and managing information items to be introduced.

Particular processes of the item introduction system 1 are described below.

Figure 6:
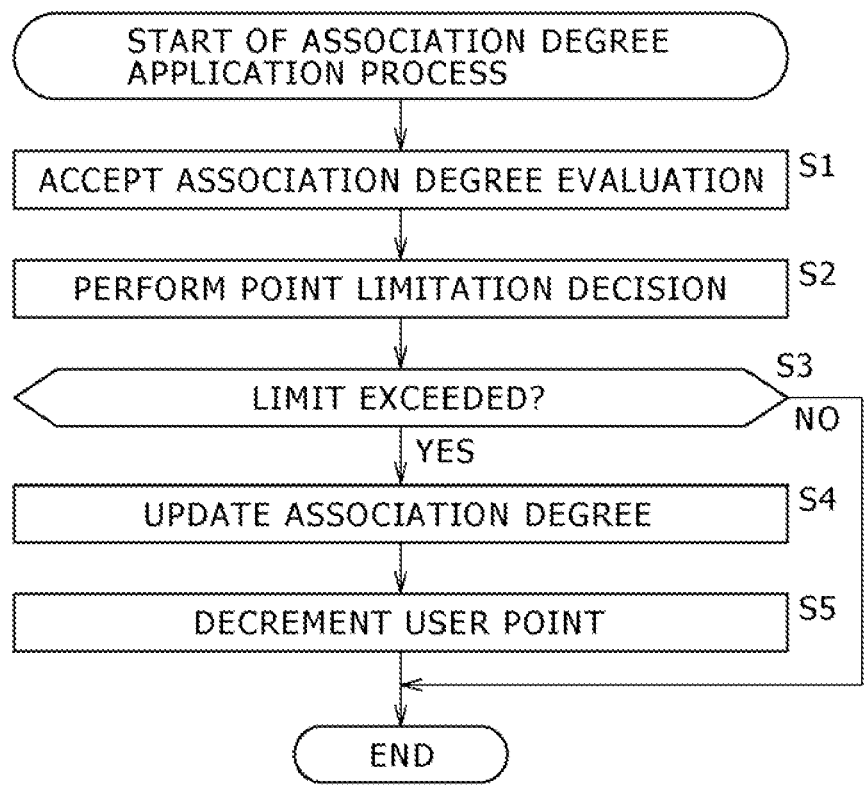
FIG. 6 is a flow chart illustrating an example of a flow of an association degree application process.

Basic processes to be executed by the item introduction system 1 according to the present invention can be roughly divided into association degree application and item recommendation. First, an example of a flow of the association degree application process which is executed for the client 12 by the server 11 is described with reference to FIG. 6., and FIG. 7 as occasion demands.

Figure 7:
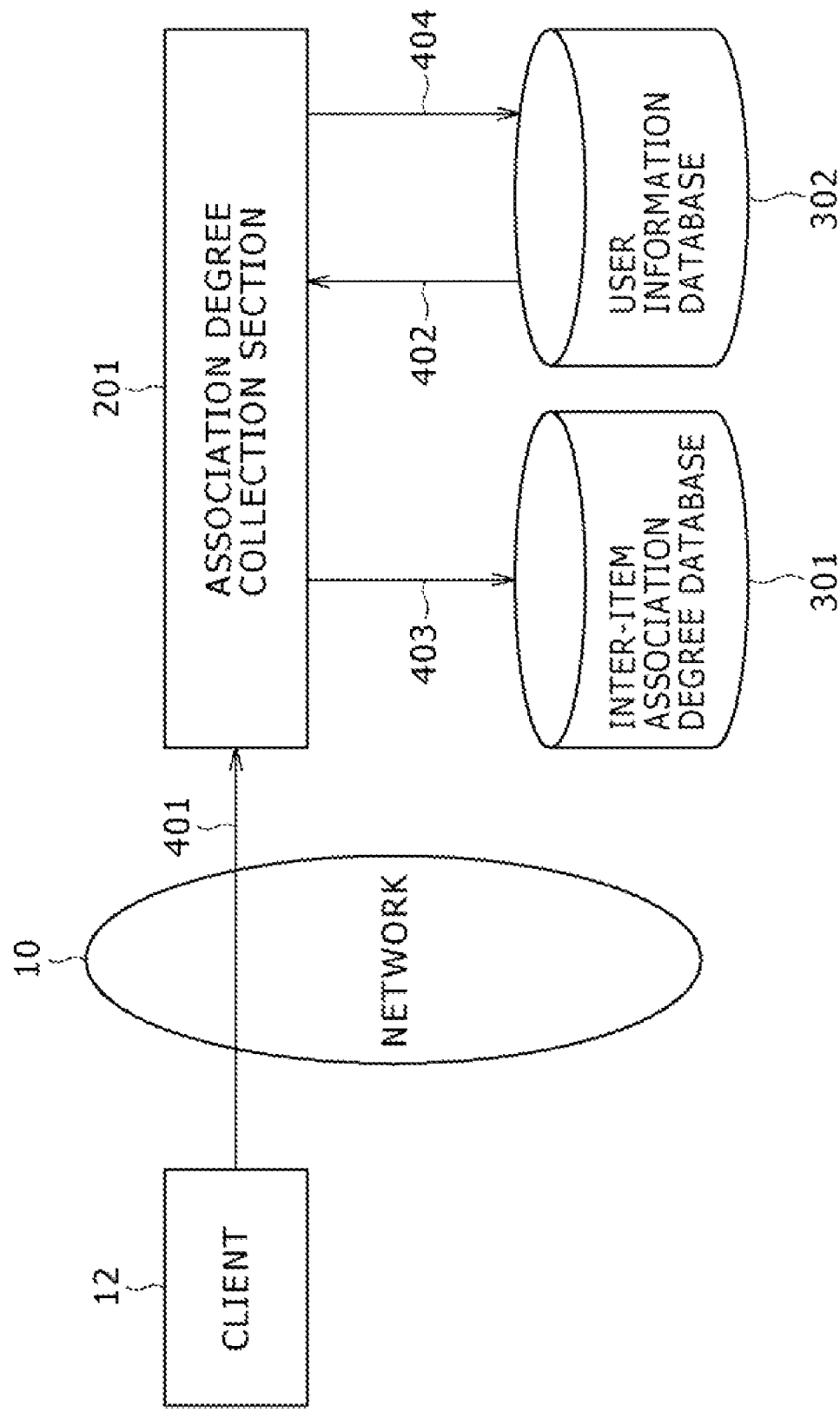
FIG. 7 is a block diagram illustrating an example of a manner of operation of functional blocks which participate in the association degree application process.

After the association degree application process is started, the association degree collection section 201 of the server 11 accepts association degree evaluation at step S1. As seen in FIG. 7, the client 12 designates a combination of items to be associated with each other through the network 10 and issues a request to apply an association degree between the items (arrow mark 401). The association degree collection section 201 of the server 11 acquires the request from the user. It is to be noted that, in the following description, the association degree applied between an item $0i$ and another item $0j$ by a user u is represented by $w^u_{ij}$.

At this time, $w^u_{ij}$ is an index representing that a higher value thereof indicates a higher association degree. For the value of $w^u_{ij}$, predetermined domains common to the system such as, for example, integral values of "1" to "5" may be provided or an arbitrary real number may be provided without particularly providing a limitation thereto.

When the association degree evaluation is accepted, the association degree collection section 201 performs point limitation decision at step S2. In particular, the association degree collection section 201 acquires a currently possessed point of the user of the requesting source for the association degree request from the user information database 302 as seen in FIG. 7 (arrow mark 402) and decides whether or not the association degree application by the current request has a value exceeding the point.

If application of an association degree is permitted unconditionally, then there is the possibility that, for example, each user may apply the highest association degree between all items. In such an instance, the associations between items may become useless to item introduction and the server 11 may come to fail to recommend a comparatively appropriate item to the user of the client 13.

Therefore, in order to prevent application of such a random appreciation degree by a user as just described, the server 11 manages the total value of association degrees applied by each user as a user point and limits the total value of association degrees which can be applied by the user. In particular, the server 11 allocates a predetermined user point number to each user in advance and decrements the user point every time the user applies an association degree while inhibiting such application of an association degree which makes the user point negative.

After such limitation decision regarding the user point is performed, the association degree collection section 201 decides at step S3 whether or not the limitation is exceeded. If the association degree collection section 201 decides that the limitation is not exceeded, then the processing advances to step S4, at which the association degree collection section 201 updates the association degree in accordance with the request from the client 12. In particular, the association degree collection section 201 updates the inter-item association degree database 301 so as to apply the association degree between the items according to the request as seen in FIG. 7 (arrow mark 403). Thereupon, the association degree is retained in such a matrix form that association degrees from the item $0i$ to the item $0j$ make components of i rows and j columns although the association degrees may actually be retained in any data structure in the database.

The inter-item association degree database 301 stores association degrees between items as values for individual users by whom the association degrees are applied and further stores total values and/or average values or the like as common values to the users of all clients of the item introduction system 1. For example, where a sum total T of association degrees applied by all users between certain items is calculated and stored, the inter-item association degree database 301 calculates the sum total T using the following expression (1):

$$T = \sum_u (w^u_{ij}) \qquad (1)$$

Meanwhile, for example, where an average value M of association degrees applied by all users between certain items is calculated and stored, the inter-item association degree database 301 uses the following expression (2) to calculate the average value M:

$$M = \sum_u (w^u_{ij}) / |Uij| \qquad (2)$$

where $|Uij|$ is the number of users by whom an association degree between the item $0i$ and the item $0j$ is applied.

It is to be noted that the relationship between the item $0i$ and the item $0j$ may be regarded as a symmetrical relationship such that a common association degree may be applied to the ij component (a relationship wherein the item $0i$ is the association source and the item $0j$ is the association destination) and the ji component (a relationship wherein the item $0j$ is the association source and the item $0i$ is the association destination). Or, the relationship between the item $0i$ and the item $0j$ may be regarded as an unsymmetrical relationship such that different association degrees are applied to the ij component and the ji component independently of each other, that is, the degree by which the item $0j$ is associated with the item $0i$ and the degree by which the item $0i$ is associated with the item $0j$ are different from each other.

After the inter-item association degree database 301 is updated, the association degree collection section 201 decrements the user point at step S5. In particular, as seen in FIG. 7, the association degree collection section 201 updates the user information database 302 so as to decrement the user point of the user by whom the association degree is applied by the applied value of the association degree (arrow mark 404). After the user information database 302 is updated, the association degree collection section 201 ends the association degree application process.

On the other hand, if the association degree collection section 201 decides at step S3 that the limitation is exceeded, for example, the user point becomes negative, in the user point limitation decision at step S2, then it ends the association degree application process immediately without applying the requested association degree.

The user point described above may be any point only if it limits application of an association degree by a user, and what entity is provided particularly to the user point or in what manner the user point is managed may be determined arbitrarily. This depends, for example, upon the configuration of the system by which the present invention is implemented or the substance of a service. Further, if it can be anticipated that random application of an association degree by any user is not performed, then such point limitation as described above can be omitted.

As described above, the item introduction system 1 performs recommendation of a content based on a history of application of an association degree by a user assuming that the act of applying an association degree by the user indicates a liking of the user. For item recommendation to a user, a method which is based on a short period context (situation of information accessing or the like) in the situation and another method which is based on a long period liking of a user are available. It is to be noted that a liking of a user can be represented by an average vector of meta data of contents enjoyed (and decided to be favorable) by the user till then as disclosed in Patent Document 1 mentioned hereinabove or a nature of a user (for example, whether the user likes a best-selling content or a minor content or the like). The nature of a user is acquired, for example, by causing the user to input it in advance or by deciding the nature based on a tendency and/or transition of the history of the user.

Meanwhile, methods for item recommendation to a user can be technically divided into content based filtering based on meta data and collaborative filtering which is based on estimation of similar behaviors of a user without using meta data.

Or, it is possible to apply weighting to an item based on application of association degrees by a user. In this instance, for example, if an association degree from the item $0i$ to the item $0j$ is applied, then a higher evaluation may be provided to the item $0i$ based on an assumption that a greater amount of information may be applied to a comparatively favorable item, or conversely a higher evaluation may be applied to the item $0j$ based on another assumption that an association degree may be applied so that information may flow to a favorable item. Or otherwise, a high evaluation degree may be applied to both of the item $0i$ and the item $0j$ based on a further assumption that both of the item $0i$ and the item $0j$ are favorable to the user.

Now, a recommendation method of an item to a user is described. First, description is given of recommendation of an item carried out by content based filtering of representing, where meta data are applied to individual contents, a liking of a user by a sum total or an average of meta data of contents enjoyed by the user and determining whether or not a content should be recommended to the user based on the inner product or the cosine similarity degree of a liking of the user and an unknown content.

An example of a flow of a presentation process to be executed by the server 11 for introducing an item to the client 13 by content based filtering is described with reference to FIG. 8. Also FIGS. 9 to 15 are referred to as occasion demands.

Figure 9:
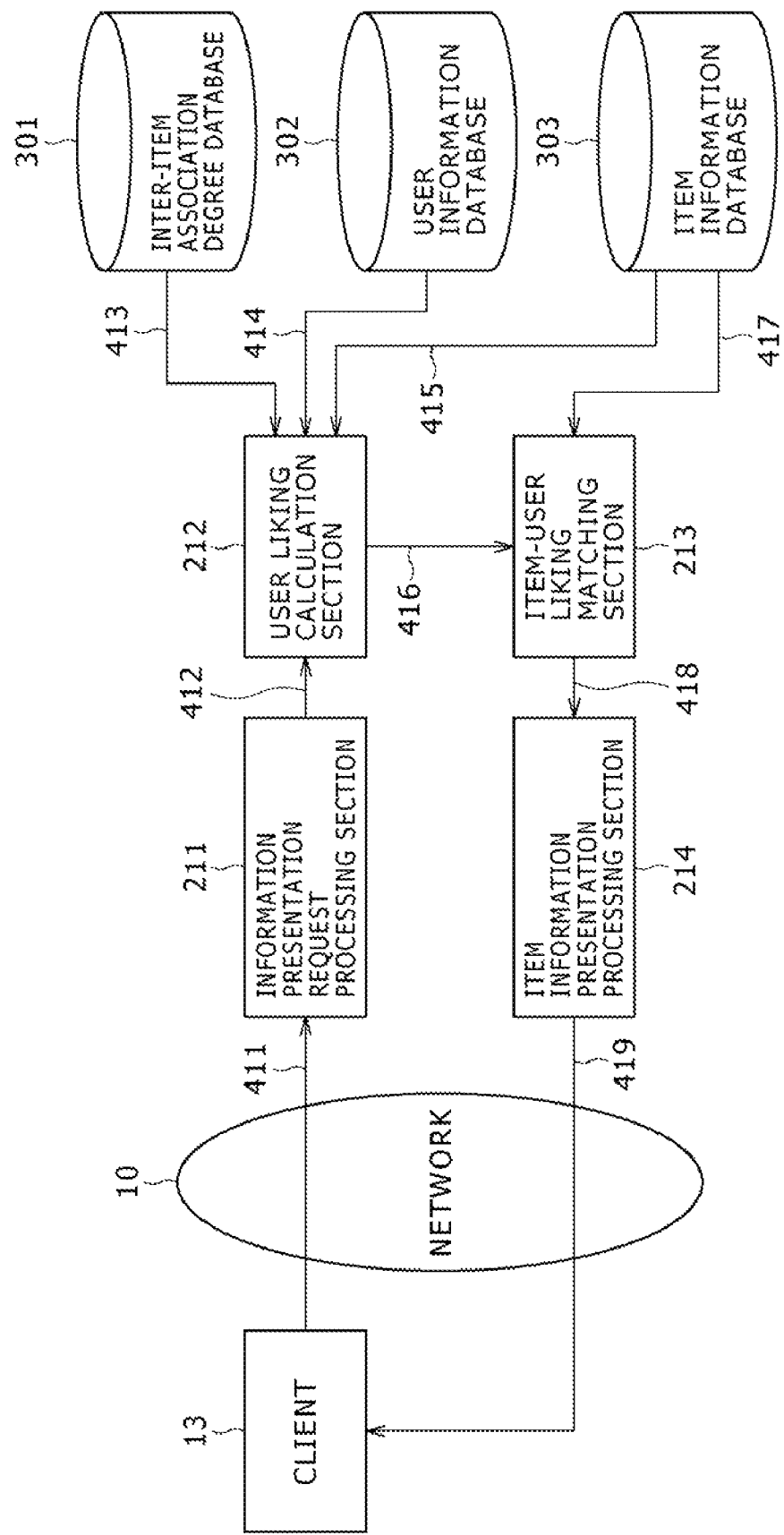
FIG. 9 is a block diagram illustrating an example of a manner of operation of functional blocks which participate in the presentation process.

After the presentation process is started, the information presentation request processing section 211 of the content based filtering processing section 202 accepts an information presentation request at step S21. As seen in FIG. 9, the client 13 uses a Web browser to issue a request for presentation of information relating to a list of items conforming to liking of the user to the network 10 as indicated by an arrow mark 411. After the request is accepted, the information presentation request processing section 211 issues a notification of the request to the user liking calculation section 212 as indicated by an arrow mark 412.

Figure 8:
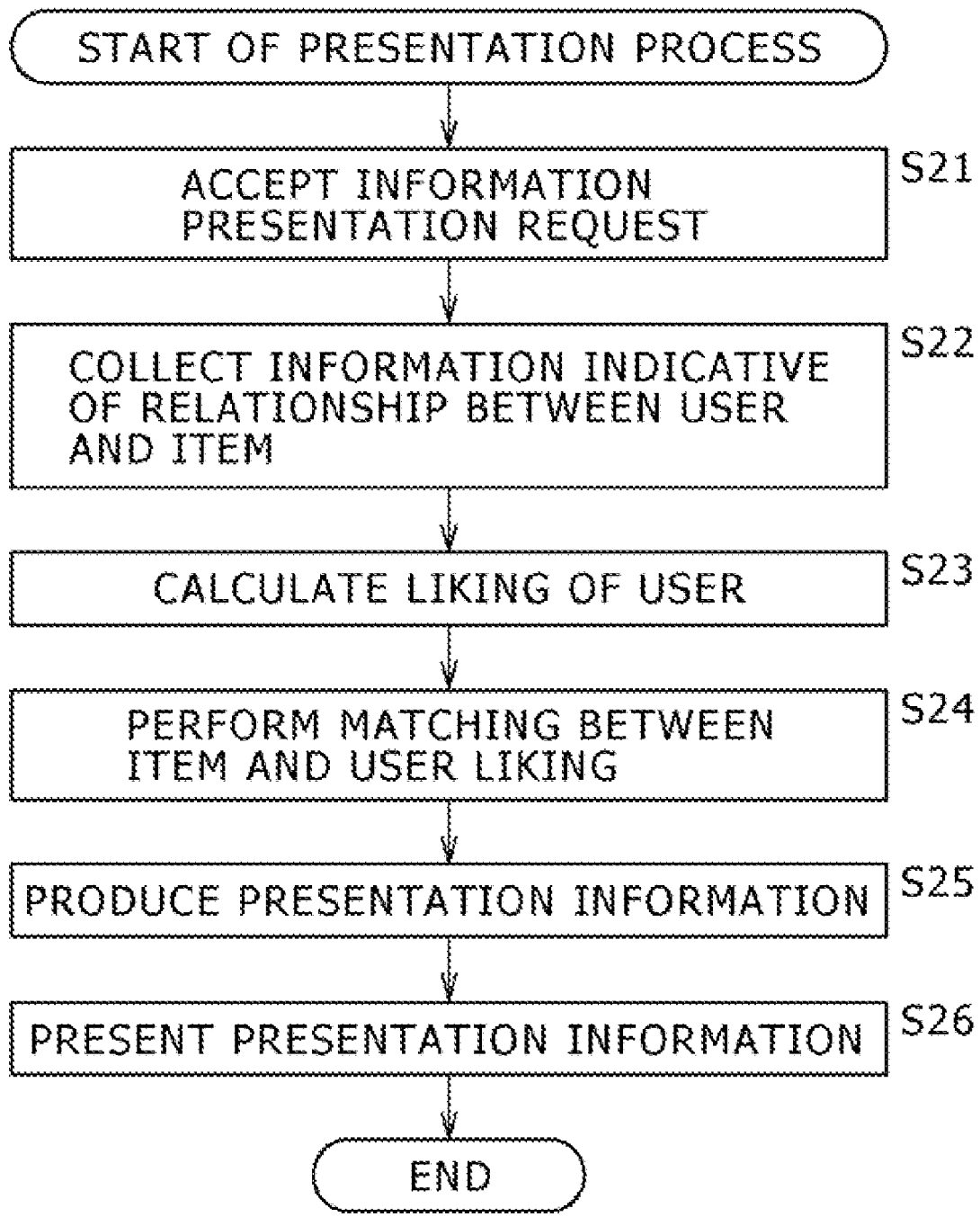
FIG. 8 is a flow chart illustrating an example of a flow of a presentation process.

When the notification is accepted, the user liking calculation section 212 acquires information representative of the user and items necessary to calculate a liking of the user of the client 13 which is the source of the request at step S22 of FIG. 8. For example, the user liking calculation section 212 accesses the inter-item association degree database 301 to acquire information of the association degrees applied by the user of the client 13 (arrow mark 413 in FIG. 9). Then, the user liking calculation section 212 accesses the content based filtering processing section 202 to acquire information regarding the user of the client 13 as indicated by an arrow mark 414 of FIG. 9. Further, the user liking calculation section 212 accesses the item information database 303 to acquire information of the items whose association degree is applied by the user of the client 13, that is, the items on the opposite sides to the item whose association degree is applied as indicated by an arrow mark 415 of FIG. 9.

After the necessary information is acquired, the user liking calculation section 212 calculates a liking of the user based on the information at step S23. For example, meta data of a content corresponding to the item is represented by a vector, and a liking of the user is represented as the sum of such vectors similarly, for example, as in the case of the method disclosed in Patent Document 1. Thereupon, the user liking calculation section 212 takes such measures as to multiply an item to which only an association degree is applied by a weight lower than that applied to an item to which an evaluation of "favorable" is provided expressly to determine a liking vector $UP_u$ of the user u in accordance with the following expression (3):

$$UP_u = \sum_{i \in E_u^*} v_i + \lambda_f \sum_{i | w_{ij} \in W^u} v_i + \lambda_t \sum_{j | w_{ij} \in W^u} v_j \qquad (3)$$

where $EU^+$ indicates a set of contents to which an evaluation of "favorable" is provided by the user u expressly, and $\lambda_f$ indicates the weight to the association source item while $\lambda_t$ indicates the weight to the association destination item. It is to be noted that the liking vector $UP_u$ of the user u may be a weighted average of values determined by the right side of the expression (3).

After a liking of the user of the client 13 is calculated as a vector in this manner, the user liking calculation section 212 supplies a result of the calculation to the item-user liking matching section 213 as indicated by an arrow mark 416 of FIG. 9. The item-user liking matching section 213 performs matching of the item and the user liking at step S24. The item-user liking matching section 213 acquires information regarding all or some of the items stored in the item information database 303 as indicated by an arrow mark 417 of FIG. 9 and converts the items into vectors based on the information. Then, the item-user liking matching section 213 decides the compatibility of the liking of the user calculated as the liking vector $UP_u$ by the user liking calculation section 212, that is, whether or not the vectors match with each other.

For example, where the vector representation of the liking of the user u is $UP_u$ and the vector representation of the item $0i$ is vi, the item-user liking matching section 213 calculates the cosine similarity degree Sc in accordance with the following expression (4):

$$Sc = UP_u \cdot v_i / |UP_u| |v_i| \qquad (4)$$

where "·" indicates the inner product. The item-user liking matching section 213 lines up the items depending upon the magnitude of the value of the cosine similarity degree Sc calculated in such a manner as described above and decides N (N is an arbitrary integral number) items which have comparatively high values as items which match with the liking of the user of the client 13, that is, as items which are nearer to the liking of the user than the other items and whose possibility that they may be favorable to the user is high. It is to be noted that the calculation of the similarity degree between an item and a user liking may be performed not only by the method of the cosine similarity degree described hereinabove but also by any technique such as, for example, by a method using a Euclid distance, an intercity distance or the like.

The item-user liking matching section 213 supplies a result of the matching decided as described above, that is, a list of items decided as matching with a liking of the user and arrayed in accordance with the similarity degree as indicated by an arrow mark 418 in FIG. 9. The item information presentation processing section 214 produces presentation information at step S25 and presents the presentation information to the user of the client 13 at step S26. The item information presentation processing section 214 shapes the list of items supplied thereto from the item-user liking matching section 213 in order to present the list to the user to the storage section 113 to form presentation information and supplies the presentation information to the client 13 through the network 10 so as to be presented to the user as indicated by an arrow mark 419 of FIG. 9.

After the presentation information is presented, the item information presentation processing section 214 ends the presentation process.

For example, it is assumed that a liking vector $UP_u$ of the user u produced by evaluation performed by the user u for items of a content having five meta data is calculated as in a table shown in FIG. 10 and vectors of new items (items 10 to 13) which may make an object of recommendation are given as seen in a table shown in FIG. 11. In the tables of FIGS. 10 and 11, "meta 1" to "meta 5" represent meta data of the content different from each other. In this instance, the Euclid distance from the liking vector $UP_u$ from each of the items illustrated in the table of FIG. 11 is such as illustrated in a table shown in FIG. 12.

Further, it is assumed that items 1 to 4 have five data of "meta 1" to "meta 5" as seen in a table shown in FIG. 13. If a user having the liking vector $UP_u$ applies an association degree to a relationship from the item 4 to the item 2 from among the items mentioned and the relationship of the items is fetched with weights of $\lambda_f=0.5$ and $\lambda_t=0.3$ into the liking vector $UP_u$, then the liking vector $UP_u$ is modified to a liking vector $UP_u'$ using the following expression (5) and such a table as seen in FIG. 14 is obtained:

$$UP_u' = (5*UP_u + 0.5*v4 + 0.3*v2)/5.8 \quad (5)$$

Consequently, the Euclid distance between a new item (items 10 to 13) which makes an object of recommendation and the liking vector (modified liking vector $UP_u'$) has such values as seen in a table shown in FIG. 15. In the examples of FIGS. 12 and 15, the priority degree of recommendation of the item 10 and the item 11 varies by modification to the user liking.

By this, even if the user of the client 13 does not perform a search, since associated items more conforming to the liking of the user itself are presented, contents with which the user is satisfied readily can be purchased by a greater amount. In short, the server 11 can present useful information to the user of the client 13.

Now, collaborative filtering of recommending an unknown content to a user using an predictive evaluation value based on a similarity in content evaluation between users without utilizing meta data of contents is described as another example of the recommendation method of an item to a user. In this instance, the server 11 searches for similar users based on the tendency in application of an association degree and recommends those items to which the similar users provide comparatively high evaluation (express evaluation or high association degree) to the user of the client 13.

Figure 16:
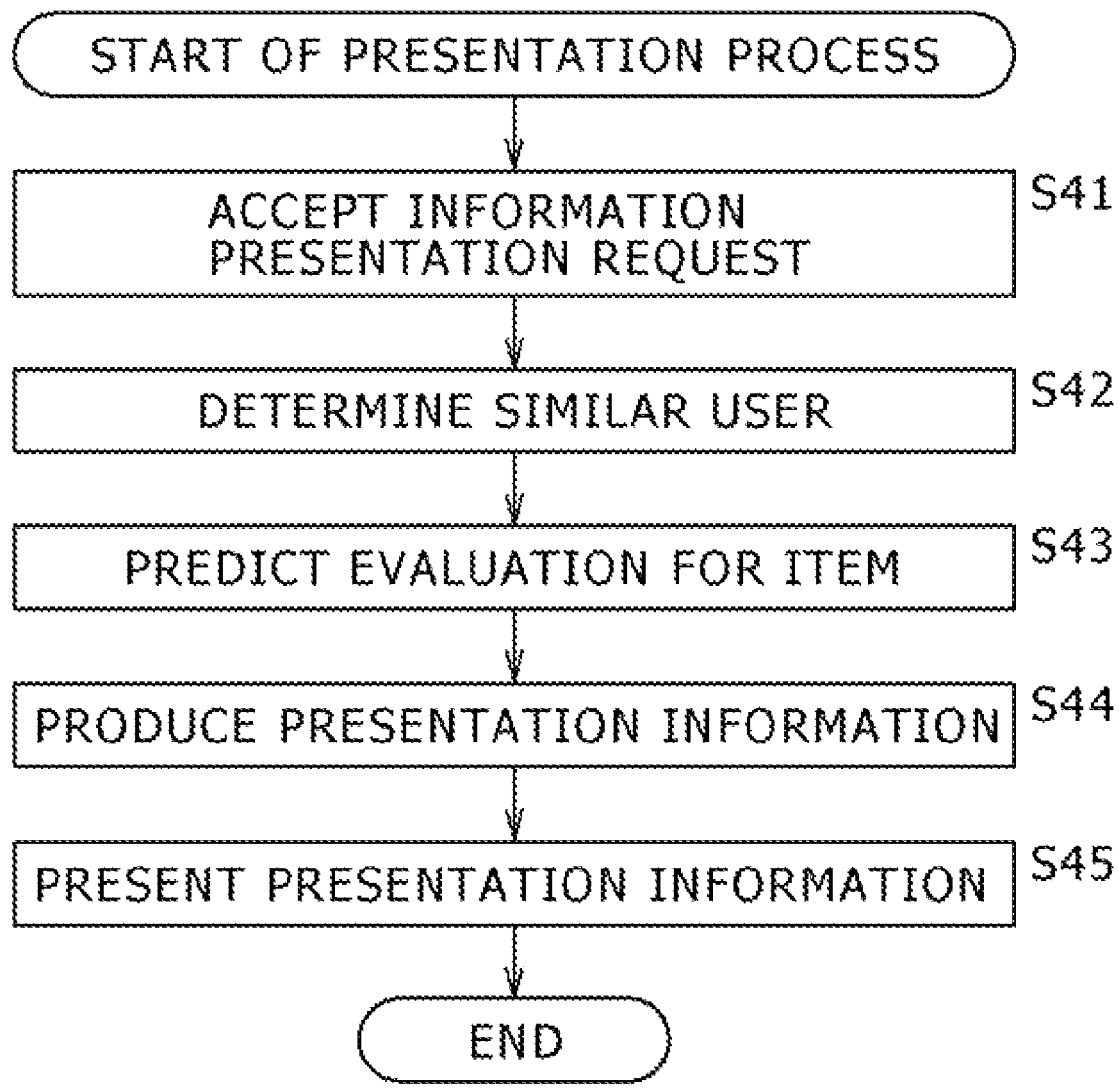
FIG. 16 is a flow chart illustrating another example of the flow of the presentation process.

An example of a flow of a presentation process executed by the server 11 for introducing items to the client 13 by collaborative filtering is described with reference to FIG. 16. Also FIGS. 17 to 22 are referred to as occasion demands.

Figure 17:
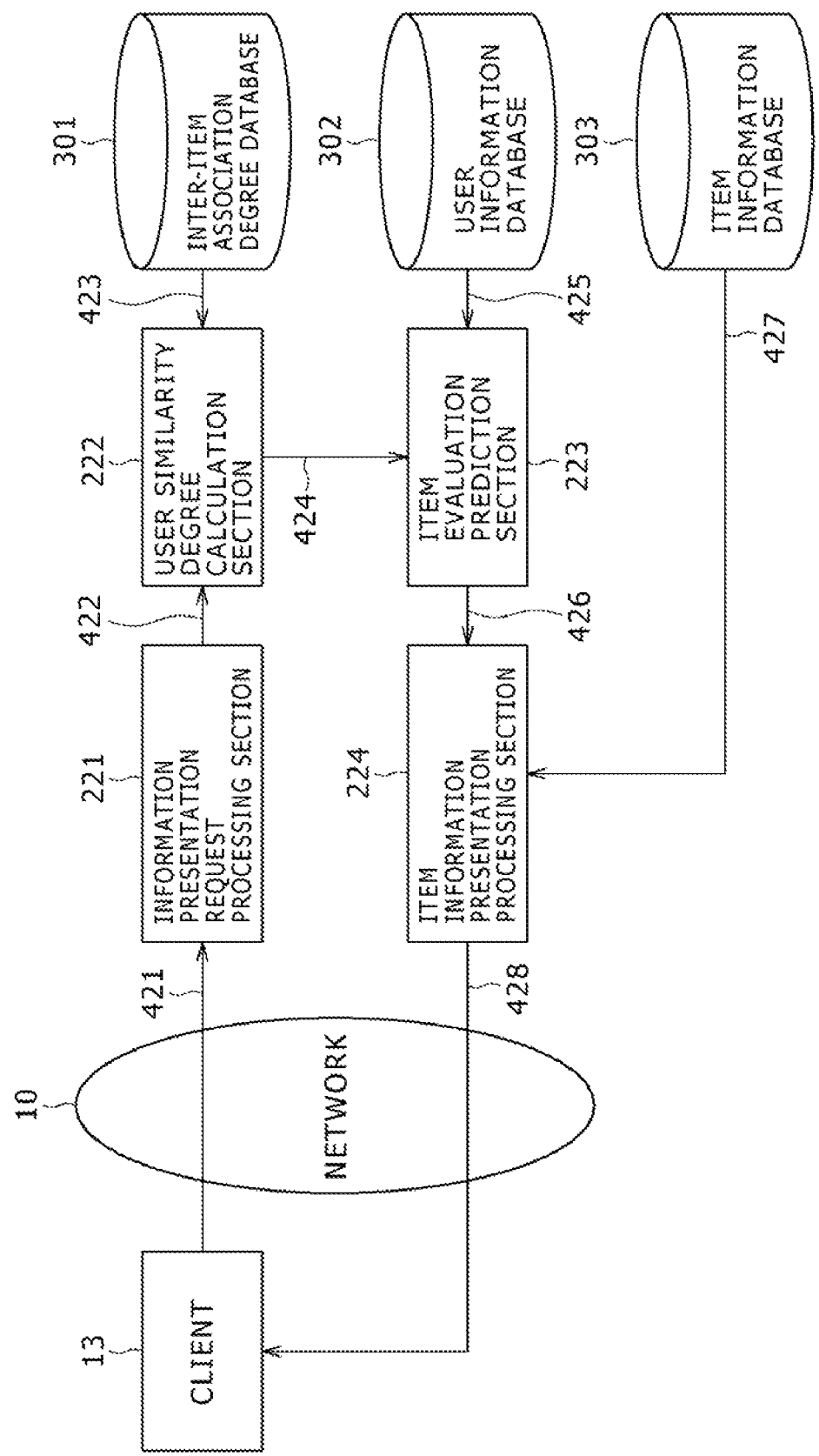
FIG. 17 is a block diagram illustrating an example of the manner of operation of functional blocks which participate in the presentation process of FIG. 16.

After the presentation process is started, the information presentation request processing section 221 of the collaborative filtering processing section 203 accepts an information presentation request at step S41. Referring to FIG. 17, the client 13 uses the Web browser to issue a request for presentation of information regarding a list of items which conform to the liking of the user to the network 10 as indicated by an arrow mark 421. After the request is accepted, the information presentation request processing section 221 issues a notification of the request to the user similarity degree calculation section 222 as indicated by an arrow mark 422.

When the notification is received, the user similarity degree calculation section 222 determines similar users at step S42. In particular, the user similarity degree calculation section 222 accesses the inter-item association degree database 301 to acquire information of the association degree applied by the user of the client 13 and other users as indicated by an arrow mark 423 of FIG. 17. Then, the user similarity degree calculation section 222 calculates a correlation coefficient $r_{uu'}{}'$ between the association degree applied by the user of the client 13 and the association degree applied by each of the other users u' based on the information of the association degree in accordance with the following expressions (6) and (7):

$$r_{uu^*} = \frac{\sum_{i,j|w_{ij}\in W^u \cap W^{u'}} (w_{ij}^u - \overline{w}^u)(w_{ij}^{u'} - \overline{w}^{u'})}{|W^u \cap W^{u'}|\sigma_u \sigma_{u'}} \quad (6)$$

$$\sigma_u = \sqrt{\frac{1}{|W^u|} \sum_{i,j|w_{ij}\in W^u} (w_{ij}^u - \overline{w}^u)^2} \quad (7)$$

The user similarity degree calculation section 222 decides those N (N is an arbitrary natural number) users u' whose correlation coefficient $r_{uu'}{}'$ calculated in this manner is comparatively high as users who are high in similarity to the user u, that is, as similar users. It is to be noted that alternatively a user u' whose value of the correlation coefficient $r_{uu'}{}'$ is higher than a predetermined value determined in advance may be determined as a user having a high degree of similarity to the user u. Or, a function which monotonously decreases in response to the Euclid distance or the cosine distance between association degrees applied commonly may be used as a similarity degree between the users in place of the correlation coefficient $r_{uu'}{}'$ calculated using the expressions (6) and (7).

After users u' having a high similarity degree to the user u are determined, the user similarity degree calculation section 222 further specifies items to which the user u' provides high evaluation (express evaluation or high degree of association) based on the association degrees. For example, the user similarity degree calculation section 222 determines, for each item, an average value of association degrees (or expression evaluation values) applied by the user u' and specifies N (N is an arbitrary natural number) items which have a comparatively high average value as items to which a comparatively high evaluation is provided by the user u', that is, as recommendation items to be recommended to the user u. Alternatively, those items whose average value is higher than a predetermined threshold value determined in advance may be specified as recommendation items.

After users u' having a high similarity degree to the user u, recommendation items to which the user u' provides high evaluation and average values of evaluation values (or similarity degrees) provided by the users u' to the recommendation items are determined in this manner, the user similarity degree calculation section 222 supplies the determined information to the item evaluation prediction section 223 as indicated by an arrow mark 424 of FIG. 17. The item evaluation prediction section 223 performs weighted averaging of the similarity degrees between the users to estimate evaluation of the recommendation items of the user u at step S43. In particular, the item evaluation prediction section 223 accesses the user information database 302 to acquire an average value of the evaluation values for each item provided by the user u as indicated by an arrow mark 425 in FIG. 17. The item evaluation prediction section 223 uses an average value of the evaluation values provided by the user u, an average value of the evaluation values provided by each user u' for each recommendation item and the correlation coefficient $r_{uu'}$ to perform arithmetic operation in accordance with the following description (8) to predict a prediction evaluation value for the recommendation items of the user u:

$$\hat{e}_{ui} = e_u + \frac{\sum_{u'} r_{uu'}(e_{u'i} - \overline{e}_{u'})}{\sum_{u'} r_{uu'}} \quad (8)$$

where $\hat{e}_{ui}$ is the predictive evaluation value for the recommendation item i of the user u, $\overline{e}_u$ the average value of the evaluation values of the user u, and $e_{u'i}$ the average value of the evaluation values of the users u' for the recommendation item i.

It is to be noted that, for example, a correlation coefficient of the association degree and a weighted average of correlation coefficients of evaluation values or the like may alternatively be used to predict a predictive evaluation value for a recommendation item i of the user u.

After the item evaluation prediction section 223 predicts a predictive evaluation value for the recommendation item i of the user u as described above, it supplies the predictive evaluation value to the item information presentation processing section 224 as indicated by an arrow mark 426 of FIG. 17. When the predictive evaluation value is acquired, the item information presentation processing section 224 produces presentation information at step S44 and presents the presentation information at step S45. In particular, the item information presentation processing section 224 accesses the item information database 303 to acquire information of each recommendation item as indicated by an arrow mark 427 of FIG. 17 and produces a list of the recommendation items. Then, the item information presentation processing section 224 shapes the list of the recommendation items in response to the predictive evaluation values supplied from the item evaluation prediction section 223 in order to present the list of the presentation items thereby to produce presentation information. Then, the item information presentation processing section 224 supplies the presentation information to the client 13 through the network 10 so that it is presented to the user as indicated by an arrow mark 428 of FIG. 17.

After the presentation information is presented, the item information presentation processing section 224 ends the presentation process.

An example of the presentation process where the number of users is three (users u1 to u3) is described more particularly. It is assumed that the user u1 applies an association degree between items (w) as seen in a table shown in FIG. 18; the user u2 applies an association degree between items (w) as seen in a table shown in FIG. 19; and the user u3 applies an association degree between items (w) as seen in a table shown in FIG. 20. At this time, such association degrees as illustrated in a table of FIG. 21 are applied by the users between those items between which an association degree is applied by the user u1. In the table shown in FIG. 21, for example, w31 indicates a direction from the item 3 toward the item 1 between the item 3 and the item 1.

Accordingly, the correlation coefficients of the user u2 and the user u3 to the user u1 are such as illustrated in a table shown in FIG. 22. Here, if the evaluation of a new item by the user u2 is "5" and that by the user u3 is "2" while the average value of evaluation values provided by the user u1 is "2.9" and those by the user u2 and the user u3 are "3.1" and "3.3", respectively, then the predictive evaluation value $EV_{u1}$ of the user u1 is calculated in accordance with the following expression (9):

$$EV_{u1}=2.9+(0.891*(5-3.1)-0.45*(2-3.3))/(0.891+0.45)=4.599 \quad (9)$$

The server 11 predicts an evaluation value of the user u for recommendation contents to which similar users who are similar to the user of the client 13 provide high evaluation, shapes a list of the recommendation contents based on the predictive values and presents the list to the user of the client 13. By this, even if the user of the client 13 by itself does not perform a search, since associated items suitable for the liking of the user itself are presented, the user can readily purchase a greater number of contents with which the user is satisfied. In other words, the server 11 can present useful information to the user of the client 13.

Further, the server 11 may set, to an association degree between items or to a user, a reliability degree by which the association degree or the user is satisfactory.

First, a method of calculating the degree of reliability of an association degree applied between items is described. This is a value common to all users.

Figure 23:
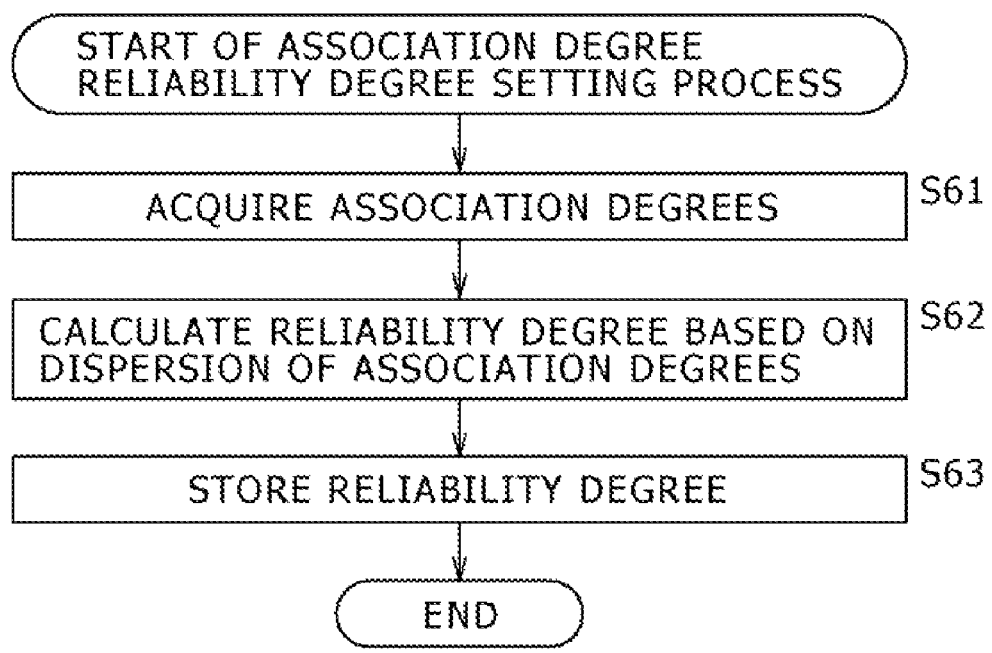
FIG. 23 is a flow chart illustrating an example of a flow of an association degree reliability degree setting process.

An example of a flow of an association degree reliability degree setting process executed by the association degree reliability degree calculation section 231 of the reliability degree processing section 204 in order to calculate the association degree of the reliability degree which is a degree of reliability with regard to the reliability degree applied between items is described with reference to FIG. 23. Further, reference is had also to FIGS. 24 to 26 as occasion demands.

Figure 24:
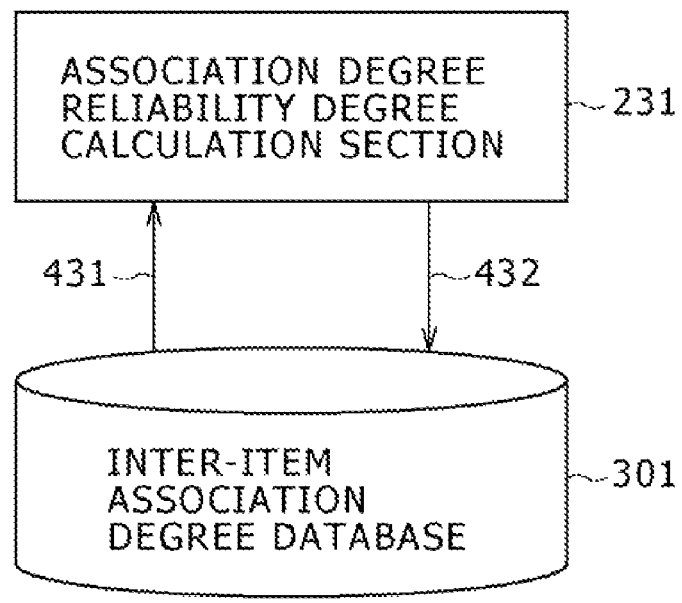
FIG. 24 is a block diagram illustrating an example of a manner of operation of functional blocks which participate in the association degree reliability degree setting process.

The association degree reliability degree calculation section 231 of the reliability degree processing section 204 acquires the association degree between the item 0i and the item 0j from the inter-item association degree database 301 as indicated by an arrow mark 431 in FIG. 24 at step S61. At step S62, the association degree reliability degree calculation section 231 calculates the reliability degree based on a dispersion of the association degrees. Then at step S63, the association degree reliability degree calculation section 231 stores the calculated reliability degree into the inter-item association degree database 301 as indicated by an arrow mark 432 and then ends the association degree reliability setting process.

For example, if a plurality of users apply an association degree between the same items and there is a limitation to the value of the association degree, then the association degree reliability degree calculation section 231 calculates the dispersion value $\sigma_{ij}^2$ in accordance with the following expres sion (10) in order to determine the dispersion of the association degree applied between the same items:

$$\sigma_{ij}^2 = \frac{1}{|U_{ij}|} \sum_{u \in U_{ij}} (w_{ij}^u - \overline{w}_{ij})^2 \quad (10)$$

Then, the association degree reliability degree calculation section 231 calculates the reliability degree of the dispersion of the reliability degree of the combination of the items among the users such as a reciprocal number of the dispersion value $\sigma_{ij}^2$ or an exponential function exp $(-\sigma_{ij}^2)$ utilizing a monotonously decreasing function. For example, if it is assumed that an association degree is applied as seen in a table shown in FIG. 25 by all users, then such reliability degrees of the association degrees determined utilizing an exponential function as seen in a table shown in FIG. 26 are obtained. It is to be noted that, where a reliability degree is calculated in this manner, it is necessary to store the values of the reliability degree by the individual users into the inter-item association degree database 301.

Now, calculation of a reliability of a user is described. The reliability of a user can be represented, for example, by a displacement of the tendency of the user from the tendency of the association degree of all users.

Figure 27:
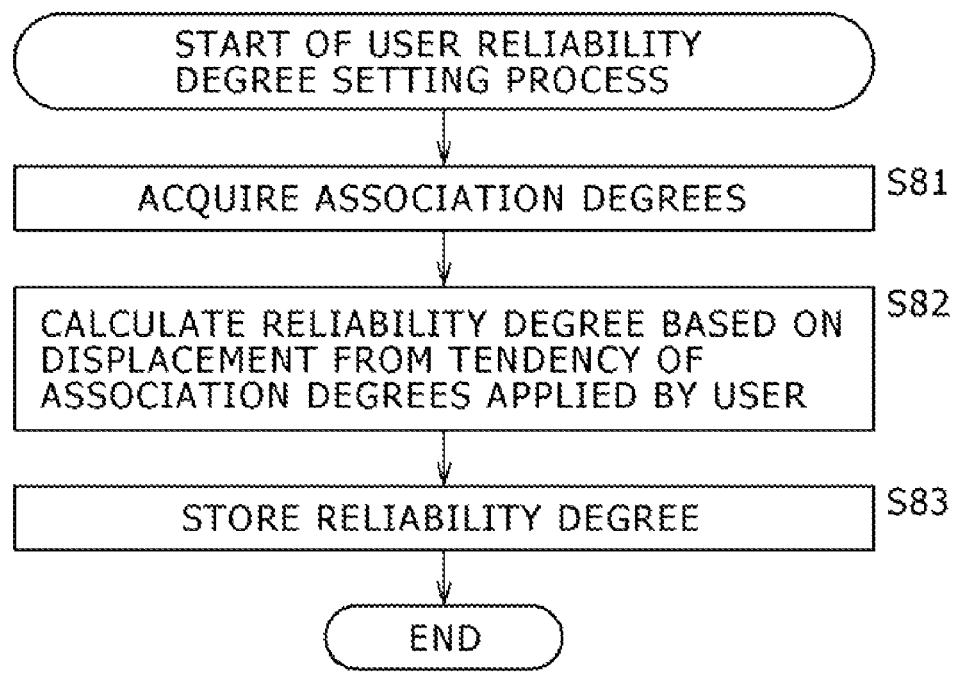
FIG. 27 is a flow chart illustrating an example of a user reliability degree setting process.

Now, an example of a flow of a user reliability degree setting process for calculating the reliability degree of a user is described with reference to a flow chart of FIG. 27. In the following description, also FIGS. 18, 25 and 28 to 31 are referred to as occasion demands.

Figure 28:
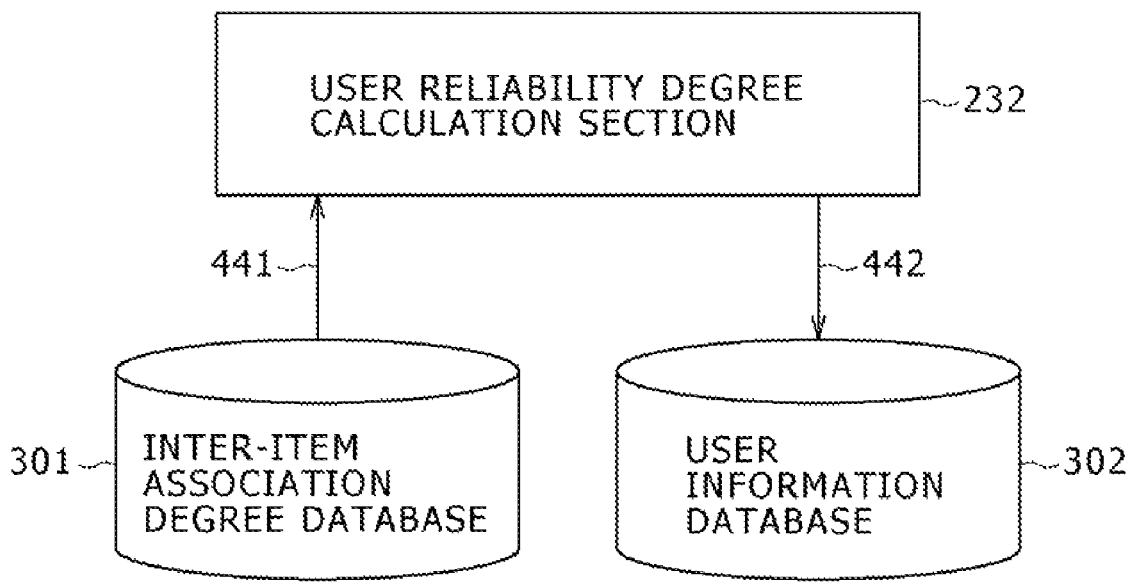
FIG. 28 is a block diagram illustrating an example of a manner of operation of functional blocks which participate in the user reliability degree setting process.

After the user reliability degree setting process is started in order to calculate the reliability degree of a certain user, the user reliability degree calculation section 232 accesses the inter-item association degree database 301 as indicated by an arrow mark 441 in FIG. 28 at step S81 to acquire all reliability degrees applied between each two items. Then at step S82, the user reliability degree calculation section 232 calculates the reliability degree of the association degree applied by the user between each two items based on a displacement of the association degree from the tendency of the association degree of all users.

For example, where the association degree by the user u of the reliability degree between the item 0$i$ and the item 0$j$ is represented by $w_{ij}^u$, the user reliability degree calculation section 232 first calculates an average value of absolute values of deviations from the association degree using the following expression (ii):

$$\overline{d}_u = \frac{1}{|W^u|} \sum_{i,j|w_{ij} \in W^u} \frac{|w_{ij}^u - \overline{w}_{ij}|}{\sqrt{\sum_u (w_{ij}^u - \overline{w}_{ij})^2 / |U_{ij}|}} \quad (11)$$

where $\overline{d}_u$ is the average of absolute values of deviations from the association degree, $\overline{w}_{ij}$ is the average of association degrees of the item 0$i$ and the item 0$j$, $W^u$ is a set of association degrees applied by the user u, and $|W^u|$ is the number of the association degrees. Then, the user reliability degree calculation section 232 calculates the reliability degree $C_u$ of the user u using the following expression (12):

$$c_u = \frac{1}{\overline{d}_u} \quad (12)$$

For example, if the user u applies association degrees as indicated by the table shown in FIG. 18 and all users including the user u add the association degrees as seen in a table shown in FIG. 25, then such averages of the association degrees added by all users between the items as seen in FIG. 29 are obtained. Further, such standard deviations of the association degrees applied by all users between the items as seen in FIG. 30 are obtained. Furthermore, such deviations of the association degrees added by the user u as seen in a table shown in FIG. 31 are obtained. As a result, the value of the reliability degree CU of the user u is calculated in accordance with the following expression (13):

$$C_u=(0.408+1.414+0.816+1.414+0+1)/6=0.842 \quad (13)$$

It is to be noted that the calculation method described above is a mere example, and any calculation method other than the method described above may be used only if it provides a lower reliability degree as the displacement from the tendency of the entirety increases.

After the reliability degree of the user is calculated as described above, the user reliability degree calculation section 232 stores the reliability degree calculated for the user into the user information database 302 as indicated by an arrow mark 442 in FIG. 28. Thereafter, the user reliability degree setting process is ended.

It is to be noted that, although the reliability degree of the association degree and the reliability degree of the user described above may be calculated independently of each other in accordance with such methods as described above, alternatively one of them may be determined, whereafter the determined value is used to determine the other of them.

Where a reliability degree of an association degree is calculated based on the reliability of each user, the reliability degree $c_{ij}$ of the association degree can be calculated, for example, using an average of reliability degrees of all users who contribute to the association degree $w_{ij}$ as indicated by the following expression (14):

$$c_{ij} = \frac{1}{|U_{ij}|} \sum_{u \in U_{ij}} \overline{d}_u \quad (14)$$

On the contrary, where the reliability degree of each user is to be calculated from reliability degrees applied for each association degree, the reliability degree $C_u$ of the user u can be calculated, for example, using an average of reliability degrees of association degrees applied by the user u as indicated by the following expression (15):

$$c_u = \frac{1}{|W^u|} \sum_{i,j|w_{ij} \in W^u} c_{ij} \quad (15)$$

As described above, reliability degrees applied to individual association degrees and reliability degrees applied to individual users can be converted mutually therebetween.

The reliability degrees calculated in this manner can be utilized, for example, for such recommendation of associated items to be presented to the user as described above. For example, in the collaborative filtering described hereinabove, the reliability degree of the user may be utilized for calculation of a predictive evaluation value. In other words, where two users have similar similarities with regard to a certain user, the accuracy in prediction is enhanced by causing the estimation value of the user having a high priority degree to be reflected with a high degree on the predictive evaluation value.

Figure 32:
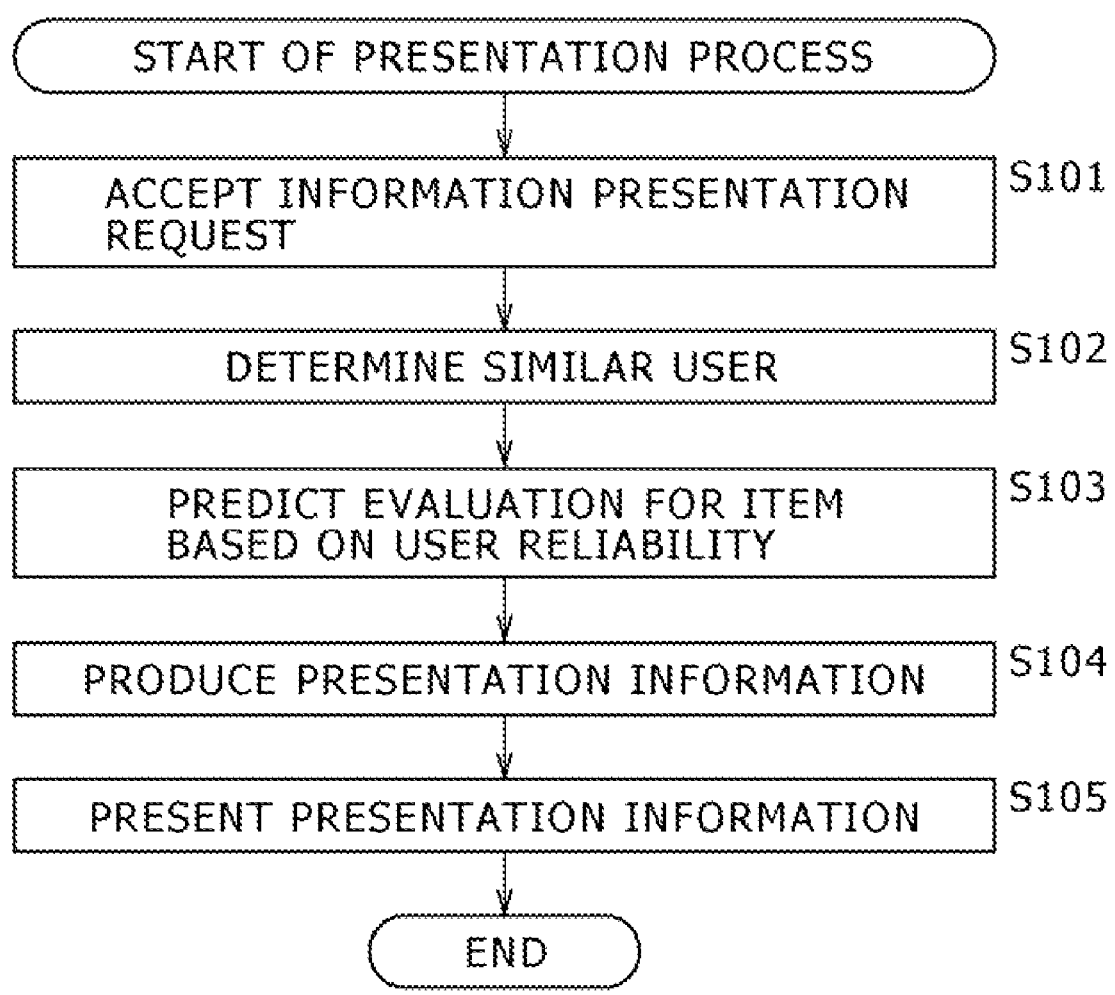
FIGS. 32 and 33 are flow charts illustrating different examples of the flow of the presentation process.

A flow of a presentation process in this instance is described with reference to FIG. 32. It is to be noted that the present presentation process corresponds to the presentation process described hereinabove with reference to the flow chart of FIG. 16.

In particular, the information presentation request processing section 221 accepts an information presentation request from the client 13 similarly as at step S41 and issues a notification of the information presentation request to the user similarity degree calculation section 222 at step S101. At step S102, the user similarity degree calculation section 222 determines similar users using the expressions (6) and (7) similarly as at step S42 and then determines an average value of association degrees or expression evaluation values applied by the similar users u'. Further, the user similarity degree calculation section 222 specifies recommendation items to which the similar users u' provide high evaluation (express evaluation or high association degree), and supplies information of the recommendation items to the item evaluation prediction section 223.

At step S103, the item evaluation prediction section 223 predicts the predictive evaluation value for the recommendation items of the user u using the reliability degree $C_u$ of the user u by arithmetic operation of the following expression (16) instead of arithmetic operation of the expression (8) conducted for prediction:

$$\hat{e}_{ui} = e_u + \frac{\sum_{u'} c_{u'} r_{uu'}(e_{u'i} - \bar{e}_{u'})}{\sum_{u'} c_{u'} r_{uu'}} \quad (16)$$

If it is assumed here that, where such association degrees as seen in the tables shown in FIGS. 18 to 20 are applied by the three users u1 to u3, respectively, the evaluation of a new item by the user u2 is "5" and that by the user u3 is "2" while the average values of evaluation values provided by the users u1 to u3 are "2.9", "3.1" and "3.3", respectively, as described hereinabove and besides the reliability of the user u2 is "1.3" and that of the user u3 is "0.4", then the predictive evaluation value for the item by the user u1 is calculated using the expression (16) and is determined in accordance with the following expression (17):

2.9+(0.891*(5−3.1)*1.3−0.45*(2−3.3)*0.4)/
(0.891*1.3+0.45*0.4)=4.719 (17)

In short, in this instance, the evaluation of the user u2 is reflected intensely on the predictive evaluation value.

After the item evaluation prediction section 223 predicts predictive evaluation values for the recommendation items i of the user u as described above, it supplies the predictive evaluation values to the item information presentation processing section 224. When the predictive evaluation values are acquired, the item information presentation processing section 224 produces presentation information at step S104 similarly as at step S44, and the display information is displayed at step S105 similarly as at step S45.

After the presentation information is presented, the item information presentation processing section 224 ends the presentation process.

Since a reliability degree is calculated and utilized for selection of items to be recommended to the user in this manner, the server 11 can present items which are comparatively conforming to the liking of the user and are estimated to be satisfied likely by the user. In other words, the server 11 can present information very useful to the user.

It is to be noted that the server 11 may otherwise present such reliability degrees as described above expressly to the user so as to assist the decision of the user. For example, if user reliability degrees are calculated and it is indicated clearly to what degree the users are reliable, a user to whom items are to be presented can decide the reliability of the association degree applied between the items depending upon the users by whom the reliability degrees are applied. For example, if a table of association degrees applied by a user is displayed in a profile page or the like of the user together with the reliability degree of the user, then the user of the client 13 to whom items are to be introduced can readily grasp by what degree the association degrees may be taken into consideration.

Further, the server 11 may present the reliability degree to a user not in the form of a numeral or character but in the form of adjustment of the display of the presentation information which is based on the reliability degree.

Figure 35:
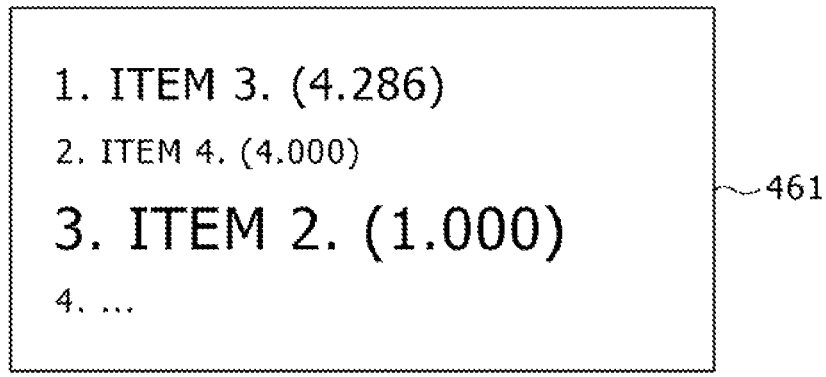
FIG. 35 is a schematic view illustrating an example of presentation information.

An example of a flow of a presentation process of recommending items using the content based filtering in this instance is described with reference to FIG. 33. The flow chart of FIG. 33 corresponds to that of FIG. 8. Also FIGS. 34 and 35 are referred to in the following description as occasion demands.

After the presentation process is started, the information presentation request processing section 211 of the content based filtering processing section 202 accepts an information presentation request as indicated by an arrow mark 451 in FIG. 34 at step S121 similarly as at step S21. Then, the information presentation request processing section 211 issues a notification of the information presentation request to the user liking calculation section 212 as indicated by an arrow mark 452 in FIG. 34.

When the notification is received, the user liking calculation section 212 acquires information representative of the relationship between the users and the items from the inter-item association degree database 301, user information database 302 and item information database 303 as indicated by an arrow marks 453 to 455 in FIG. 34 at step S122 similarly as at step S22.

After the information is acquired, the user liking calculation section 212 calculates a liking of the user based on the information and supplies a result of the calculation to the item-user liking matching section 213 as indicated by an arrow mark 456 in FIG. 34 at step S123 similarly as at step S23. The item-user liking matching section 213 acquires all information stored in the item information database 303 or information relating to some items from within the information from the item information database 303 as indicated by an arrow mark 457 in FIG. 34 at step S124 similarly as at step S24. Then, the item-user liking matching section 213 performs matching between the items and the user liking and supplies a result of the matching, that is, a list of those items determined as matching with the liking of the user and arrayed in accordance with the similarity degree, to the item information presentation processing section 214 as indicated by an arrow mark 458 in FIG. 34.

The item information presentation processing section 214 produces presentation information at step S125 similarly as at step S25.

After the presentation information is produced, the item information presentation processing section 214 acquires the reliability degrees from the inter-item association degree database 301 at step S126 as indicated by an arrow mark 459 in FIG. 34 and then adjusts the display based on the reliability degree at step S127.

For example, a list of items arrayed in accordance with the similarity degree may be displayed such that the size of characters of each item therein is set in response to the reliability degree of the item as in the case of presentation information 461 illustrated in FIG. 35. Or, the color or the font may be set in response to the reliability degree of each item. On the contrary, the list of items may be sorted in order of the reliability degree while the size or color of the display is varied in response to the association degree. Furthermore, the display size of a display image of a mark or an image (album jacket) representative of an item, the resolution of an image, the saturation, lightness or the like of a color or the like may set in response to the reliability degree.

After the display of the list of items is adjusted in response to the reliability degree in this manner, the item information presentation processing section 214 presents the presentation information to the user of the client 13 at step S128 as indicated by an arrow mark 460 in FIG. 34.

After the presentation information is presented, the item information presentation processing section 214 ends the presentation process.

Figure 36:
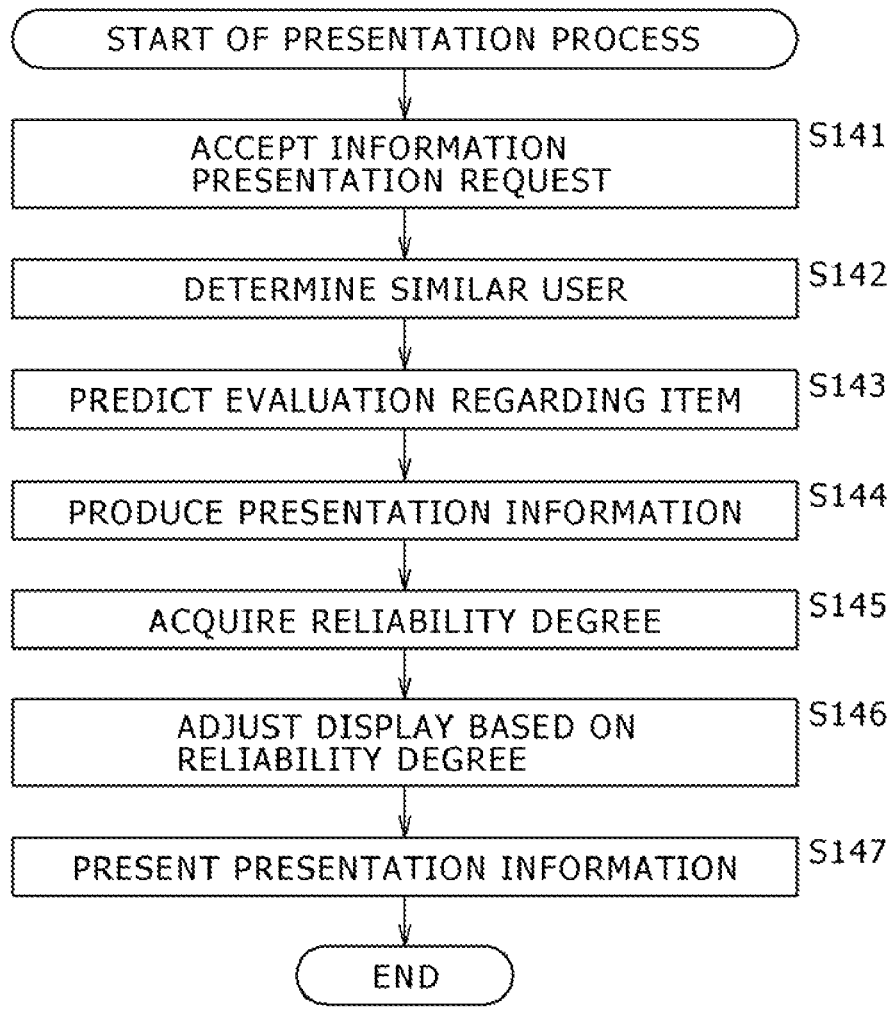
FIG. 36 is a flow charts illustrating a still further example of the flow of the presentation process.

Now, an example of a flow of a presentation process of recommending items using the collaborative filtering is described with reference to FIG. 36. It is to be noted that the flow chart of FIG. 36 corresponds to that of FIG. 16. Also FIG. 37 is referred to in the following description as occasion demands.

The components of the collaborative filtering processing section 203 perform the processes at steps S141 to S144 similarly as at steps S41 to S44.

Figure 37:
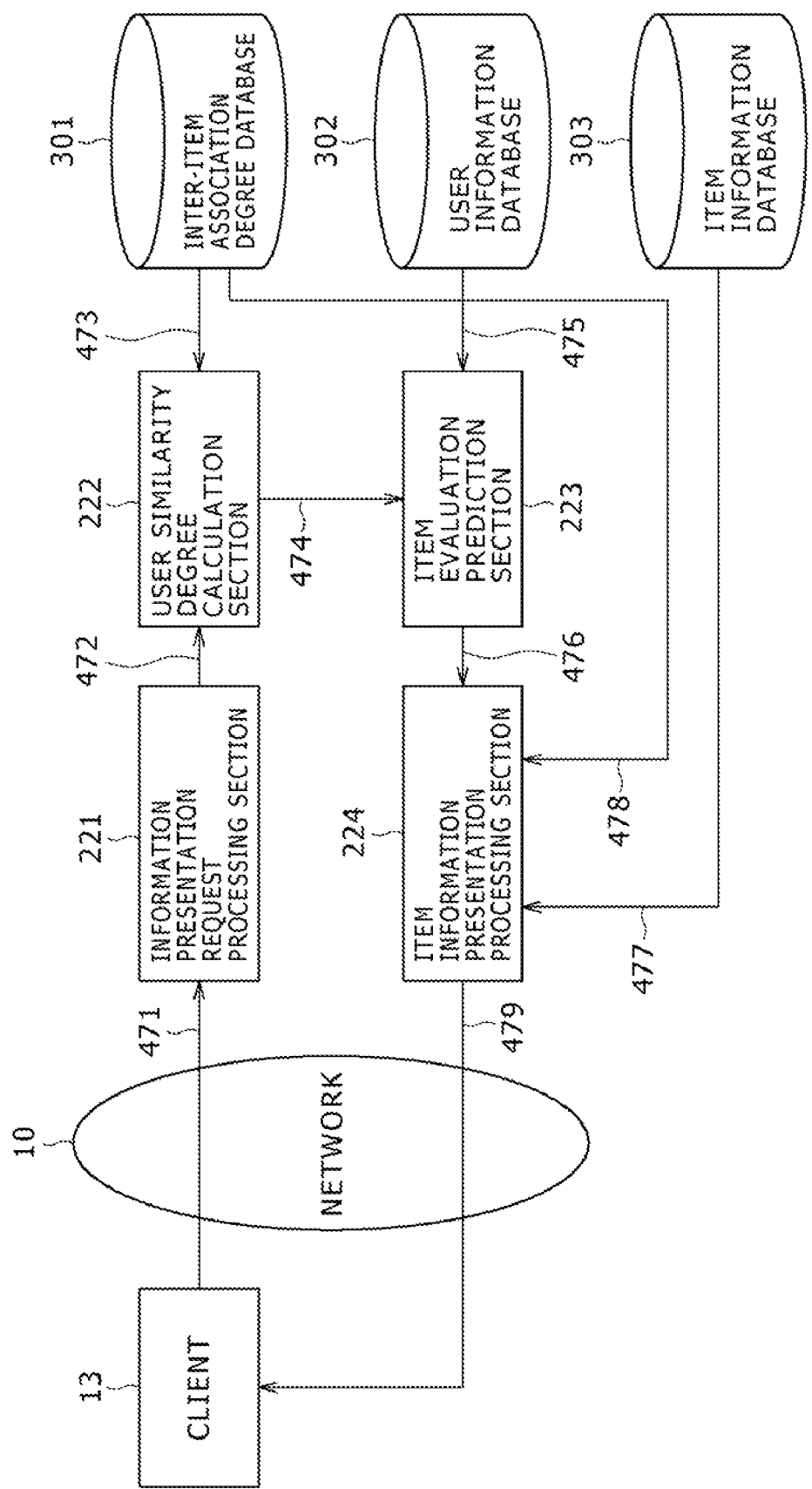
FIG. 37 is a block diagram illustrating an example of a manner of operation of functional blocks which participate in the presentation process of FIG. 36.

In particular, the information presentation request processing section 221 accepts an information presentation request as indicated by an arrow mark 471 in FIG. 37 and issues a notification of the information processing request to the user similarity degree calculation section 222 as indicated by an arrow mark 472 in FIG. 37 at step S141. Upon reception of the notification, the user similarity degree calculation section 222 acquires information of the association degrees from the inter-item association degree database 301 as indicated by an arrow mark 473 in FIG. 37 at step S142. Further, the user similarity degree calculation section 222 determines users u' similar to the user u of the requesting source, recommendation items to which a high evaluation is provided by the users u' and average values of evaluation values or association degrees provided to the recommendation items by the users u'. Further, the user similarity degree calculation section 222 supplies the thus determined information to the item evaluation prediction section 223 as indicated by an arrow mark 474 in FIG. 37. The item evaluation prediction section 223 acquires an average value of evaluation values provided to the items by the user u as indicated by an arrow mark 475 in FIG. 37 at step S143. Then, the item evaluation prediction section 223 predicts a predictive evaluation value for the recommendation items i for the user u and supplies the predictive evaluation values to the item information presentation processing section 224 as indicated by an arrow mark 476 in FIG. 37.

When the predictive evaluation values are acquired, the item information presentation processing section 224 acquires information of the recommendation items from the item information database 303 as indicated by an arrow mark 477 in FIG. 37 and produces presentation information based on the acquired information at step S144.

After the presentation information is produced, the item information presentation processing section 224 acquires the reliability degrees from the inter-item association degree database 301 as indicated by an arrow mark 478 in FIG. 37 at step S145. Then at step S146, the item information presentation processing section 224 adjusts the display of the presentation information base on the reliability degrees. This adjustment is similar to that in the content based filtering described hereinabove with reference to FIG. 35, and therefore, overlapping description of such adjustment is omitted herein to avoid redundancy.

After the presentation information is shaped, the item information presentation processing section 224 supplies the presentation information to the client 13 through the network 10 as indicated by an arrow mark 479 in FIG. 37 so as to be presented to the user at step S147. Then, the presentation process is ended.

As a technique for converting a relative relationship in a set such as a set of association degrees between items described hereinabove into an absolute coordinate in a vector space or a probability space, a main coordinate analysis, a SAM (Semantic Aggregation Model) and so forth are available. The main coordinate analysis is disclosed, for example, in Gower J. C., "Multivariate Analysis and Multidimensional Geometry", Statistician, Vol. 17, No. 1, pp. 13 to 28, 1967 (hereinafter referred to as Non-Patent Document 4). The SAM is disclosed, for example, Daichi MOCHIHASHI, "Stoichiometric Representation of Meaning", Natural Language Process of Report of Study of the Information Processing Society of Japan, Vol. 2002, No. 4, 2002 (hereinafter referred to as Non-Patent Document No. 5).

By such techniques, those items which have a high association degree or those items which have a similar tendency in association degree with an item of a third party are disposed at positions near to each other in a vector space or a probability space. Meta data applied newly in this manner reflect, different from those which are determined comparatively objectively, for example, like the genre of music, a subjective sense of the human being or the nature of a community in which a service is provided. Therefore, the meta data can be utilized appropriately in recommendation.

For example, in the SAM, based on co-occurrence frequencies $N(w1, w2)$ (which form a square matrix) of two words w1 and w2, the simultaneous probability $P(w1, w2)$ in which both words w1 and w2 co-occur are represented using a potential random variable z as $P(w1, w2)=\Sigma zP(w1|z)P(w2|z)P(z)$, and a distribution parameter is determined by an EM algorithm. Then, $P(z|w) \propto P(w|z)P(z)$ ($z \in \{z1, z2, \ldots, zK\}$) is regarded as a random representation for the word w (K is the number of occurrence values of the potential random variable z). This is applied to an association between items, and a word is considered as an item and the co-occurrence frequency of the word is made correspond to the association degree between items to obtain a random representation $P(z|0i)$ of the certain item $0i$.

Figure 38:
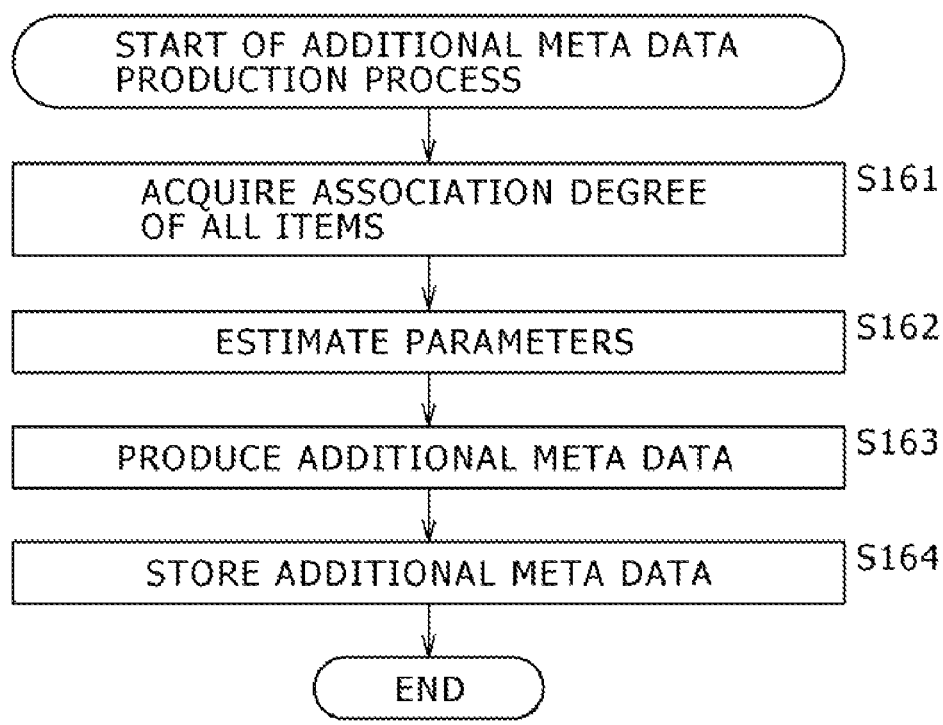
FIG. 38 is a block diagram illustrating an example of a flow of an additional meta data production process.
Figure 39:
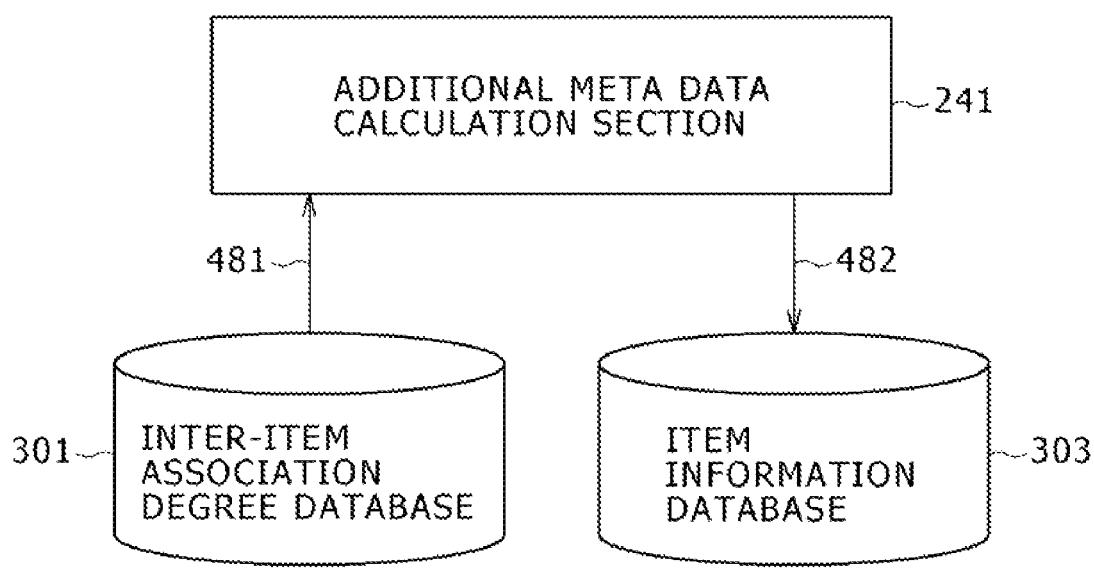
FIG. 39 is a block diagram illustrating an example of a manner of operation of functional blocks which participate in the additional meta data production process.
Figures 41, 42:
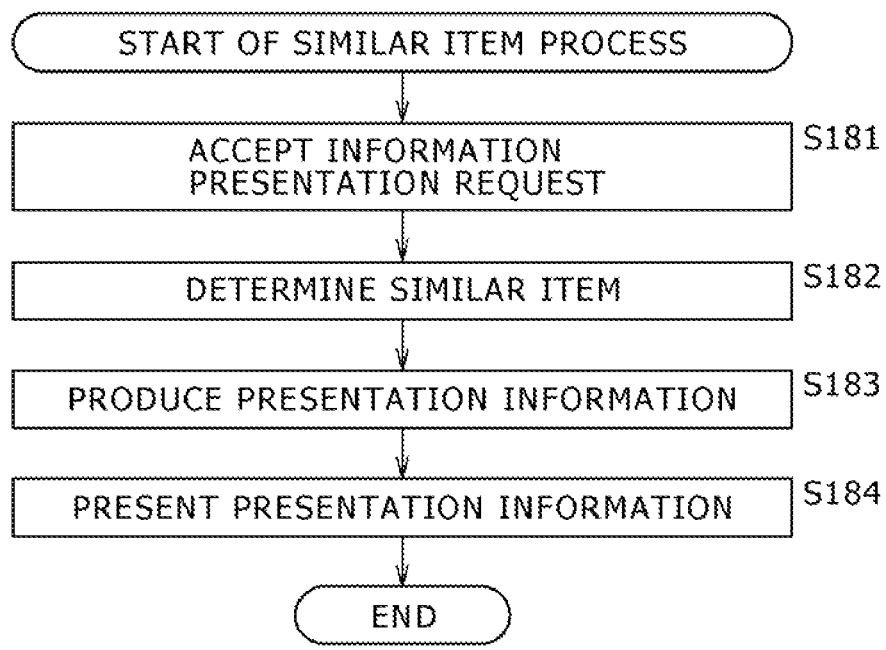
FIG. 41 is a table illustrating an example of additional meta data according to a SAM parameter.
FIG. 42 is a flow chart illustrating an example of a flow of a similar item process.

An example of a flow of an additional meta data production process of producing new meta data (additional meta data) from an association degree between items is described with reference to FIG. 38. As occasion demands, also FIGS. 39 to 41 are referred to in the following description.

After the additional meta data production process is started, the additional meta data calculation section 241 of the additional meta data processing section 205 acquires association degrees of all items at step S161. The additional meta data calculation section 241 accesses the inter-item association degree database 301 to extract all association degrees applied to all items as indicated by an arrow mark 481 of FIG. 39.

After all information of the association degree is acquired, the additional meta data calculation section 241 estimates parameters of the random distribution by such a technique as disclosed, for example, in Non-Patent Document 5 at step S162. Here, P(z), P(0|z) (0∈{01, 02, ... }: all item set, z∈{z1, z2, ..., zK)) are used as parameters.

The additional meta data calculation section 241 determines, for each item 0, a vector whose component is P(z|0) to z∈(z1, z2, ..., zK} as additional data at step S163. After the additional data are produced, the additional meta data calculation section 241 stores the additional data into the user information database 302 at step S164, and then the additional meta data production process is ended.

It is assumed that association degrees are applied symmetrically between items, for example, as seen in a table shown in FIG. 40. Although, in the table 40 shown in FIG. 40, association degrees applied between four items are shown, usually a number of items on the order of 10^2 or more are used in the calculation.

If such association degrees are used to estimate P(z|0) by the SAM with K set to K=4, then the additional meta data calculation section 241 obtains such a result, for example, as illustrated in a table shown in FIG. 41 (since the EM algorithm provides a result which depends upon an initial value, there is no reproducibility). If parameters estimated in this manner are set as meta data of the items after they suitably undergo such processes as normalization, then the item 20 and the item 21 or the item 22 and the item 23 which have a high association degree with each other are disposed at positions proximate to each other in the space.

It is to be noted that, when additional data are produced as described above, the additional meta data calculation section 241 may utilize the reliability degrees with regard to the association degrees, that is, association degree reliability degrees. Since the association degree reliability degree indicates whether or not an association degree between items is sufficiently reliable, the additional meta data calculation section 241 can produce additional meta data having a high degree of accuracy by attaching the importance to those association degrees which exhibit a high reliability degree. For example, where a reliability degree $c_{ij}$ is provided to an association degree $w_{ij}$, the additional meta data calculation section 241 determines the product $w_{ij}c_{ij}$ of them as the association degree applied between the item 0i and the item 0j and produces additional meta data based on the association degree by the method described hereinabove. By this, the additional meta data calculation section 241 can produce additional meta data on which the association degree reliability degree is reflected.

Now, recommendation of similar items which utilizes the additional meta data produced in this manner is described. As a method of recommendation which utilizes a short-term context, for example, a method of presenting link information to an item similar to the item 0i simultaneously, for example, when a request to present information of the item 0i is received is available. Here, the similar item is determined depending upon vector representations of various meta data retained in the item information database 303 and Euclid distances or cosine distances combined with association degrees applied between items by users and/or additional data.

An example of a flow of a similar item process of presenting such similar items as described above is described with reference to FIG. 42. As occasion demands, also FIGS. 43 to 46 are referred to.

Figure 43:
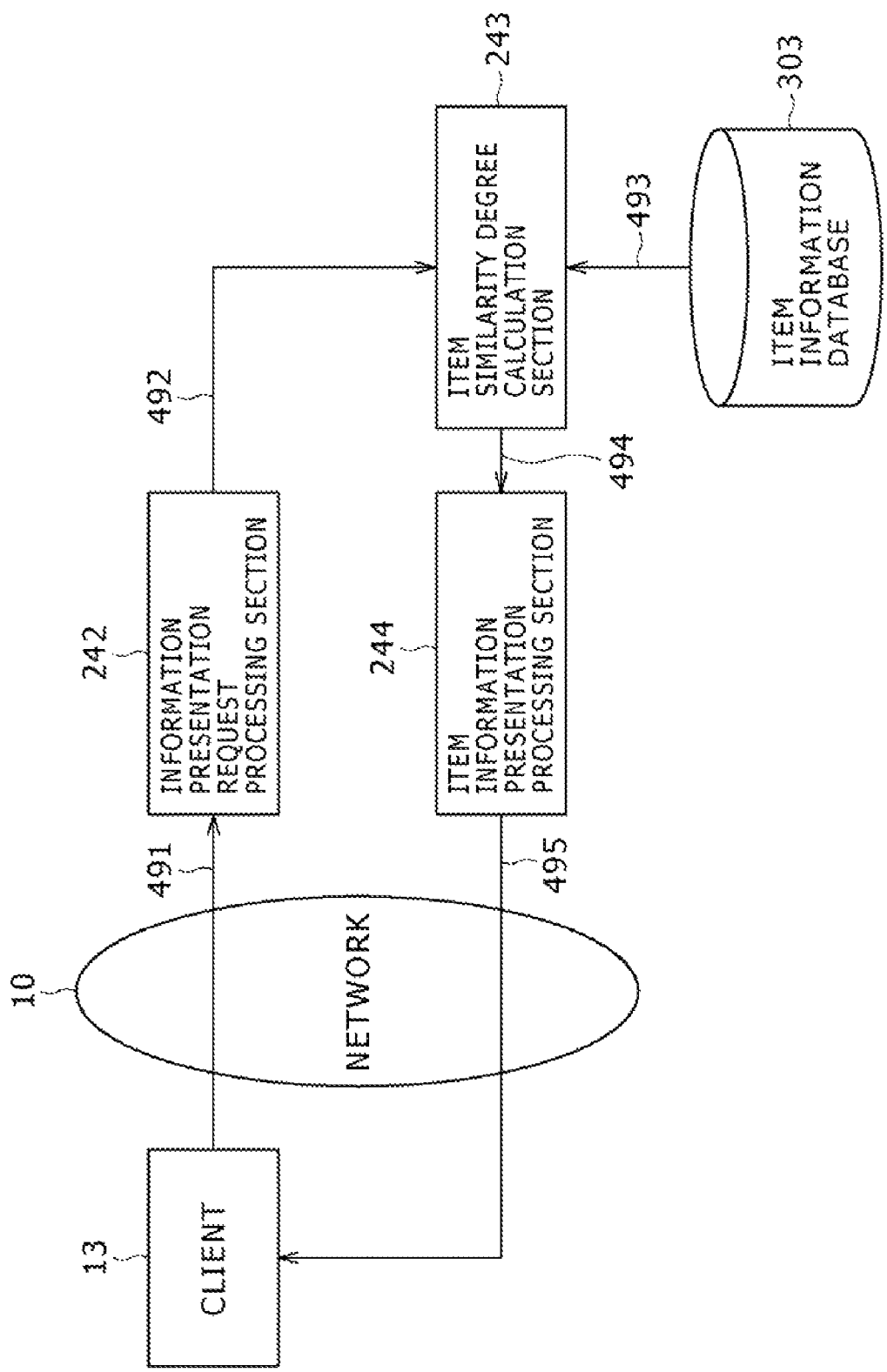
FIG. 43 is a block diagram illustrating an example of a manner of operation of functional blocks which participate in the similar item process.

The information presentation request processing section 242 of the additional meta data processing section 205 accepts an information presentation request regarding the item 0i from the Web browser or the like of the client 13 as indicated by an arrow mark 491 in FIG. 43 at step S181. Further, the information presentation request processing section 242 issues a notification of the information presentation request to the item similarity degree calculation section 243 as indicated by an arrow mark 492 in FIG. 43.

The item similarity degree calculation section 243 determines similar items at step S182. If the vector representation by meta data of the item 0i is represented by $v_i$ and the vector representation of additional meta data by $s_i$ while the association degree from the item 0i to the item 0j is represented by $w_{ij}$, then after the item similarity degree calculation section 243 acquires information of the association degree from the item information database 303 as indicated by an arrow mark 493 in FIG. 43, it determines the Euclid distance $d_E$ in the vector space including additional meta data using the following expression (18). Then, the item similarity degree calculation section 243 sets N (N is an arbitrary natural number) items whose Euclid distance $d_E$ is comparatively short as similar items.

$$d_E = \sqrt{\sum_h (v_{ih} - v_{jh})^2 + \sum_{h'} (v_{ih'} - v_{jh'})^2} \tag{18}$$

It is to be noted that the following expression (19) may be used in place of the Euclid distance of the expression (18) to set N (N is an arbitrary natural number) items having comparatively low values as similar items.

$$\frac{1}{w_{ij}} \sqrt{\sum_h (v_{ih} - v_{jh})^2} \tag{19}$$

where vih is the hth component of the vector vi. The item similarity degree calculation section 243 supplies a list of the N similar items determined in such a manner as described above to the item information presentation processing section 244 as indicated by an arrow mark 494 in FIG. 43.

The item information presentation processing section 244 shapes the list of similar items selected and arrayed as described above to produce presentation information at step S183. Then at step S184, the item information presentation processing section 244 supplies the presentation information to the client 13 through the network 10 as indicated by an arrow mark 495 in FIG. 43 so as to be presented to the user of the client 13.

For example, if it is assumed that meta data represented by such numerical values as seen in a table of FIG. 44 are applied to the items 1 to 4, then the Euclid distance from the item 20 to the items 21 to 23 is such as illustrated in a table shown in FIG. 45. Accordingly, if the items 21 to 23 are arrayed in the descending order of the similarity to the item 20, then they are arrayed in the order of the item 23, item 21 and item 22.

On the other hand, if the additional data are applied in such a manner as seen in the table shown in FIG. 41, then the Euclid distances determined using the expression (18) given hereinabove are such as illustrated in a table shown in FIG. 46. Accordingly, if the items 21 to 23 are arrayed in the descending order of the similarity to the item 20, then they are arrayed in the order of the item 21, item 23 and item 22.

It is to be noted that additional meta data can be utilized also in user liking matching.

Figure 47:
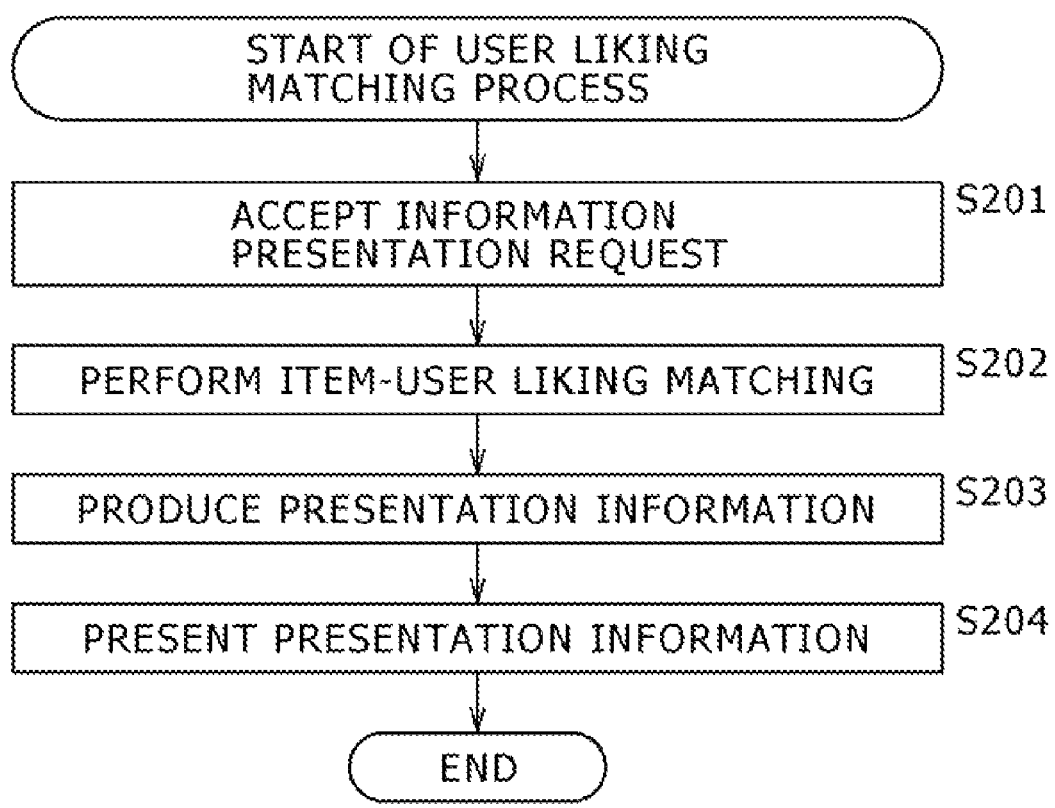
FIG. 47 is a flow chart illustrating an example of a flow of a user liking matching process.

An example of a flow of a user liking matching process which is a presentation process in this instance is described with reference to FIG. 47. As occasion demands, also FIGS. 48 to 52 are referred to.

Figure 48:
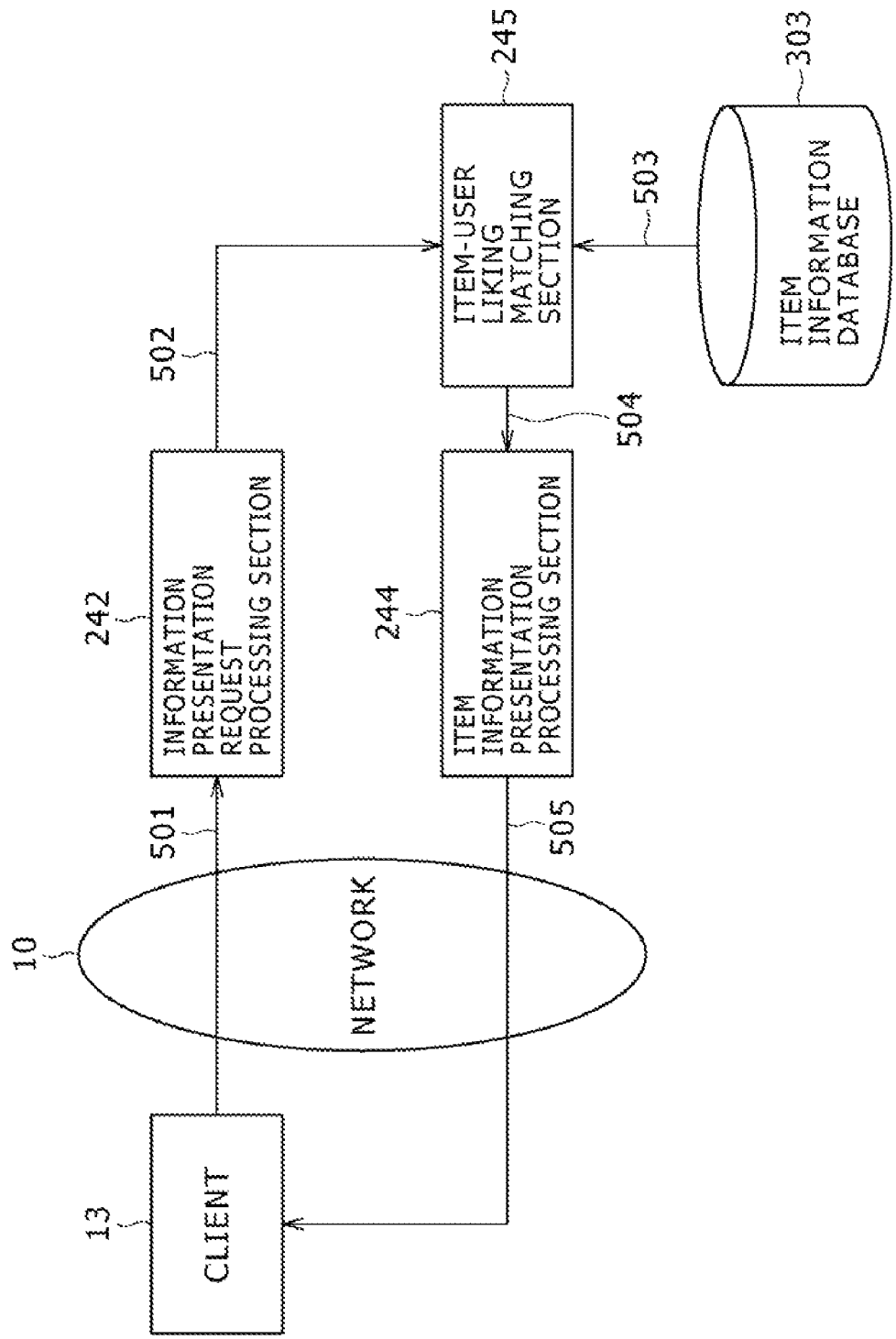
FIG. 48 is a block diagram illustrating an example of a manner of operation of functional blocks which participate in the user liking matching process.

At step S201, the information presentation request processing section 242 accepts an information presentation request for the item 0i from the Web browser of the client 13 or the like as indicated by an arrow mark 501 in FIG. 48. Then, the information presentation request processing section 242 issues a notification of the information presentation request to the item-user liking matching section 245 as indicated by an arrow mark 502 in FIG. 48.

The item-user liking matching section 245 acquires information of all or some of the items from the item information database 303 as indicated by an arrow mark 502 in FIG. 48 and performs item-user liking matching of deciding whether or not each item and the liking of the user match with each other at step S202.

For example, if the liking of the user u in a vector representation is represented by $UP_u$ and the vector representation of the item 0i is represented by vi, then the item-user liking matching section 245 calculates the cosine similarity degree Sc using the expression (4) given hereinabove. Then, the item-user liking matching section 245 determines N (N is an arbitrary integer) items which have comparatively high values of the cosine similarity degree Sc as items which match with the liking of the user. It is to be noted that vi here is a vector formed by joining existing meta data and additional meta data. Further, not the cosine distance but the Euclid distance, the intercity distance or the like may be used to perform matching.

The item-user liking matching section 245 supplies a list of the items matching with the liking of the user as a result of the matching to the item information presentation processing section 244 as indicated by an arrow mark 504 in FIG. 48.

The item information presentation processing section 244 produces presentation information at step S203 and supplies the presentation information to the client 13 through the network as indicated by an arrow mark 505 in FIG. 48 so as to be presented to the user of the client 13 at step S204.

It is assumed that, for example, if existing meta data and additional meta data are individually normalized (dispersion 1, average 0), then such a result as seen in a table shown in FIG. 49 is obtained and such user liking vectors as seen in a table shown in FIG. 50 are obtained. At this time, by conventional matching between contents and the user liking wherein additional meta data are not taken into consideration, such Euclid distances as seen in a table shown in FIG. 51 are obtained, and information of similar items is displayed in an array in order of the item 23, item 20, item 21 and item 22. However, where also additional meta data are involved, such Euclid distances as seen in a table shown in FIG. 52 are obtained, and the information of the similar items is presented in an array in order of the item 20, item 23, item 21 and item 22.

As an example of such additional meta data, an importance degree of an item may be calculated from inter-item association degrees. If an absolute importance degree of an item is determined, then since generally a content which is considered desirable is determined, this is convenient in recommendation in such a case that sufficient liking information may not be obtained or the like. Here, the importance degree is determined based on an idea that "an item evaluated as being associated from many items or an item evaluated as being associated from an important item is important". In order to implement such an idea as just described, for example, the sum total of association degrees in the column/row directions may be taken or a technique of the PageRank (refer to, for example, U.S. Pat. No. 6,285,999) or the HITS (refer to, for example, Kleinberg J., "Authoritative Sources in a Hyperlinked Environment", Journal of the ACM, 46, 1999) may be used. Here, a simplified form of the PageRank is described. It is to be noted that, although the importance degree should be updated every time an association degree varies, it may otherwise be updated in an asynchronous relationship with a change of an association degree from a burden of processing.

Figure 53:
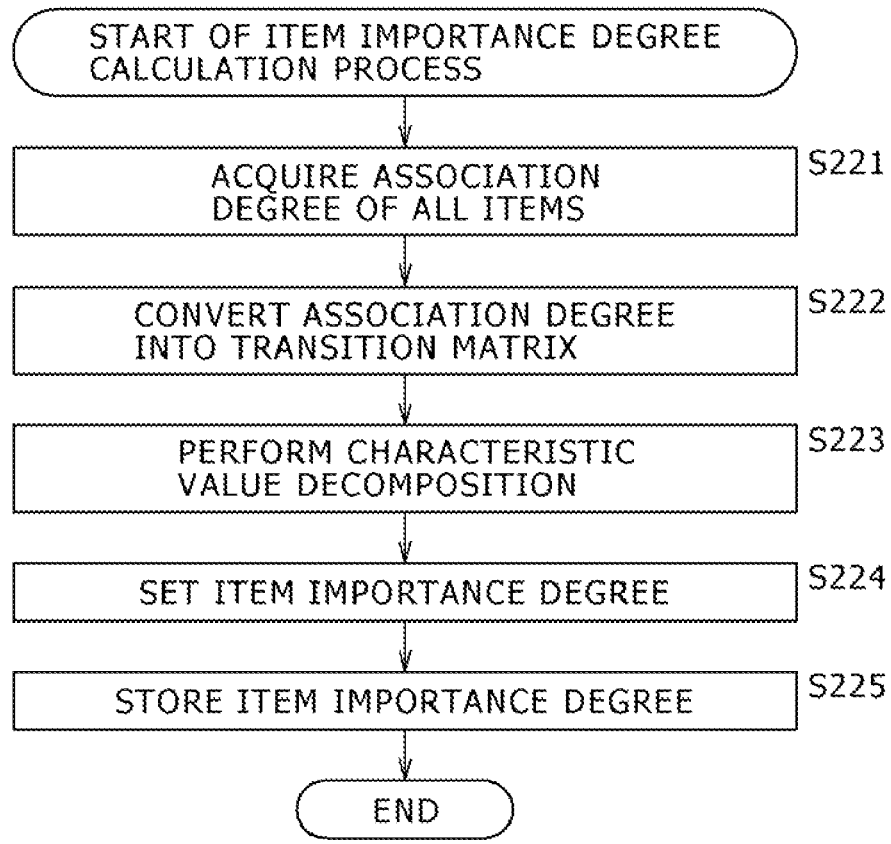
FIG. 53 is a flow chart illustrating an example of a flow of an item importance degree calculation process.

An example of a flow of an item importance degree calculation process executed to calculate such an item importance degree as described above is described with reference to FIG. 53. As occasion demands, also FIGS. 54 to 58 are referred to.

Figure 54:
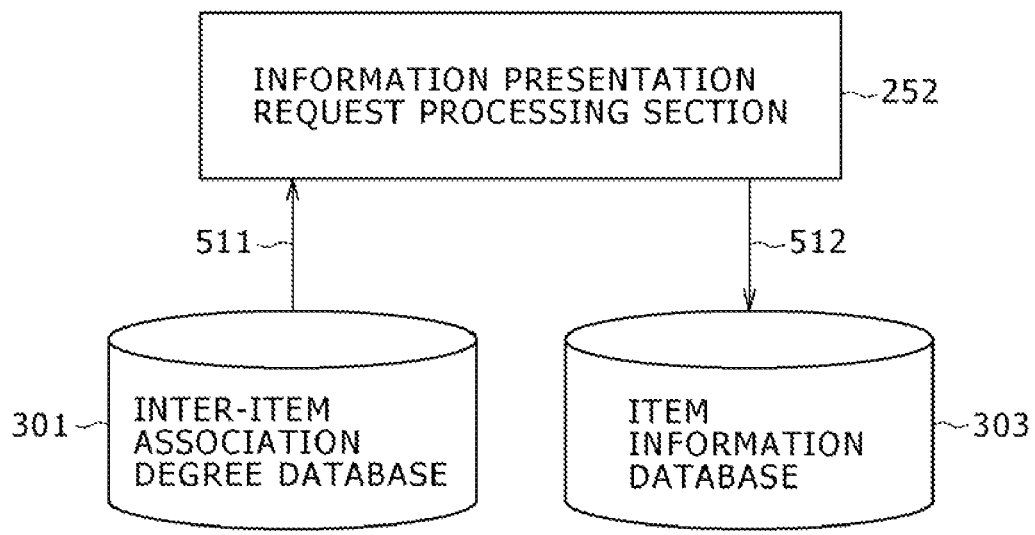
FIG. 54 is a block diagram illustrating an example of a manner of operation of functional blocks which participate in the item importance degree calculation process.

After the item importance degree calculation process is started, the item importance degree calculation section 251 of the item importance degree processing section 206 extracts the association degree information regarding all items from the association degree collection section 201 as indicated by an arrow mark 511 in FIG. 54 at step S221. The association degree extracted here is represented by a matrix W of i rows and j columns where the association degree from the item 0i to the item 0j is represented by $w_{ij}$.

At step S222, the item importance degree calculation section 251 transposes the matrix W of association degrees to produce a transition stochastic matrix W' which is normalized for each column. Further, at step S223, the item importance degree calculation section 251 performs characteristic value decomposition of the transition stochastic matrix W' using a matrix V wherein columns are characteristic vectors and a matrix L which has characteristic values at diagonal components in accordance with the following expression (20):

$$W' = V * L * V - 1 \tag{20}$$

At step S224, the item importance degree calculation section 251 specifies a characteristic vector having a characteristic value whose absolute value is in the maximum and sets the components of the characteristic vector as importance values of the items. Then at step S225, the item importance degree calculation section 251 stores the item importance degrees into the item information database 303 as indicated by an arrow mark 512 in FIG. 54, and then the item importance calculation process is ended.

For example, it is assumed that such sum totals of association degrees applied by all users as seen in a table shown in FIG. 25 are obtained. Here, for the simplified description, it is assumed that four items including the item 1 to the item 4 are involved. If this is the matrix W, then the transition stochastic matrix W' becomes such as shown in FIG. 55. If characteristic value decomposition of this is performed, then the matrix V wherein columns are characteristic vectors becomes such as shown in FIG. 56, and the matrix L which has characteristic values at diagonal components becomes such as shown in FIG. 57. Since the maximum characteristic value is "1", the first column of the matrix V becomes a necessary characteristic vector, and the importance value of the items 1 to 4 becomes "0.723", "0.225", "0.546" and "0.358", respectively, as seen in a table shown in FIG. 58.

It is to be noted that, while, in the foregoing description, the importance degree of an item is determined based on the association degrees by all users, the determination is not limited to this, but, for example, the importance degree may be determined, for example, based on association degrees applied by one user. In this instance, since item importance degrees personalized by each user (item importance degrees for each user) are calculated, if the server 11 performs recommendation of items utilizing the calculated item importance degrees, then recommendation or presentation of comparatively appropriate items can be achieved.

Further, if such a reliability degree of the association degree as described above is utilized, then it is expected that the importance degree with a higher degree of accuracy can be determined. For example, where reliability degrees $c_{ij}$ are associated with association degrees $w_{ij}$, if the item importance degree calculation section 251 performs calculation similar to that described hereinabove using a matrix c wherein the components of the ith rows and the jth columns are provided by the products $w_{ij}c_{ij}$ of the reliability degrees $c_{ij}$ and the association degrees $w_{ij}$ newly as a matrix which represents association degrees, then the association degree reliability degree can be reflected on the calculation of an item importance degree.

The presentation method of an item to the user may be changed in response to the importance degree of the item calculated in such a manner as described above. By this, recommendation with a high degree of convenience can be provided. An example of a flow of an item importance degree presentation correction process executed in order to perform such presentation as just described is described below with reference to FIG. 59. As occasion demands, also FIGS. 60 and 61 are referred to.

Figure 60:
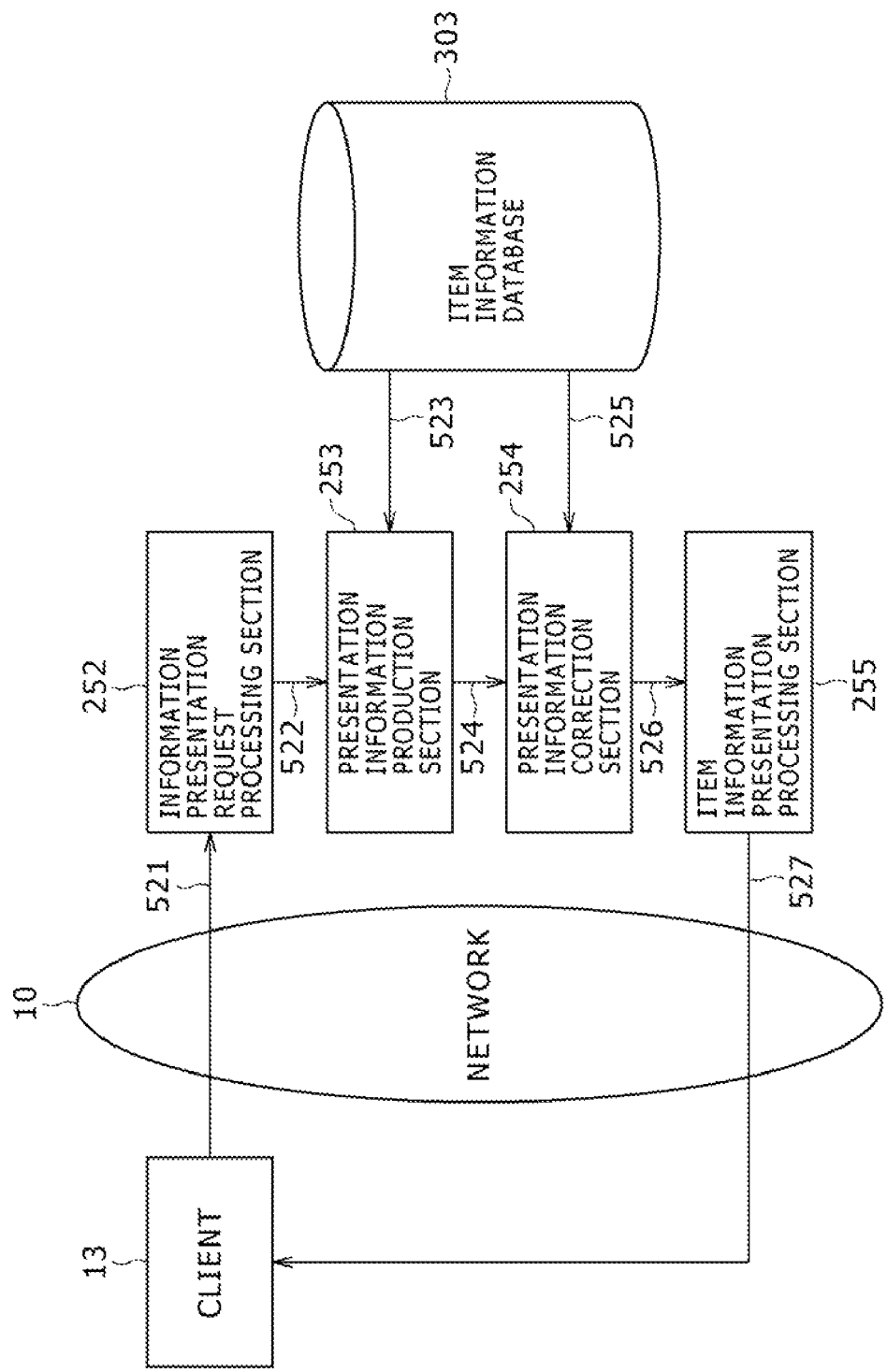
FIG. 60 is a block diagram illustrating an example of a manner of operation of functional blocks which participate in the item importance degree presentation correction process.
Figure 61:
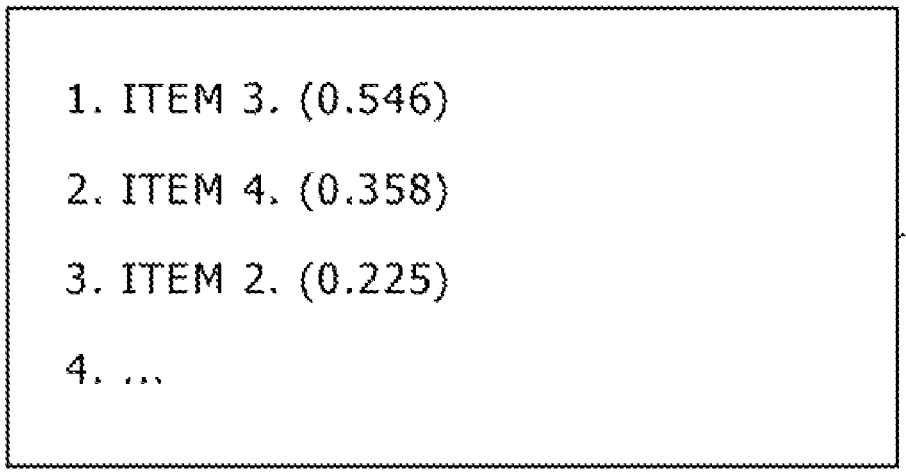
FIG. 61 is a schematic view illustrating another example of the presentation information.

After the item importance degree presentation correction process is started, the information presentation request processing section 252 of the item importance degree processing section 206 accepts an information presentation request supplied from the client 13 through the network 10 as indicated by an arrow mark 521 in FIG. 60 at step S241. Then, the information presentation request processing section 252 issues a notification of the information presentation request to the presentation information production section 253 as indicated by an arrow mark 522 in FIG. 60.

When the notification is received, the presentation information production section 253 acquires information of items which satisfy conditions of the search request from the item information database 303 as indicated by an arrow mark 523 in FIG. 60 at step S242. Here, a search based on arbitrary data such as, for example, the genre or the hometown of an artist is included. At step S243, the presentation information production section 253 produces presentation information for presenting the acquired information to the user and supplies the presentation information to the presentation information correction section 254 as indicated by an arrow mark 524 in FIG. 60.

The presentation information correction section 254 acquires the item importance degrees from the item information database 303 as indicated by an arrow mark 525 in FIG. 60 at step S244. Then at step S245, the presentation information correction section 254 corrects the presentation information based on the item importance degrees, for example, by performing re-arrangement of the list of items or changing the size, color or the like of an image or characters to be displayed.

Figures 58, 59:
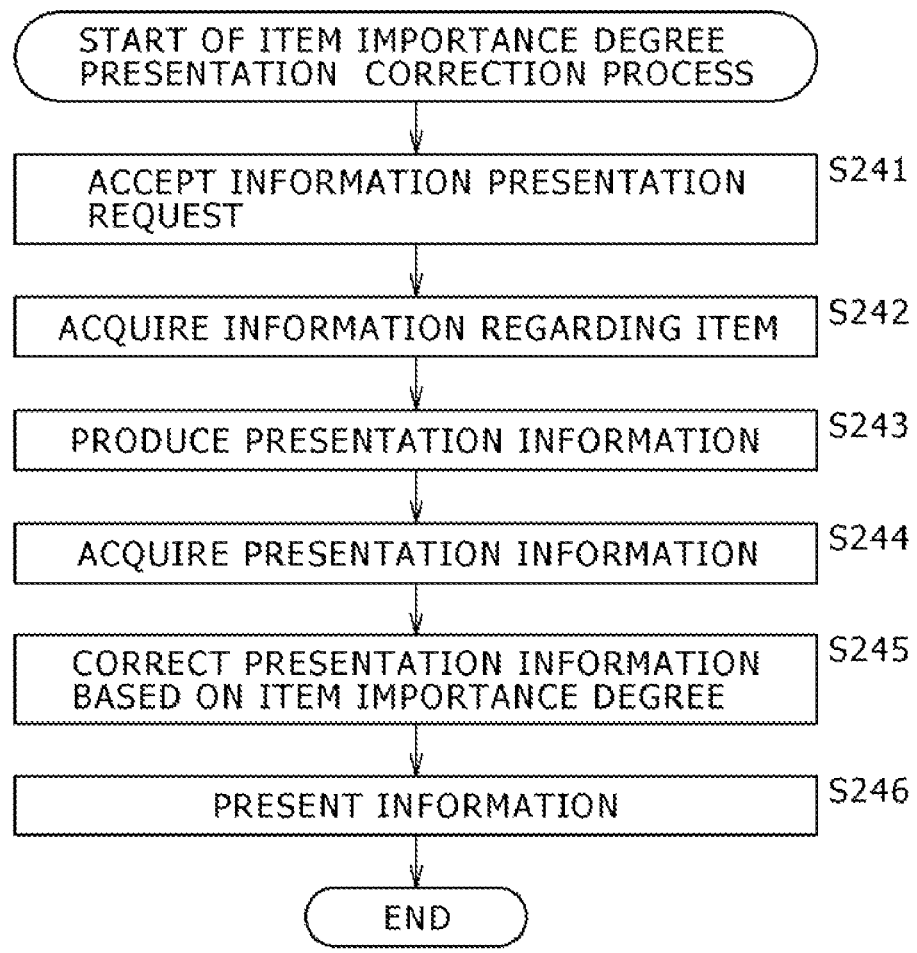
FIG. 58 is a table illustrating an example of importance degrees.
FIG. 59 is a flow chart illustrating an example of a flow of an item importance degree presentation correction process.

It is assumed that, for example, the importance degree of the items is set in such a manner as seen in a table shown in FIG. 58. Here, if the item 2, item 3 and item 4 are recommendable as similar items to a certain item, then it is possible to present the items in an array in the descending order of the magnitude of the importance degree as in the case of presentation information 531 illustrated in FIG. 61. It is to be noted that the presentation order may be any order, and for example, the items may be presented in an array in the descending order of the value of the product of the association degree and the importance degree.

After the correction comes to an end, the presentation information correction section 254 supplies the presentation information corrected in this manner to the item information presentation processing section 255 as indicated by an arrow mark 526 in FIG. 60.

The item information presentation processing section 255 supplies the presentation information to the client 13 through the network 10 as indicated by an arrow mark 527 in FIG. 60 so as to be presented to the user of the client 13 at step S246. Thereafter, the item importance degree presentation correction process is ended.

As a utilization method of the importance degree of an item described above, an explanation of a selected item may be presented based on the importance degree of items or a relationship between such importance degrees and user liking information may be presented to a user.

First, an example of a flow of a presentation process where the importance degree of an item is applied to the content based filtering is described with reference to FIG. 62. As occasion demands, also FIG. 63 is referred to. It is to be noted that the flow chart of FIG. 62 corresponds to the flow chart of FIG. 8.

Figure 62:
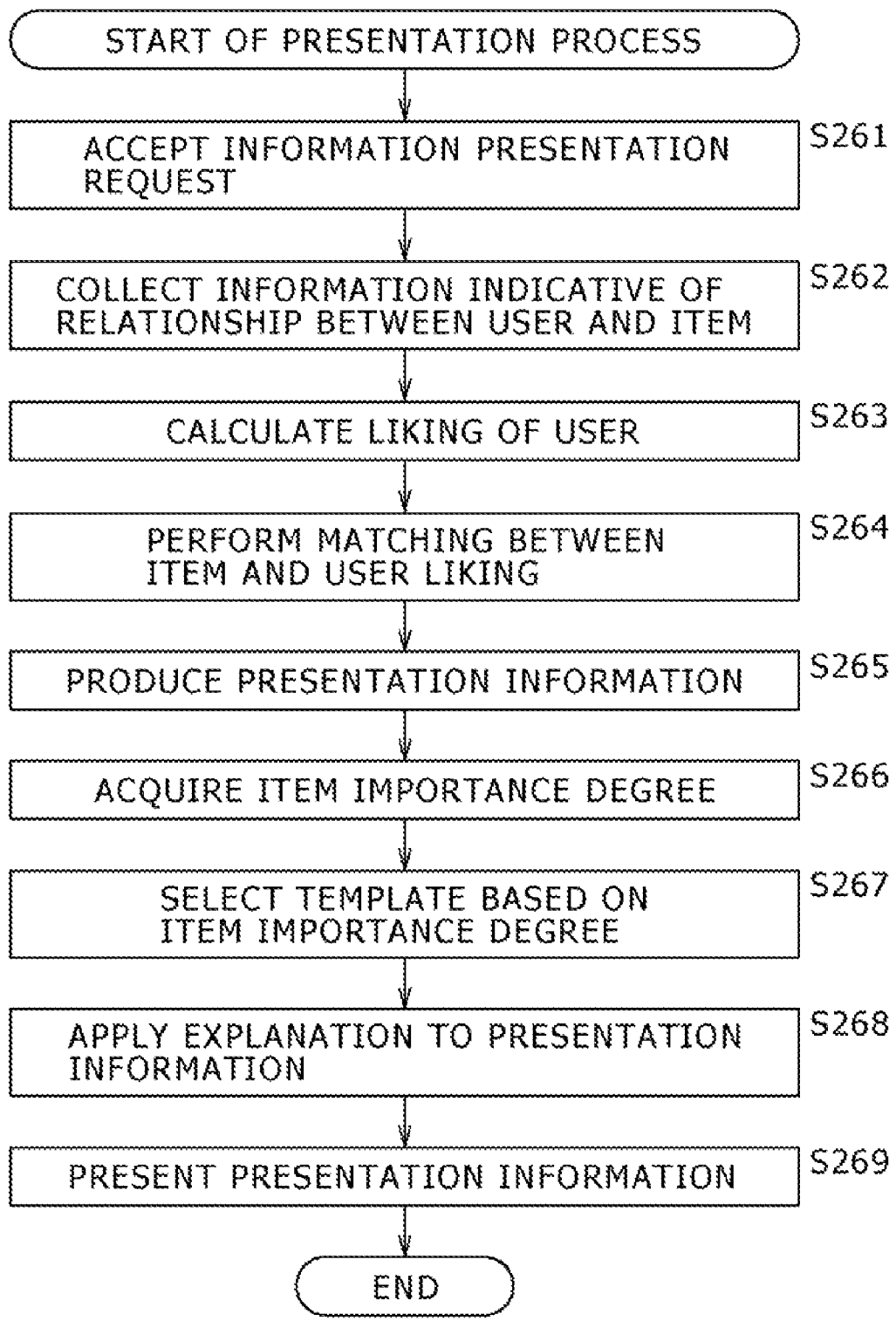
FIG. 62 is a flow chart illustrating a yet further example of the flow of the presentation process.
Figure 63:
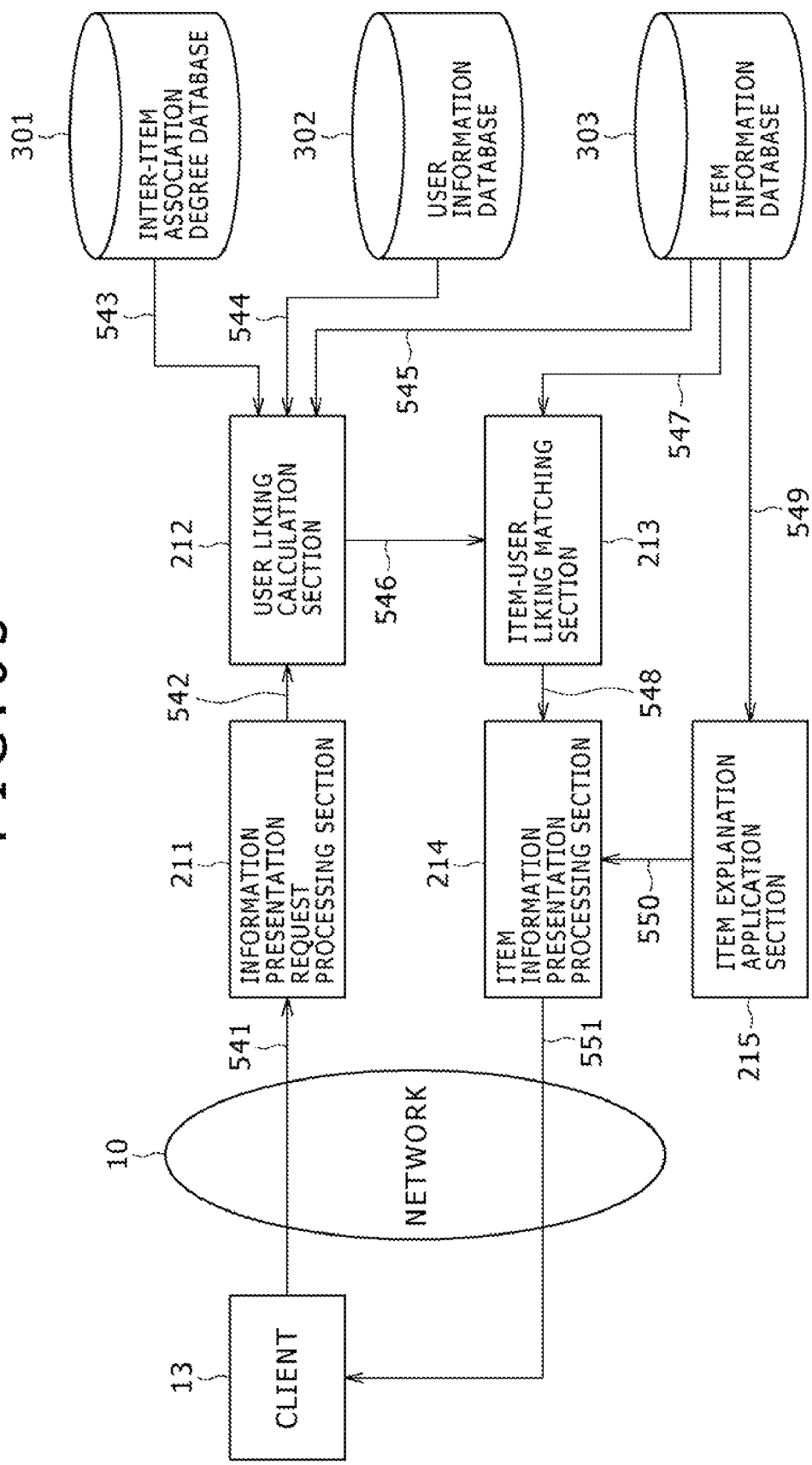
FIG. 63 is a block diagram illustrating an example of a manner of operation of functional blocks which participate in the presentation process of FIG. 62.

Accordingly, the components of the content based filtering processing section 202 execute processes at steps S261 to S265 of FIG. 62 similarly to the processes at steps S21 to S25 of FIG. 8. In particular, after the presentation process is started, the information presentation request processing section 211 accepts an information presentation request supplied from the client 13 through the network 10 as indicated by an arrow mark 541 in FIG. 63 at step S261. Further, the information presentation request processing section 211 issues a notification of the information presentation request to the user liking calculation section 212 as indicated by an arrow mark 542 in FIG. 63.

When the notification is received, the user liking calculation section 212 acquires the information indicative of relationships between the users and items from the inter-item association degree database 301, user information database 302 and item information database 303 as indicated by an arrow marks 543 to 545 in FIG. 63 at step S262.

After the information is acquired, the user liking calculation section 212 calculates a liking of the user based on the acquired information and supplies a result of the calculation to the item-user liking matching section 213 as indicated by an arrow mark 546 in FIG. 63 at step S263. The item-user liking matching section 213 acquires all or some of the items stored in the item information database 303 from the item information database 303 as indicated by an arrow mark 547 in FIG. 63 and performs matching of the items and the user liking at step S264. Further, the item-user liking matching section 213 supplies a result of the matching, that is, a list wherein those items decided as matching with the liking of the user are arranged in accordance with the similarity degree, to the item information presentation processing section 214 as indicated by an arrow mark 548 in FIG. 63.

The item information presentation processing section 214 produces presentation information at step S265. Further, the item explanation application section 215 acquires the importance degree of the items included in the matching result from the item information database 303 as indicated by an arrow mark 549 in FIG. 63 at step S266. Then at step S267, the item explanation application section 215 selects a template for an explanation for each of the items from among templates prepared in advance based on the importance degrees of the items and supplies the selected templates to the item information presentation processing section 214 as indicated by an arrow mark 550 in FIG. 63.

The item explanation application section 215 produces a word or a sentence which explains what nature each of the items decided as matching with the liking of the user has based on the importance degrees of the items and applies the produced word or sentence to the presentation information.

For example, as an explanation for an item corresponding to a music content, the item explanation application section 215 selects, for an item having a high importance degree, a template of "Please enjoy this by all means!", but selects, for another item having a lower importance degree, another template of "Maniac commodity!". Although the method here allows only simple selection of a sentence determined in advance, a combination of a plurality of words may be selected alternatively.

Consequently, a user to whom a list of items is presented can grasp the items with a high degree of accuracy. For example, if an item unknown to a user is presented, then it is difficult for the user to grasp it based only on the item name what item the item is. In such an instance, if an item explanation is applied to the presentation information by the item explanation application section 215, then the user can correctly recognize the presented item easily.

The item information presentation processing section 214 applies the explanation to the list of items of the presentation information at step S268. Then at step S269, the item information presentation processing section 214 supplies the presentation information to the client 13 through the network 10 so that the list with the explanation of items matching with the liking of the user is presented to the user of the client 13 as indicated by an arrow mark 551 in FIG. 63. After the presentation information is presented, the item information presentation processing section 214 ends the presentation process.

Figure 64:
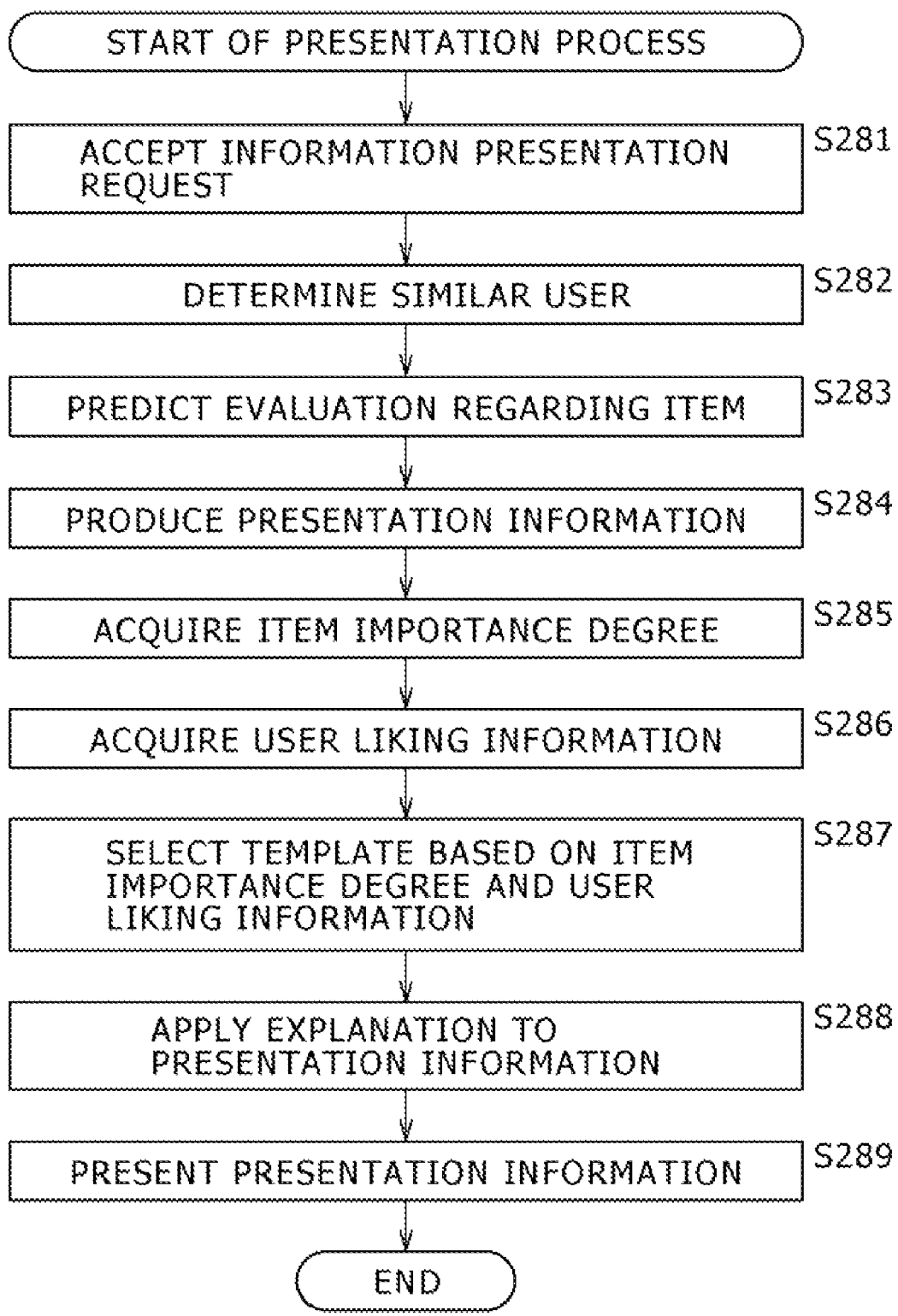
FIG. 64 is a flow chart illustrating a yet further example of the flow of the presentation process.
Figure 65:
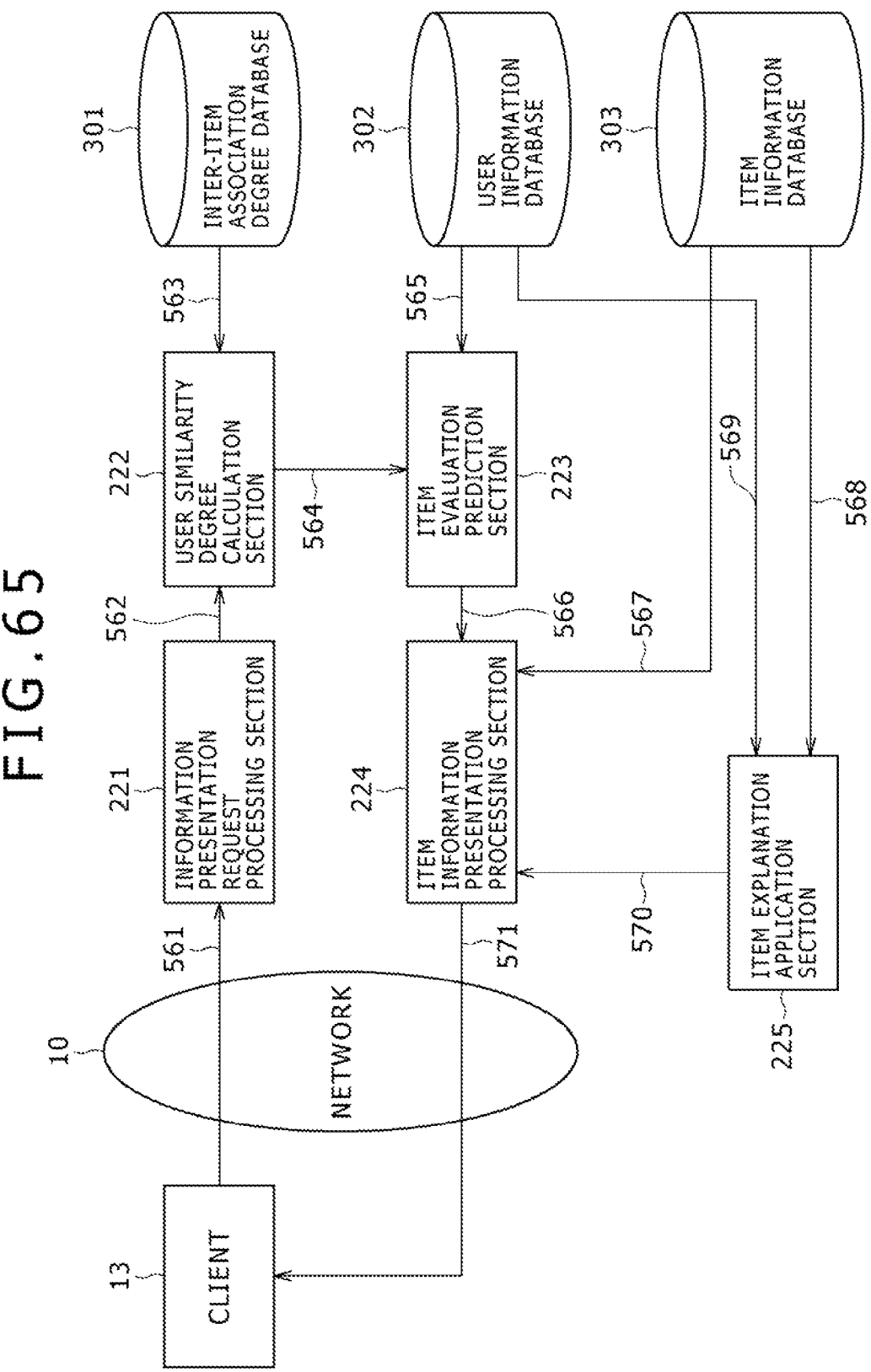
FIG. 65 is a block diagram illustrating an example of a manner of operation of functional blocks which participate in the presentation process of FIG. 64.

Now, an example of a flow of a presentation process where the importance degree of an item is applied to collaborative filtering is described with reference to FIG. 64. As occasion demands, also FIG. 65 is referred to. It is to be noted that the flow chart of FIG. 64 corresponds to the flow chart of FIG. 16.

The components of the collaborative filtering processing section 203 execute processes at steps S281 to S284 in a similar manner as at steps S41 to S44.

In particular, the information presentation request processing section 221 accepts an information presentation request as indicated by an arrow mark 561 in FIG. 65 and issues a notification of the information presentation request to the user similarity degree calculation section 222 as indicated by an arrow mark 562 in FIG. 65 at step S281. When the notification is received, the user similarity degree calculation section 222 acquires the information of the association degrees from the inter-item association degree database 301 as indicated by an arrow mark 563 in FIG. 65 at step S282. Further, the user similarity degree calculation section 222 determines, based on the information of the association degrees, similar users u' similar to the user u of the requesting source, recommendation items to which a high evaluation is provided by the similar users u' and average values of the evaluation values or association degrees provided to the recommendation items by the similar users u'. Then, the user similarity degree calculation section 222 supplies the determined information to the item evaluation prediction section 223 as indicated by an arrow mark 564 in FIG. 65. The item evaluation prediction section 223 acquires the average values of the evaluation values regarding the items provided by the user u from the user information database 302 as indicated by an arrow mark 565 in FIG. 65 at step S283. Further, the item evaluation prediction section 223 predicts predictive evaluation values for the recommendation items i of the user u and supplies the predictive evaluation values to the item information presentation processing section 224 as indicated by an arrow mark 566 in FIG. 65. When the predictive evaluation values are acquired, the item information presentation processing section 224 acquires information of the recommendation items from the item information database 303 as indicated by an arrow mark 567 in FIG. 37 and produces presentation information based on the acquired information at step S284.

The item explanation application section 225 acquires the importance degrees of the recommendation items from the item information database 303 as indicated by an arrow mark 568 in FIG. 65 at step S285. Then at step S286, the item explanation application section 225 acquires the liking information of the user of the requesting source from the user information database 302 as indicated by an arrow mark 569 in FIG. 65. Then at step S287, the item explanation application section 225 selects a template based on the item importance degrees and the liking information of the user and supplies the selected template to the item information presentation processing section 224 as indicated by an arrow mark 570 in FIG. 65.

In particular, the item explanation application section 225 analyzes a role of the importance degrees of the items in the liking information of the user to whom the information is to be presented. For example, if those items which are included in the purchase history of the user are one-sided to those items which provide a high importance degree in music contents, it can be considered that the user generally likes wide and popular (major) artists (albums or musical pieces). On the other hand, if items included in the purchase history of the user are one-sided to those items which provide a low importance degree, it can be considered that the user likes (minor) artists who are popular among only restricted people. Further, if those items which are included in the purchase history of the user are not particularly one-sided but exhibit a uniform expansion (great variance), then it can be considered that the user does not particularly care whether or not artists are famous, that is, whether artists are major or minor. In this manner, the item explanation application section 225 selects an explanation suitable for an item to be presented from among the templates prepared in advance, for example, as seen in a table shown in FIG. 66 based on the importance degree of the item and the position in importance degree of the item in the user liking.

For example, if an item of a low importance degree is to be presented to a user whose liking is one-sided to items having a low importance degree as seen in FIG. 66, then the item explanation application section 225 applies an explanatory sentence of "To you who are maniac, how about this!" to the presentation information. On the other hand, an item having a high importance degree is to be presented to the same user, the item explanation application section 225 applies an explanatory sentence of "How about this occasionally?" to the presentation information. In this manner, the item explanation application section 225 can apply an appropriate explanation through selection of the explanation based on a relationship between the liking of the user and the importance degree of the item.

The item information presentation processing section 224 applies the explanation to the presentation information at step S288. Then at step S289, the item information presentation processing section 224 supplies the presentation information to the client 13 through the network 10 as indicated by an arrow mark 571 in FIG. 65 so as to be presented to the user. Thereafter, the presentation process is ended.

In this manner, the server 11 can achieve preferable recommendation to a user of a client not only based on an express evaluation behavior of the user of the client but also by feedback of a relationship between information of recommendation objects.

In particular, by applying not only express evaluation of contents but also an association degree between items, a greater amount of feedback is obtained, and by utilizing information of the similarity degree between items which relies upon the sensitivity of the user, information which may not be represented by existing meta data can be extracted. Consequently, the item introduction system 1 (server 11) can achieve effective content recommendation or item recommendation to a user of a client.

It is to be noted that, while the series of processes described above can be executed by hardware, it may otherwise be executed by software. Where the series of processes is executed by software, a program which constructs the software is installed from a network or a recording medium.

The recording medium is formed, for example, as shown in FIG. 3, as a removable medium 121 such as a magnetic disk (including a flexible disk), an optical disc (including a CD-ROM (Compact Disk-Read Only Memory) and a DVD (Digital Versatile Disc)), or a magneto-optical disk (including an MD (Mini Disc)) (registered trademark), or a semiconductor memory which has the program recorded thereon or therein and is distributed in order to provide the program to a user separately from an apparatus body. Else, the recording medium is formed as a ROM 102, a hard disc or the like included in the storage section 113 in which the program is recorded and which is distributed to a user in a state wherein the program is incorporated in an apparatus in advance.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

It is to be noted that any element which is described as a single apparatus in the foregoing description may be divided so as to be formed as a plurality of apparatus. On the contrary, any elements which are described as a plurality of apparatus in the foregoing description may be combined so as to be formed as a single apparatus. Further, any other element than those described hereinabove may be additionally provided to any of the elements described hereinabove. Furthermore, an element of some apparatus may be included in an element of another apparatus if the configuration or operation of the entire system is substantially same or equivalent. In other words, the present invention is not restricted to the embodiment described hereinabove, but can be carried out in various modified forms without departing from the spirit and scope of the present invention.

What is claimed is:

1. An information processing apparatus for providing a recommendation to a user, comprising:
a processor;
an association degree collection section configured to collect, from the user, association degrees applied between items for associating the items with one another, the association degrees being values indicative of weights of relationships between the items, the values being subtracted from a point total associated with the user, wherein the user is inhibited from applying association degrees that would result in a negative point total;
an inter-item association degree database configured to store the collected association degrees as values specific to the user;
an introduction section configured to determine a recommendation of associated items from a reference item based on the user-specific collected association degrees and introduce the recommendation to the user; and
an item explanation section configured to produce an explanation, based on a selected explanation template, concerning the nature of the recommendation, and apply the explanation to the recommendation for presenting to the user.

2. The information processing apparatus according to claim 1, further comprising:
a user liking calculation section configured to calculate a liking of the user based on the result of the collection by said association degree collection section; and
a comparison section configured to compare the liking of the user and the individual items to determine similarity degrees therebetween;
said introduction section introducing recommendation items which are determined to have a high similarity degree to the liking of the user by the comparison by said comparison section.

3. The information processing apparatus according to claim 1, further comprising:
a similar user search section configured to compare the applied association degrees for the users to additional users, and search for similar users who have a high similarity degree based on a result of the comparison; and
an item evaluation prediction section configured to predict an evaluation value for each of the items by the user based on evaluation items for the items by the similar users;
said introduction section introducing items predicted as receiving a high evaluation from the user.

4. The information processing apparatus according to claim 1, further comprising a reliability degree calculation section configured to calculate a reliability degree of each of the association degrees.

5. The information processing apparatus according to claim 4, wherein said introduction section introduces, together with the associated items, the association degrees applied from the reference item to the associated items and the reliability degrees of the association degrees.

6. The information processing apparatus according to claim 1, further comprising:
a user reliability degree calculation section configured to calculate a reliability degree of users by whom the association degrees are applied;
a similar user search section configured to compare the applied association degrees for the users to additional users, and search for similar users who have a high similarity degree based on a result of the comparison; and
an item evaluation prediction section configured to perform weighting for the similar users based on the reliability degrees of the users calculated by said user reliability calculation section and predict evaluation values for the items by the user based on the weights of the similar users and evaluation values for the items by the similar users;

said introduction section introducing items predicted as receiving a high evaluation from the user.

7. An information processing method comprising the steps of:
collecting, from a user, association degrees applied between items for associating the items with one another, the association degrees being values indicative of weights of relationships between the items, the values being subtracted from a point total associated with the user, wherein the user is inhibited from applying association degrees that would result in a negative point total;
storing the collected association degrees as values specific to the user;
determining a recommendation of associated items from a reference item based on the user-specific collected association degrees and introduce the recommendation to the user;
producing an explanation, based on a selected explanation template, concerning the nature of the recommendation; and
applying the explanation to the recommendation for presenting to the user.

8. A computer-readable storage medium storing instruction that, when executed by a processor, perform a method comprising:
collecting, from a user, association degrees applied between items for associating the items with one another, the association degrees being values indicative of weights of relationships between the items, the values being subtracted from a point total associated with the user, wherein the user is inhibited from applying association degrees that would result in a negative point total;
storing the collected association degrees as values specific to the user;
determining a recommendation of associated items from a reference item based on the user-specific collected association degrees and introduce the recommendation to the user;
producing an explanation, based on a selected explanation template, concerning the nature of the recommendation; and
applying the explanation to the recommendation for presenting to the user.

* * * * *